(12) United States Patent
Okazaki

(10) Patent No.: US 11,630,463 B2
(45) Date of Patent: Apr. 18, 2023

(54) MOBILE ROBOT, CONTROL METHOD, AND STORAGE MEDIUM

(71) Applicant: PANASONIC INTELLECTUAL PROPERTY MANAGEMENT CO., LTD., Osaka (JP)

(72) Inventor: Yasunao Okazaki, Shiga (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 429 days.

(21) Appl. No.: 16/984,536

(22) Filed: Aug. 4, 2020

(65) Prior Publication Data
US 2021/0041888 A1 Feb. 11, 2021

(30) Foreign Application Priority Data

Aug. 9, 2019 (JP) ............................. JP2019-148065
Aug. 9, 2019 (JP) ............................. JP2019-148066
Aug. 9, 2019 (JP) ............................. JP2019-148067

(51) Int. Cl.
*G05D 1/02* (2020.01)
*A47L 11/40* (2006.01)

(52) U.S. Cl.
CPC ........ *G05D 1/0268* (2013.01); *A47L 11/4011* (2013.01)

(58) Field of Classification Search
CPC ....... G05D 1/0268; A47L 11/00; A47L 11/20; A47L 11/32; A47L 11/4011
See application file for complete search history.

(56) References Cited

U.S. PATENT DOCUMENTS

| | | | |
|---|---|---|---|
| 8,560,119 B2* | 10/2013 | Lee | ...................... A47L 11/4002 |
| | | | 15/340.1 |
| 2013/0331988 A1 | 12/2013 | Goel et al. | |
| 2016/0075032 A1 | 3/2016 | Goel et al. | |
| 2016/0332304 A1 | 11/2016 | Goel et al. | |
| 2017/0371341 A1* | 12/2017 | Leinhos | ............... G05D 1/0219 |
| 2018/0297208 A1 | 10/2018 | Goel et al. | |

(Continued)

FOREIGN PATENT DOCUMENTS

| CN | 109358623 A | 2/2019 |
|---|---|---|
| CN | 109506652 A | 3/2019 |

(Continued)

OTHER PUBLICATIONS

Marshall, Matthew. "Neural networks and mechatronics for detecting carpet pile direction" (Mar. 16, 2018). Journal of Textiles and Fibrous Materials, vol. I: 1-7 (Year: 2018).*

*Primary Examiner* — Nicholas Kiswanto
(74) *Attorney, Agent, or Firm* — McDermott Will & Emery LLP

(57) ABSTRACT

Provided is a mobile robot that moves autonomously over a floor covered by a carpet, the mobile robot including an acceleration sensor that measures a translational acceleration of the mobile robot, an estimation unit that estimates an inclination of a pile of the carpet on a basis of the translational acceleration measured by the acceleration sensor while the mobile robot is accelerating or decelerating, and a movement control unit that controls a movement velocity and a movement direction of the mobile robot on a basis of the inclination of the pile estimated by the estimation unit.

20 Claims, 28 Drawing Sheets

(56) References Cited

U.S. PATENT DOCUMENTS

2021/0055738 A1* 2/2021 Komatsu .............. G05D 1/0223
2021/0365041 A1* 11/2021 Lee ...................... A47L 9/2852

FOREIGN PATENT DOCUMENTS

| EP | 2910168 A1 | 8/2015 |
| JP | 2004-062577 A | 2/2004 |
| JP | 2005-222226 A | 8/2005 |
| JP | 5913743 B2 | 4/2016 |
| WO | 2013/079334 A1 | 6/2013 |

* cited by examiner

| SEQUENCE NUMBER | $X_d$ | | $v_d$ | $\psi_d$ | $C_m$ | $C_s$ |
|---|---|---|---|---|---|---|
| | $x_d$ | $y_d$ | | | | |
| 1 | $L_1$ | 0 | $v_L$ | 0 | 1 | 0 |
| 2 | $L_1$ | 0 | 0 | 90 | 3 | 0 |
| 3 | $L_1$ | $L_2$ | $v_L$ | 90 | 1 | 0 |
| 4 | $L_1$ | $L_2$ | 0 | 180 | 3 | 0 |
| 5 | 0 | $L_2$ | $v_L$ | 180 | 1 | 0 |
| 6 | 0 | $L_2$ | 0 | $-90$ | 3 | 0 |
| 7 | 0 | $0.8L_2$ | $v_A$ | $-90$ | 1 | 0 |
| 8 | 0 | $0.8L_2$ | 0 | 0 | 3 | 0 |

T2

| SEQUENCE NUMBER | $X_d$ | | $v_d$ | $\psi_d$ | $C_m$ | $C_s$ |
|---|---|---|---|---|---|---|
| | $x_d$ | $y_d$ | | | | |
| 1 | $-$ | $-$ | $v_s$ | 180 | 2 | 1 |
| 2 | $-$ | $-$ | $-v_s$ | 180 | 2 | 1 |
| 3 | $-$ | $-$ | 0 | $-90$ | 3 | 0 |
| 4 | $-$ | $-$ | $v_s$ | $-90$ | 2 | 1 |
| 5 | $-$ | $-$ | $-v_s$ | $-90$ | 2 | 1 |
| 6 | $-$ | $-$ | 0 | 180 | 3 | 0 |

FIG. 20
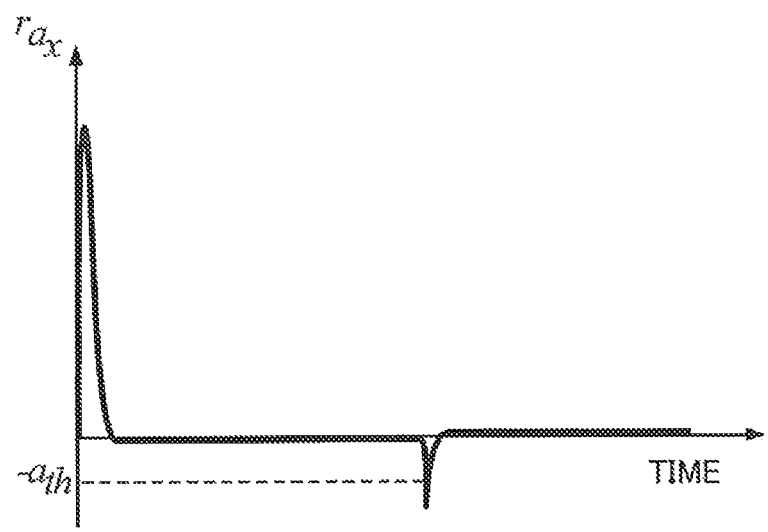
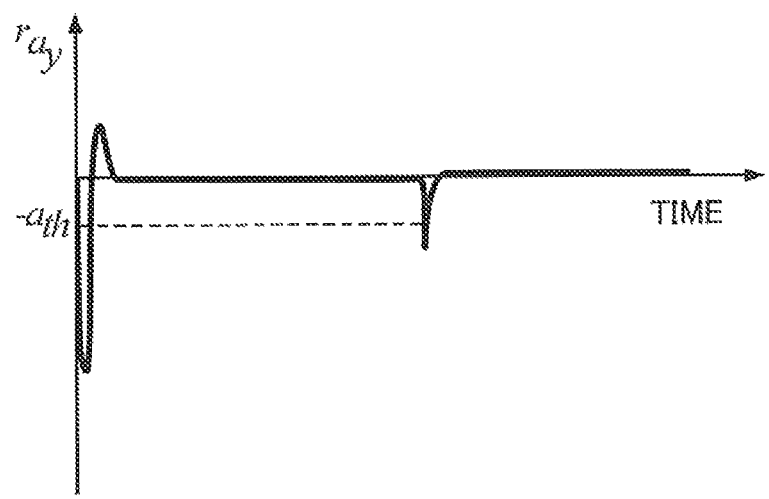

| SEQUENCE NUMBER | $X_d$ | | $v_d$ | $\psi_d$ | $C_m$ | $C_s$ |
|---|---|---|---|---|---|---|
| | $x_d$ | $y_d$ | | | | |
| 1 | - | - | $v_s$ | 0 | 2 | 1 |
| 2 | - | - | $-v_s$ | 0 | 2 | 1 |
| 3 | - | - | 0 | 90 | 3 | 0 |
| 4 | - | - | $v_s$ | 90 | 2 | 1 |
| 5 | - | - | $-v_s$ | 90 | 2 | 1 |
| 6 | - | - | 0 | 0 | 3 | 0 |
| 7 | $L_1$ | 0 | $v_L$ | 0 | 1 | 0 |
| 8 | $L_1$ | 0 | 0 | 0 | 3 | 0 |
| 9 | $L_1$ | $L_2$ | $v_L$ | 90 | 1 | 0 |
| 10 | 0 | $L_2$ | 0 | 90 | 3 | 0 |
| 11 | 0 | $L_2$ | $v_L$ | 180 | 1 | 0 |
| 12 | 0 | $L_2$ | 0 | 180 | 3 | 0 |
| 13 | 0 | $0.8 L_2$ | $v_L$ | -90 | 1 | 0 |
| 14 | 0 | $0.8 L_2$ | 0 | 0 | 3 | 0 |

⟷ ESTIMATION OPERATION SEQUENCE

FIG. 27

| SEQUENCE NUMBER | $X_d$ | | $v_d$ | $\psi_d$ | $C_m$ | $C_s$ |
|---|---|---|---|---|---|---|
| | $x_d$ | $y_d$ | | | | |
| ESTIMATION SEQUENCE | — | — | $v_s$ | $\omega_s t$ | 2 | 1 |
| 1 | $L_1$ | 0 | $v_L$ | 0 | 1 | 0 |
| 2 | $L_1$ | 0 | 0 | 90 | 3 | 0 |
| 3 | $L_1$ | $L_2$ | $v_L$ | 90 | 1 | 0 |
| 4 | $L_1$ | $L_2$ | 0 | 180 | 3 | 0 |
| 5 | 0 | $L_2$ | $v_L$ | 180 | 1 | 0 |
| 6 | 0 | $L_2$ | 0 | -90 | 3 | 0 |
| 7 | 0 | $0.8L_2$ | $v_L$ | -90 | 1 | 0 |
| 8 | 0 | $0.8L_2$ | 0 | 0 | 3 | 0 |

T1

MOBILE ROBOT, CONTROL METHOD, AND STORAGE MEDIUM

CROSS-REFERENCE OF RELATED APPLICATIONS

This application claims the benefit of Japanese Application No. 2019-148065, filed on Aug. 9, 2019, Japanese Application No. 2019-148066, filed on Aug. 9, 2019, and Japanese Application No. 2019-148067, filed on Aug. 9, 2019, the entire disclosures of which Applications are incorporated by reference herein.

FIELD OF THE INVENTION

The present disclosure relates to a technology for controlling the movement of a mobile robot that moves autonomously over a floor.

BACKGROUND ART

Recently, autonomous mobile robots have been developed, such as self-propelled cleaners that clean automatically without human control while moving autonomously over a floor. Such autonomous mobile robots move autonomously on a path created on the basis of the surrounding environment detected using sensors. However, if an autonomous mobile robot is made to move autonomously in the case of a carpeted floor, the path of the autonomous mobile robot may be disturbed when the fibers of the carpet referred to as pile are inclined in a specific direction.

Technology for addressing issues like the above is disclosed in Japanese Patent No. 5913743. Specifically, Japanese Patent No. 5913743 discloses a mobile robot apparatus including an odometry measuring means, a forward direction measuring means, and a camera. When changing the forward direction, the mobile robot apparatus uses the odometry measuring means and the forward direction measuring means to estimate the influence (carpet drift) due to moving over a carpet. On the other hand, when moving in a straight line, the mobile robot apparatus uses the odometry measuring means and the camera to estimate the influence due to moving over a carpet.

However, with the technology disclosed in Japanese Patent No. 5913743 above, estimating the influence due to moving over a carpet requires the three means of the odometry measuring means, the forward direction measuring means, and the camera. Consequently, there is a problem in that the configuration of the mobile robot apparatus is complex and a load is also imposed on the processing system.

SUMMARY OF THE INVENTION

In light of the above issues, an object of the present disclosure is to provide a mobile robot with a simple configuration, a control method, and a storage medium capable of moving on an accurate path even over carpet.

According to one aspect of the present disclosure, there is provided a mobile robot that moves autonomously over a floor covered by a carpet, the mobile robot including an acceleration sensor that measures a translational acceleration of the mobile robot, an estimation unit that estimates an inclination of a pile of the carpet on a basis of the translational acceleration measured by the acceleration sensor while the mobile robot is accelerating or decelerating, and a movement control unit that controls a movement velocity and a movement direction of the mobile robot on a basis of the inclination of the pile estimated by the estimation unit.

BRIEF DESCRIPTION OF THE DRAWINGS

FIG. 14 is a diagram illustrating one example of an operation sequence table and an estimation operation sequence table according to the second embodiment;

FIG. 20 is a diagram illustrating one example of simulation results of translational acceleration measured when crossing a carpet block boundary in the case where the self-propelled cleaning robot according to the first modification of the second embodiment moves straight ahead at a constant velocity;

FIG. 23 is a diagram illustrating one example of an operation sequence table according to the third embodiment;

FIG. 27 is a diagram illustrating one example of an operation sequence table according to the first modification of the third embodiment.

Figure 1:
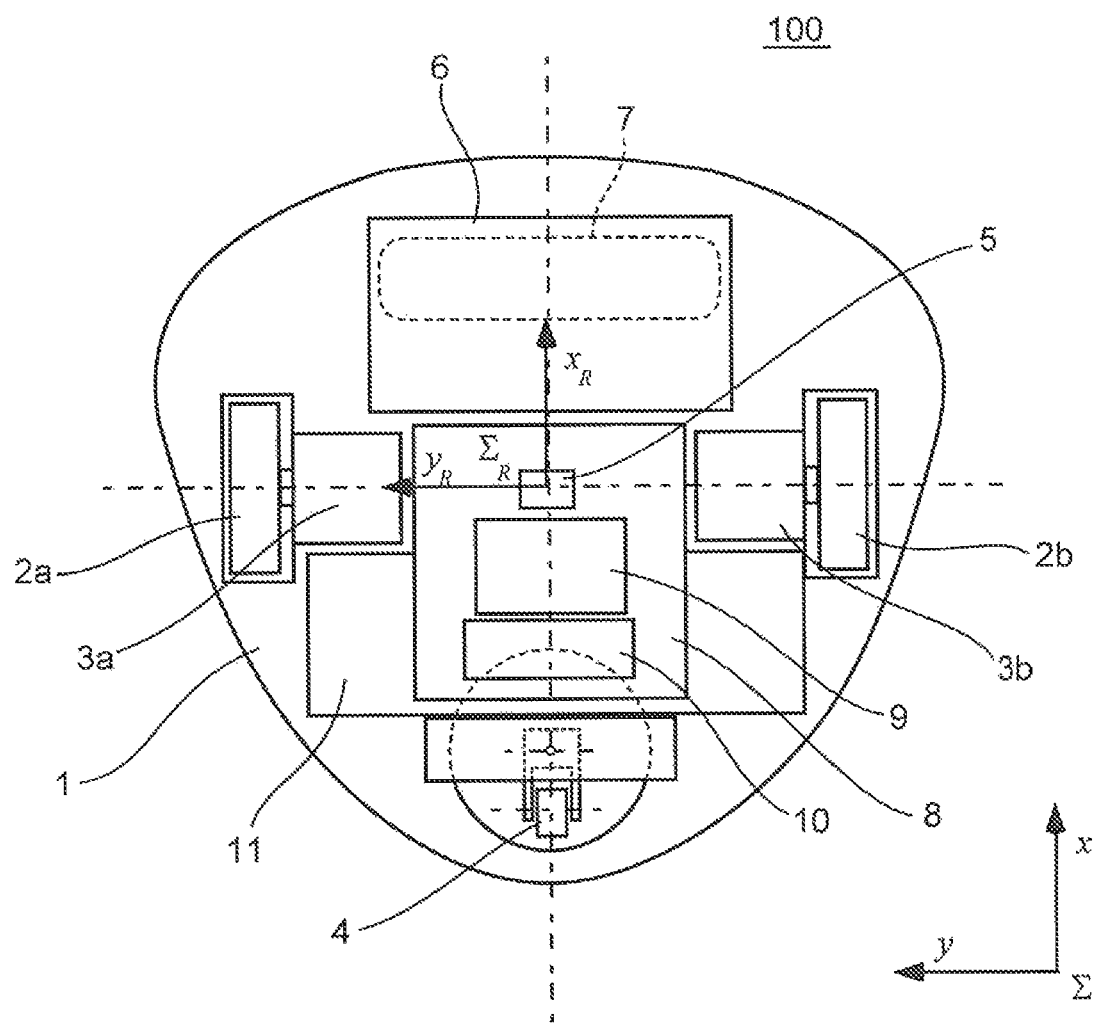
FIG. 1 is a diagram illustrating one example of a mechanism of a self-propelled cleaning robot, which is a mobile robot according to an embodiment of the present disclosure.

DESCRIPTION OF EMBODIMENTS (Underlying Knowledge Forming Basis of the Present Disclosure)

Recently, autonomous mobile robots have been developed, such as self-propelled cleaners that clean automatically without human control while moving autonomously over a floor to reduce the burden of housekeeping. To achieve such autonomous movement, such an autonomous mobile robot detects the surrounding environment by using sensors such as a Light Detection and Ranging (LiDAR) sensor for example. Additionally, the autonomous mobile robot creates and updates a map on the basis of the detected surrounding environment, and plans a path for the autonomous mobile robot on the basis of the map. The autonomous mobile robot then moves autonomously on the planned path.

Here, it is assumed that the autonomous mobile robot is made to perform autonomous movement as above in the case where the floor is carpeted. However, because of the structure of carpet, the fibers of the carpet referred to as pile are inclined in a specific direction. For this reason, in the case of moving over a carpet, the inclination of the pile may cause the autonomous mobile robot to tilt. As a result, the autonomous mobile robot may be unable to move on the planned path accurately due to being unable to move in a straight line, for example.

Technology for addressing issues like the above is disclosed in Japanese Patent No. 5913743. However, with the technology disclosed in Japanese Patent No. 5913743, estimating the influence due to moving over a carpet requires the three means. Consequently, there is a problem in that the configuration of the mobile robot apparatus is complex and a load is also imposed on the processing system.

In light of the above issues, an object of the present disclosure is to provide a mobile robot with a simple configuration, a control method, and a storage medium capable of moving on an accurate path even over carpet.

According to one aspect of the present disclosure, there is provided a mobile robot that moves autonomously over a floor covered by a carpet, the mobile robot including an acceleration sensor that measures a translational acceleration of the mobile robot, an estimation unit that estimates an inclination of a pile of the carpet on a basis of the translational acceleration measured by the acceleration sensor while the mobile robot is accelerating or decelerating, and a movement control unit that controls a movement velocity and a movement direction of the mobile robot on a basis of the inclination of the pile estimated by the estimation unit.

According to another aspect of the present disclosure, there is provided a control method for a mobile robot that moves autonomously over a floor covered by a carpet, the mobile robot being provided with an acceleration sensor that measures a translational acceleration of the mobile robot, the control method including estimating an inclination of a pile of the carpet on a basis of the translational acceleration measured by the acceleration sensor while the mobile robot is accelerating or decelerating, and controlling a movement velocity and a movement direction of the mobile robot on a basis of the estimated inclination of the pile.

According to another aspect of the present disclosure, there is provided a non-transitory computer readable storage medium storing a control program of a mobile robot that moves autonomously over a floor covered by a carpet, the mobile robot being provided with an acceleration sensor that measures a translational acceleration of the mobile robot, the control program causing a computer provided in the mobile robot to function as an estimation unit that estimates an inclination of a pile of the carpet on a basis of the translational acceleration measured by the acceleration sensor while the mobile robot is accelerating or decelerating, and a movement control unit that controls a movement velocity and a movement direction of the mobile robot on a basis of the inclination of the pile estimated by the estimation unit.

According to these aspects, the inclination of the pile of the carpet is estimated on the basis of the translational acceleration calculated by the acceleration sensor when the mobile robot is accelerating or decelerating. Additionally, the movement velocity and the movement direction of the mobile robot are controlled on the basis of the estimated inclination of the pile of the carpet.

For this reason, it is possible to reduce the influence that the inclination of the pile of the carpet exerts on the movement velocity and the movement direction of the mobile robot when the mobile robot moves. As a result, the mobile robot can move on an accurate path even over carpet. Further, according to the aspect above, an acceleration sensor may be provided for estimating the inclination of the pile of the carpet. For this reason, a constituent member such as a camera in the technology disclosed in Japanese Patent No. 5913743 is not required, and thus it becomes possible to estimate and control the movement velocity and the movement direction on the basis of the result of the estimation with a simple configuration.

In the above aspect, the inclination of the pile may also be expressed by a component in a first direction parallel to the forward direction of the mobile robot and a component in a second direction perpendicular to the forward direction of the mobile robot and also parallel to the floor.

According to this aspect, because the inclination of the pile is expressed by two components in a first direction and a second direction, the inclination of the pile can be estimated accurately.

In the above aspect, the movement control unit may control the movement velocity according to the component in the first direction of the inclination of the pile estimated by the estimation unit, and controls the movement direction according to the component in the second direction of the inclination of the pile estimated by the estimation unit.

According to this aspect, even in the case where the pile of the carpet is inclined in the first direction parallel to the forward direction of the mobile robot, causing the moving mobile robot to drift in the forward direction and causing the movement velocity of the mobile robot to change, the movement velocity can be controlled appropriately according to the change. With this arrangement, it is possible to reduce the influence by which the inclination of the pile causes the mobile robot to drift in the forward direction and causes the movement distance of the mobile robot to be extended or contracted compared to normal.

Also, according to this aspect, even in the case where the pile of the carpet is inclined in the second direction perpendicular to the forward direction of the mobile robot and also parallel to the floor, causing the moving mobile robot to tilt in the direction in which the pile is inclined and causing the movement direction of the mobile robot to change, the movement direction can be controlled appropriately according to the change. With this arrangement, it is possible to reduce the influence by which the inclination of the pile causes the mobile robot to drift in the second direction.

In the above aspect, the estimation unit may estimate the component in the first direction of the inclination of the pile on a basis of a maximum value of a component in the first direction of the translational acceleration.

According to this aspect, the component in the first direction of the inclination of the pile is estimated using the maximum value of the component in the first direction of the translational acceleration. For this reason, it is possible to accurately estimate the component in the first direction of the inclination of the pile by using the maximum value of the component in the first direction of the translational acceleration, which greatly influences the estimation of the component in the first direction of the inclination of the pile.

In the above aspect, the estimation unit may estimate the component in the second direction of the inclination of the pile on a basis of a maximum value of a component in the first direction of the translational acceleration and a maximum value of a component in the second direction of the translational acceleration.

According to this aspect, the component in the second direction of the inclination of the pile is estimated using the maximum value of each of the component in the first direction and the component in the second direction of the translational acceleration. For this reason, it is possible to accurately estimate the component in the second direction of the inclination of the pile by using the maximum value of each of the component in the first direction and the component in the second direction of the translational acceleration, which greatly influences the estimation of the component in the second direction of the inclination of the pile.

In the above aspect, the estimation unit may estimate the component in the first direction of the inclination of the pile using a first arithmetic expression proportional to a square root of the maximum value of the component in the first direction of the translational acceleration.

According to this aspect, it is possible to consistently and accurately estimate the component in the first direction of the inclination of the pile by using the first arithmetic expression using the maximum value of the component in the first direction of the translational acceleration, which greatly influences the estimation of the component in the first direction of the inclination of the pile.

In the above aspect, the estimation unit may estimate the component in the second direction of the inclination of the pile using a second arithmetic expression proportional to the maximum value of the component in the second direction of the translational acceleration and inversely proportional to an exponential function using a square root of the maximum value of the component in the first direction of the translational acceleration.

According to this aspect, it is possible to consistently and accurately estimate the component in the second direction of the inclination of the pile by using the second arithmetic expression using the maximum value of each of the component in the first direction and the component in the second direction of the translational acceleration, which greatly influences the estimation of the component in the second direction of the inclination of the pile.

In the above aspect, the movement control unit may cause the mobile robot to perform an operation that utilizes a centrifugal acceleration from a steering of the mobile robot to estimate the inclination of the pile of the carpet, and the estimation unit may estimate the inclination of the pile on a basis of the translational acceleration measured by the acceleration sensor while the mobile robot is performing the operation.

According to this aspect, the inclination of the pile of the carpet is estimated on the basis of the translational acceleration produced when causing the mobile robot to perform an operation that utilizes centrifugal acceleration. For this reason, the inclination of the pile of the carpet can be estimated more accurately. Additionally, the movement velocity and the movement direction of the mobile robot are controlled on the basis of the estimated inclination of the pile of the carpet. For this reason, it is possible to reduce the influence that the inclination of the pile of the carpet exerts on the movement velocity and the movement direction of the mobile robot when the mobile robot moves. As a result, the mobile robot can move on an accurate path even over carpet.

Further, according to the aspect above, an acceleration sensor may be provided for estimating the inclination of the pile of the carpet. For this reason, a constituent member such as a camera in the technology disclosed in Japanese Patent No. 5913743 is not required, and thus it becomes possible to estimate and control the movement velocity and the movement direction on the basis of the result of the estimation with a simple configuration.

In the above aspect, the operation may be an operation that causes the mobile robot to move in a circle at a uniform velocity.

According to this aspect, it is possible to estimate the inclination of the pile of the carpet more accurately by simply causing the mobile robot to perform a simple operation of moving in a circle at a uniform velocity.

In the above aspect, the inclination of the pile may also be expressed by a component in a first direction parallel to the forward direction of the mobile robot and a component in a second direction perpendicular to the forward direction of the mobile robot and also parallel to the floor.

According to this aspect, because the inclination of the pile is expressed by two components in a first direction and a second direction, the inclination of the pile can be estimated accurately.

In the above aspect, the estimation unit may estimate the components in the first direction and the second direction of the inclination of the pile on a basis of a maximum value and a minimum value of the component in the second direction of the translational acceleration, a time from when the mobile robot starts the operation until the component in the second direction of the translational acceleration reaches the maximum value, and a time from when the mobile robot starts the operation until the component in the second direction of the translational acceleration reaches the minimum value.

According to this aspect, the components in the first and second directions of the inclination of the pile are estimated by using the maximum value and the minimum value of the component in the second direction of the translational acceleration, and the times from when the mobile robot starts the operation until the component in the second direction of the translational acceleration becomes each of the maximum value and the minimum value. For this reason, the inclination of the pile can be estimated accurately using various values related to the second direction, which greatly influences the estimation of the inclination of the pile.

According to another aspect of the present disclosure, there is provided a mobile robot that moves autonomously over a floor covered by a carpet, the mobile robot including an acceleration sensor that measures a translational acceleration of the mobile robot, an estimation unit that estimates an inclination of a pile of the carpet on a basis of the translational acceleration measured by the acceleration sensor while the mobile robot is accelerating or decelerating, an operation planning unit that plans an acceleration or deceleration operation by the mobile robot for the estimation unit to perform the estimation, and a movement control unit that controls a movement velocity and a movement direction of the mobile robot on a basis of the inclination of the pile estimated by the estimation unit, in which in a case of determining that a change has occurred in the estimated inclination of the pile, the estimation unit commands the operation planning unit to plan the acceleration or deceleration operation by the mobile robot.

According to another aspect of the present disclosure, there is provided a control method for a mobile robot that moves autonomously over a floor covered by a carpet, the mobile robot being provided with an acceleration sensor that measures a translational acceleration of the mobile robot, the control method including estimating an inclination of a pile of the carpet on a basis of the translational acceleration measured by the acceleration sensor while the mobile robot is accelerating or decelerating, controlling a movement velocity and a movement direction of the mobile robot on a basis of the estimated inclination of the pile, and in a case of determining that a change has occurred in the estimated inclination of the pile, planning an acceleration or deceleration operation by the mobile robot.

According to another aspect of the present disclosure, there is provided a non-transitory computer readable storage medium storing a control program of a mobile robot that moves autonomously over a floor covered by a carpet, the mobile robot being provided with an acceleration sensor that measures a translational acceleration of the mobile robot, the control program causing a computer provided in the mobile robot to function as an estimation unit that estimates an inclination of a pile of the carpet on a basis of the translational acceleration measured by the acceleration sensor while the mobile robot is accelerating or decelerating, an operation planning unit that plans an acceleration or deceleration operation by the mobile robot for the estimation unit to perform the estimation, and a movement control unit that controls a movement velocity and a movement direction of the mobile robot on a basis of the inclination of the pile estimated by the estimation unit, in which in a case of determining that a change has occurred in the estimated inclination of the pile, the estimation unit commands the operation planning unit to plan the acceleration or deceleration operation by the mobile robot.

According to these aspects, the inclination of the pile of the carpet is estimated on the basis of the translational acceleration calculated by the acceleration sensor, when the mobile robot is accelerating or decelerating. Additionally, the movement velocity and the movement direction of the mobile robot are controlled on the basis of the estimated inclination of the pile of the carpet.

For this reason, it is possible to reduce the influence that the inclination of the pile of the carpet exerts on the movement velocity and the movement direction of the mobile robot when the mobile robot moves. As a result, the mobile robot can move on an accurate path even over carpet. Further, according to the aspect above, an acceleration sensor may be provided for estimating the inclination of the pile of the carpet. For this reason, a constituent member such as a camera in the technology disclosed in Japanese Patent No. 5913743 is not required, and thus it becomes possible to estimate and control the movement velocity and the movement direction on the basis of the result of the estimation with a simple configuration.

Furthermore, according to the above aspect, in the case where a change occurs in the estimated inclination of the pile, an acceleration or deceleration operation by the mobile robot is planned. With this arrangement, the mobile robot performs the acceleration or deceleration operation according to the plan. As a result, the inclination of the pile in the region after the change has occurred in the inclination of the pile can be estimated accurately through the acceleration or deceleration operation.

In the above aspect, the estimation unit repeatedly may estimate the inclination of the pile while the mobile robot is accelerating or decelerating, and determines whether or not the change has occurred on a basis of a difference between the currently estimated inclination of the pile and the previously estimated inclination of the pile.

According to this aspect, the inclination of the pile is repeatedly estimated while the mobile robot is accelerating or decelerating. For this reason, it is possible to precisely determine whether or not a change has occurred in the inclination of the pile on the basis of the difference between the currently estimated inclination of the pile and the previously estimated inclination of the pile.

In the above aspect, the carpet may include a first carpet region and a second carpet region that neighbor each other and have mutually different inclinations of the pile, and the estimation unit additionally estimates that the mobile robot has moved over a boundary between the first carpet region and the second carpet region on a basis of the translational acceleration measured by the acceleration sensor while the mobile robot is moving at a constant velocity.

According to this aspect, in the case where the acceleration sensor measures a translational acceleration while the mobile robot is moving at a constant velocity and no translational acceleration is expected, it is estimated that the mobile robot has moved over the boundary between a first carpet region and a second carpet region in which the inclinations of the pile are different from each other. For this reason, the crossing of the boundary by the mobile robot can be detected appropriately.

In the above aspect, in a case of estimating that the mobile robot that had been moving in the first carpet region has moved over the boundary, the estimation unit may change an estimation result of the inclination of the pile to an estimation result of the inclination of the pile at a time when the mobile robot moved in the second carpet region.

According to this aspect, if it is estimated that the mobile robot that had been moving in the first carpet region has moved over the boundary between the first carpet region and the second carpet region, the estimation result of the inclination of the pile is changed to the estimation result of the inclination of the pile at a time when the mobile robot moved in the second carpet region. For this reason, the mobile robot is capable of rapidly obtaining an estimation result of the inclination of the pile in the second carpet region compared to the case of estimating the inclination of the pile every time the mobile robot moves in the second carpet region. As a result, the mobile robot is capable of moving on a more accurate path on the basis of the obtained estimation result when moving in the second carpet region.

In the above aspect, the plan may include causing the mobile robot to accelerate and decelerate in each of two directions perpendicular to each other.

According to this aspect, the inclination of the pile can be estimated on the basis of the translational acceleration measured by the acceleration sensor when the mobile robot accelerates and decelerates in each of two directions perpendicular to each other. With this arrangement, the inclination of the pile can be estimated precisely compared to the case of causing the mobile robot to perform acceleration and deceleration operations in one direction only.

First Embodiment

Hereinafter, a first embodiment of the present disclosure will be described in detail on the basis of the drawings. FIG. 1 is a diagram illustrating one example of a mechanism of a self-propelled cleaning robot 100, which is a mobile robot according to an embodiment of the present disclosure. FIG. 1 illustrates a top-down view of the internal structure of a self-propelled cleaning robot 100 in a state in which an external cover of the self-propelled cleaning robot 100 has been removed. The self-propelled cleaning robot 100 is a robot that cleans automatically while moving autonomously over a floor.

Specifically, as illustrated in FIG. 1, the self-propelled cleaning robot 100 is provided with a chassis 1, wheels 2a and 2b, wheel servo motors 3a and 3b, a caster 4, a suction device 6, a suction port 7, a control circuit board 8, a processing circuit 9, a motor driver 10, and a battery 11.

The chassis 1 is a base on which all of the mechanisms of the self-propelled cleaning robot 100 are mounted. The wheels 2a and 2b are wheels allowing the self-propelled cleaning robot 100 to move, and are driven by the wheel servo motors 3a and 3b, respectively. The cater 4 is a passive wheel that is driven in all directions in which the self-propelled cleaning robot 100 moves. The suction device 6 produces negative pressure with a fan motor not illustrated, and suctions garbage on the floor from the suction port 7 provided in the bottom face of the chassis 1.

The processing circuit 9 (a computer), the motor driver 10, and an acceleration sensor 5 are disposed on the control circuit board 8. The processing circuit 9 is provided with a CPU, volatile memory, and non-volatile memory not illustrated. The CPU executes a control program pre-stored in the non-volatile memory, the control program causing the self-propelled cleaning robot 100 to operate. With this arrangement, the processing circuit 9 controls various operations by the self-propelled cleaning robot 100. The motor driver 10 drives the suction device 6 under control by the processing circuit 9. The acceleration sensor 5 measures the translational acceleration of the self-propelled cleaning robot 100. The battery 11 supplies power to the control circuit board 8, the wheel servo motors 3a and 3b, and the suction device 6.

Note that the two-dimensional coordinate system (hereinafter, absolute coordinate system) $\Sigma$ illustrated in FIG. 1 is a fixed two-dimensional coordinate system containing two axes (x axis, y axis) orthogonal to each other in a plane parallel to the floor. A coordinate system (hereinafter, robot coordinate system) $\Sigma_R$ is a two-dimensional coordinate system that moves together with the movement of the self-propelled cleaning robot 100, and contains the two axes of an $x_R$ axis parallel to the forward direction of the self-propelled cleaning robot 100 and a $y_R$ axis orthogonal (perpendicular) to the $x_R$ axis in a plane parallel to the floor. Hereinafter, in cases where the superscript r is prefixed to a sign denoting a control parameter such as position, velocity, or acceleration, the control parameter denoted by the sign is taken to be a control parameter in the robot coordinate system $\Sigma_R$. On the other hand, a control parameter denoted by a sign not prefixed with the superscript r is taken to be a control parameter in the absolute coordinate system $\Sigma$.

Figure 2:
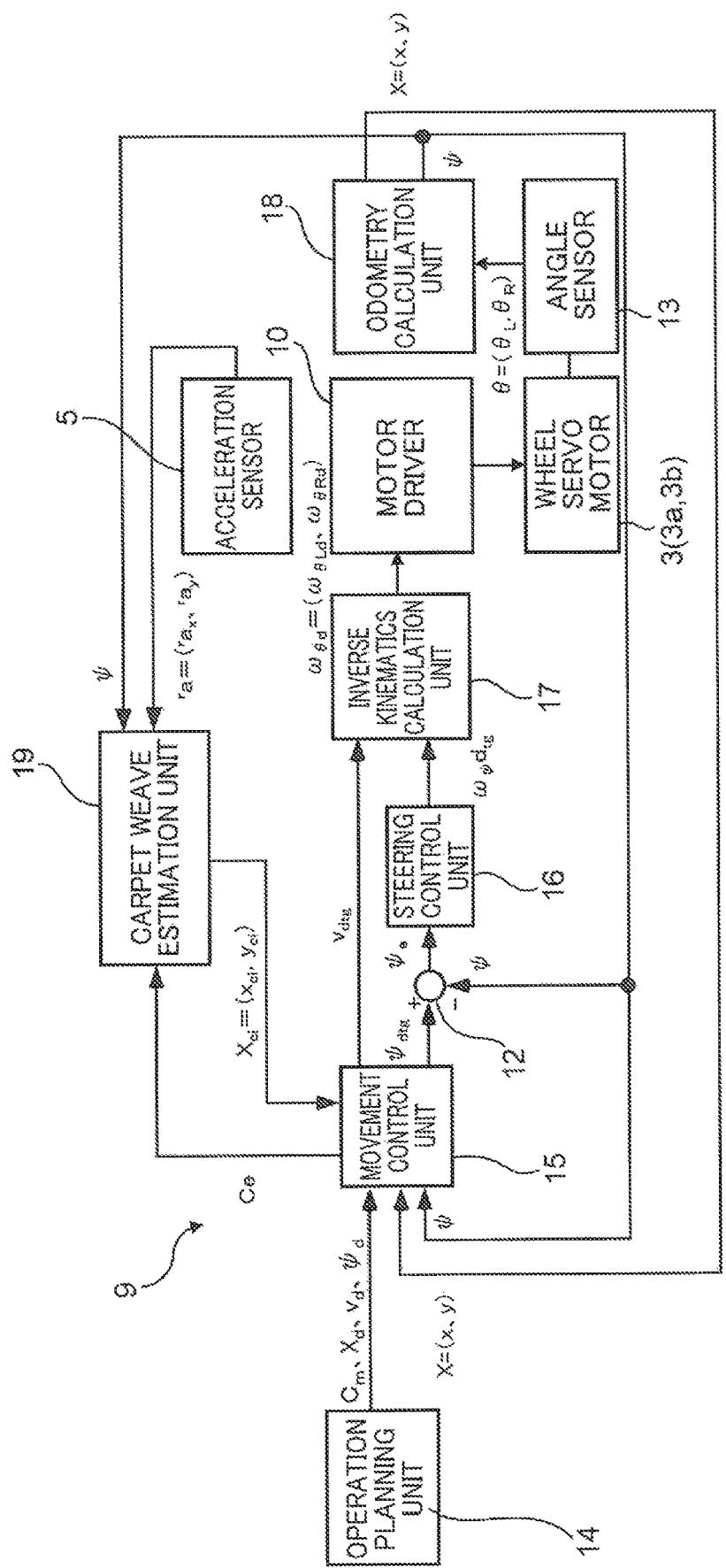
FIG. 2 is a block diagram of a control system of a self-propelled cleaning robot according to a first embodiment.

FIG. 2 is a block diagram of a control system of a self-propelled cleaning robot 100 according to a first embodiment. As illustrated in FIG. 2, by having the CPU execute the control program, the processing circuit 9 functions as an operation planning unit 14, a movement control unit 15, an error calculation unit 12, a steering control unit 16, an inverse kinematics calculation unit 17, an odometry calculation unit 18, and a carpet weave estimation unit 19 (estimation unit). The processing circuit 9 is communicably connected to the acceleration sensor 5, the motor driver 10, and an angle sensor 13.

The operation planning unit 14 fulfills the role of an intelligence unit of the self-propelled cleaning robot 100. Specifically, the operation planning unit 14 plans a path on which the self-propelled cleaning robot 100 is to move when cleaning. The operation planning unit 14 outputs a control mode command $C_m$, a target position $X_d=(x_d, y_d)$ of the self-propelled cleaning robot 100, a command movement velocity $v_d$, and a command direction angle $\psi_d$ corresponding to the planned path to the movement control unit 15. The method of planning a path by the operation planning unit 14 will be described later.

The movement control unit 15 controls the movement of the self-propelled cleaning robot 100. Specifically, the movement control unit 15 accepts the input from the operation planning unit 14 as well as the input of an inclination $X_{ci}=(x_{ci}, y_{ci})$ of the pile from the carpet weave estimation unit 19. The pile refers to the fibers of the carpet on which the self-propelled cleaning robot 100 moves, and includes styles such as cut pile and loop pile for example.

The inclination $X_{ci}$ of the pile is expressed as the degree to which the pile is inclined in the directions parallel to the two coordinate axes (x axis, y axis) of the absolute coordinate system $\Sigma$ (FIG. 1). For example, in the case where the pile is orthogonal (upright) with respect to the base of the carpet, the inclination $X_{ci}$ of the pile is expressed as $X_{ci}=(0, 0)$. Also, in the case where the pile is inclined by $x_1$ in the direction parallel to the x axis of the absolute coordinate system $\Sigma$ (hereinafter, the x direction), but is not inclined in the direction parallel to the y axis of the absolute coordinate system $\Sigma$ (hereinafter, the y direction), the inclination $X_{ci}$ of the pile is expressed as $X_{ci}=(x_1, 0)$. Also, in the case where the pile is inclined by $y_1$ in the y direction but is not inclined in the x direction, the inclination $X_{ci}$ of the pile is expressed as $X_{ci}=(0, y_1)$.

Note that the inclination of the pile is also expressed as the degree to which the pile is inclined in the directions parallel to the two coordinate axes ($x_R$ axis, $y_R$ axis) of the robot coordinate system $\Sigma_R$ (FIG. 1). In this case, the sign denoting the inclination of the pile is denoted $[X_{ci}$. In other words, in the case where the pile is orthogonal (upright) with respect to the base of the self-propelled cleaning robot 100, the inclination $[X_{ci}$ of the pile is expressed $'X_{ci}=(0, 0)$. Also, in the case where the pile is inclined by $x_2$ in the direction parallel to the $x_R$ axis of the robot coordinate system $\Sigma_R$ (hereinafter, the $x_R$ direction) (first direction), but is not inclined in the direction parallel to the $y_R$ axis of the robot coordinate system $\Sigma_R$ (hereinafter, the $y_R$ direction) (second direction), the inclination $'X_{ci}$ of the pile is expressed $'X_{ci}=(x_2, 0)$. Also, in the case where the pile is inclined by $y_2$ in the $y_R$ direction but is not inclined in the $x_R$ direction, the inclination $'X_{ci}$ of the pile is expressed as $[X_{ci}=(0, y_2)$.

The movement control unit 15 additionally accepts the input of a current position $X=(x, y)$ and a current direction angle $\psi$ of the self-propelled cleaning robot 100 from the odometry calculation unit 18.

On the basis of the input control parameters described above, the movement control unit 15 computes a target movement velocity $v_{dtg}$ and a target direction angle $\psi_{dtg}$ of the self-propelled cleaning robot 100. The movement control unit 15 outputs the computed target movement velocity $V_{dtg}$ to the inverse kinematics calculation unit 17, and outputs the computed target direction angle $\psi_{dtg}$ to the error calculation unit 12.

With this arrangement, the error calculation unit 12, the steering control unit 16, the inverse kinematics calculation unit 17, and the motor driver 10 which are located on and after the error calculation unit 12 and the inverse kinematics calculation unit 17 process control parameters based on the target movement velocity $v_{dtg}$ and the target direction angle $\psi_{dtg}$. As a result, the movement of the self-propelled cleaning robot 100 is controlled such that the movement velocity of the self-propelled cleaning robot 100 approaches the target movement velocity $v_{dtg}$ and the movement direction of the self-propelled cleaning robot 100 approaches the target direction angle $\psi_{dtg}$.

Furthermore, the movement control unit 15 controls the estimation of the inclination $X_{ci}$ of the pile by the carpet weave estimation unit 19. Specifically, the movement control unit 15 outputs an estimation command $C_e$ directing the carpet weave estimation unit 19 to estimate the inclination $X_{ci}$ of the pile, thereby causing the carpet weave estimation unit 19 to estimate the inclination $X_{ci}$ of the pile.

The error calculation unit 12 computes an error $\psi_e$ between the target direction angle $\psi_{dtg}$ computed by the movement control unit 15 and the current direction angle $\psi$.

The steering control unit 16 controls the steering of the self-propelled cleaning robot 100. Specifically, the steering control unit 16 computes a target direction angular velocity $\omega_\psi d_{tg}$ on the basis of the error $\psi_e$ computed by the error calculation unit 12. The target direction angular velocity $\omega_\psi d_{tg}$ refers to the angular velocity when turning the self-propelled cleaning robot 100 in order to change the movement direction of the self-propelled cleaning robot 100 from the direction indicated by the current direction angle $\psi$ to the direction indicated by the target direction angle $\psi_{dtg}$.

The inverse kinematics calculation unit 17 controls the rotation of the wheels 2a and 2b (FIG. 1) of the self-propelled cleaning robot 100. Specifically, the inverse kinematics calculation unit 17 computes a target rotational angular velocity $\omega_{\theta Ld}$ of the left wheel 2a (FIG. 1) and a target rotational angular velocity $\omega_{\theta R\_d}$ of the right wheel 2b (FIG. 1) on the basis of the target movement velocity $v_{dtg}$ and the target direction angular velocity $\omega_\psi d_{tg}$.

The motor driver 10 accepts the input of the target rotational angular velocity $\omega_{\theta d}=(\omega_{\theta Ld}, \omega_{\theta Rd})$ of the wheels 2a and 2b (FIG. 1) computed by the inverse kinematics calculation unit 17. The motor driver 10 rotationally drives the wheel servo motors 3a and 3b according to the input target rotational angular velocity $\omega_{\theta d}$. The angle sensor 13 that detects the rotational angle of the wheel servo motors 3a and 3b is provided near the rotating shafts of the wheel servo motors 3a and 3b. The angle sensor 13 outputs the detected rotational angle at the current time (hereinafter, the current rotational angle) $\theta=(\theta_L, \theta_R)$ of the wheel servo motors 3a and 3b to the odometry calculation unit 18.

On the basis of the current rotational angle $\theta_L$ of the left wheel 2a (FIG. 1) and the current rotational angle $\theta_R$ of the right wheel 2b (FIG. 1), the odometry calculation unit 18 computes the current position $X=(x, y)$ and the current direction angle $\psi$ of the self-propelled cleaning robot 100. The current position $X=(x, y)$ is the position of the origin of the robot coordinate system $\Sigma_R$ (FIG. 1) in the absolute coordinate system $\Sigma$ (FIG. 1). The position of the origin of the robot coordinate system $\Sigma_R$ (FIG. 1) is the position where the $x_R$ axis and the $y_R$ axis intersect. The current direction angle $\psi$ is the angle obtained between the x direction in the absolute coordinate system $\Sigma$ (FIG. 1) and the $x_R$ direction in the robot coordinate system $\Sigma_R$ (FIG. 1).

The carpet weave estimation unit 19 estimates the inclination $X_{ci}$ of the pile on the basis of the estimation command $C_e$ input from the movement control unit 15. Specifically, when the estimation command $C_e$ directing the carpet weave estimation unit 19 to estimate the inclination $X_{ci}$ of the pile is input, the carpet weave estimation unit 19 estimates the inclination $X_{ci}=(x_{ci}, y_{ci})$ of the pile on the basis of a translational acceleration $\lceil a=(\lceil a_x, \lceil a_y)$ of the self-propelled cleaning robot 100 calculated by the acceleration sensor 5 and the current direction angle $\omega$ computed by the odometry calculation unit 18. The carpet weave estimation unit 19 outputs the estimated inclination $X_{ci}=(x_{ci}, y_{ci})$ of the pile to the movement control unit 15 as the estimation result of the inclination $X_{ci}$ of the pile.

(Details about Control Modes)

Next, details about control modes will be described. The movement control unit 15 causes the self-propelled cleaning robot 100 to move according to one of two control modes, namely a straight-ahead mode and a turning mode. The movement control unit 15 switches the control mode according to the control mode command $C_m$ input from the operation planning unit 14, and controls the movement of the self-propelled cleaning robot 100 on the basis of the control parameters input from the operation planning unit 14.

In the case where the control mode is the straight-ahead mode, the movement control unit 15 causes the self-propelled cleaning robot 100 to move straight ahead at the command movement velocity $v_d$. Specifically, when the control mode is switched to the straight-ahead mode, the movement control unit 15 computes the target movement velocity $v_{dtg}$ using the following Formula (1) every time a predetermined control time (sampling time) elapses.

[Math. 1]

$$V_{dtg}=v_d-K_v(v_d-v_{dtg\_prv}) \quad (1)$$

In Formula (1), $v_{dtg\_prv}$ indicates the target movement velocity $v_{dtg}$ previously computed by the movement control unit 15. $K_v$ is a gain constant used for proportional control of the movement velocity of the self-propelled cleaning robot 100. The value of $K_v$ is smaller than 1, and is adjusted and decided by experiment.

On the other hand, the movement control unit 15 keeps the target direction angle $\psi_{dtg}$ at the value computed in the last control mode, and outputs the target direction angle $\psi_{dtg}$ to the error calculation unit 12. With this arrangement, the movement control unit 15 causes the error $\omega_e$ computed by the error calculation unit 12 to approach 0.

Figure 3:
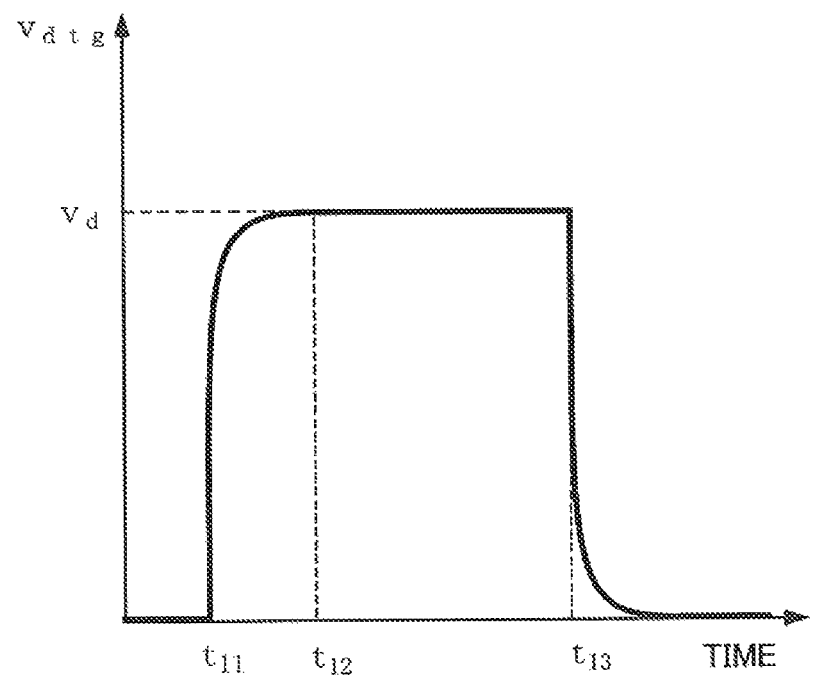
FIG. 3 is a diagram illustrating an acceleration/deceleration pattern of a self-propelled cleaning robot.

FIG. 3 is a diagram illustrating an acceleration/deceleration pattern of a self-propelled cleaning robot 100. In the case where the control mode is the straight-ahead mode, the self-propelled cleaning robot 100 moves straight ahead with an acceleration/deceleration pattern as illustrated in FIG. 3. The vertical axis in FIG. 3 represents the target movement velocity $V_{dtg}$ of the self-propelled cleaning robot 100, while the horizontal axis of FIG. 3 represents time.

Specifically, as illustrated in FIG. 3, when the control mode command $C_m$ directing the movement control unit 15 to switch the control mode to the straight-ahead mode is input (time $t_{11}$), every time the control time elapses, the movement control unit 15 computes the target movement velocity $v_{dtg}$ using Formula (1), and outputs the computed target movement velocity $V_{dtg}$ to the inverse kinematics calculation unit 17. Also, the movement control unit 15 outputs the target direction angle $\psi_{dtg}$ computed in the last control mode to the error calculation unit 12.

The target direction angle $\psi_{dtg}$ is in the absolute coordinate system Σ, and in the last control mode, the current direction angle ψ of the self-propelled cleaning robot 100 is the target direction angle $\psi_{dtg}$. As a result, the self-propelled cleaning robot 100 moves straight ahead while accelerating, and the movement velocity of the self-propelled cleaning robot 100 reaches the command movement velocity $v_d$ (time $t_{12}$). Thereafter, every time the control time elapses, the movement control unit 15 uses Formula (1) to compute the target movement velocity $v_{dtg}$. Also, the movement control unit 15 outputs the target direction angle $\psi_{dtg}$ computed in the last control mode to the error calculation unit 12. With this arrangement, the self-propelled cleaning robot 100 moves straight ahead at a constant command movement velocity $v_d$ without turning.

After that, the movement control unit 15 computes a distance ΔX from the current position X input from the odometry calculation unit 18 to the target position $X_d$ input from the operation planning unit 14. When ΔX becomes shorter than a predetermined distance (for example, 5 mm), the movement control unit 15 determines that the self-propelled cleaning robot 100 has reached the target position $X_d$. Additionally, the movement control unit 15 sets the command movement velocity $v_d$ in Formula (1) to 0 (time $t_{13}$). With this arrangement, the target movement velocity $V_{dtg}$ computed by the movement control unit 15 falls, and the self-propelled cleaning robot 100 decelerates. As a result, the movement of the self-propelled cleaning robot 100 is stopped.

On the other hand, in the case where the control mode is the turning mode, the operation planning unit 14 uses Formula (2) below to compute the command direction angle yid for moving the self-propelled cleaning robot 100 from the current position X=(x, y) to the next target position $X_d=(x_d, y_d)$, and sets the command movement velocity $v_d$ to 0.

[Math 2]

$$\psi_d = \tan^{-1}\left(\frac{y_d - y}{x_d - x}\right) \quad (2)$$

The movement control unit 15 causes the self-propelled cleaning robot 100 to perform a 7pivot turn at a constant command turning velocity $\omega_{dtg}$ until the direction of the self-propelled cleaning robot 100 changes from the current direction angle ψ input from the odometry calculation unit 18 to the command direction angle $\psi_d$ set by the operation planning unit 14. In the pivot turn, the movement control unit 15 uses Formula (3) below to compute the target direction angle $\psi_{dtg}$ to output to the steering control unit 16.

[Math. 3]

$$\psi_{dtg}=\psi_{dtg\_prv}+\omega_{dtg}\Delta t \quad (3)$$

In Formula (3), $\psi_{dtg\_prv}$ represents the target direction angle $\psi_{dtg}$ previously computed by the movement control unit 15. Also, Δt represents the control time (sampling time).

Finally, the motor driver 10 is driven on the basis of the control parameters output by each of the above function units. The motor driver 10 rotationally drives the left and right wheel servo motors 3a and 3b. Specifically, the motor driver 10 accepts the input of the target rotational angular velocity $\omega_{\theta d}=(\omega_{\theta Ld}, \omega_{\theta Rd})$ computed by the inverse kinematics calculation unit 17. The motor driver 10 rotationally drives the wheel servo motors 3a and 3b such that the rotational angular velocity of the wheel servo motors 3a and 3b approaches the input target rotational angular velocity $\omega_{\theta d}$.

The angle sensor 13 detects the current rotational angle $\theta=(\theta_L, \theta_R)$ of the wheel servo motors 3a and 3b, and outputs the detected current rotational angle θ to the odometry calculation unit 18.

The odometry calculation unit 18 computes the current position X=(x, y) and the current direction angle ψ by using time derivatives ($\theta_L$ dot, $\theta_R$ dot) of the current rotational angle $\theta=(\theta_L, \theta_R)$ input from the angle sensor 13 that indicate the current rotational angular velocity of the wheel servo motors 3a and 3b, and Formulas (4) to (8) below. The odometry calculation unit 18 outputs the computed current position X=(x, y) to the movement control unit 15, and outputs the computed current direction angle ω to the error calculation unit 12, the movement control unit 15, and the carpet weave estimation unit 19.

[Math. 4]

$$x = \int \Delta x \cos\psi \, dt \quad (4)$$

[Math. 5]

$$y = \int \Delta y \sin\psi \, dt \quad (5)$$

[Math. 6]

$$\psi = R_w \int \frac{\dot{\theta}_L - \dot{\theta}_R}{L_t} dt \quad (6)$$

[Math. 7]

$$\Delta x = \left(\frac{L_t}{2} + \frac{R_w \dot{\theta}_L}{\Delta \psi}\right) \sin\Delta\psi \quad (7)$$

[Math. 8]

$$\Delta\psi = \frac{R_w}{L_t}(\dot{\theta}_L - \dot{\theta}_R) \quad (8)$$

Note that in Formulas (6) to (8) above, $R_w$ represents the radius of the wheels 2a and 2b, and $L_t$ represents the distance between the centers of the contact areas of the wheels 2a and 2b (tread).

(Flow of Cleaning Operation)

Figure 4:
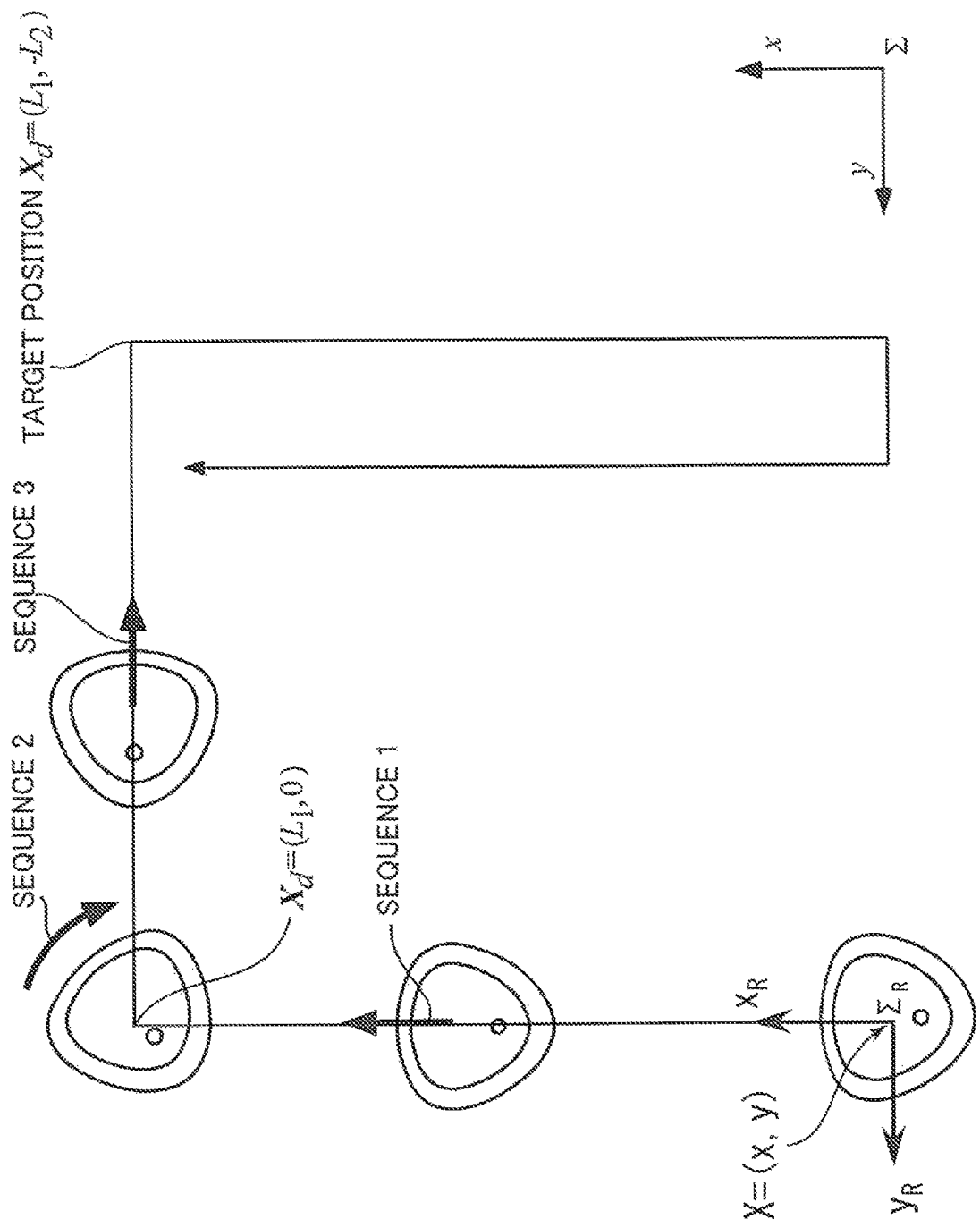
FIG. 4 is a diagram illustrating one example of a path on which the self-propelled cleaning robot according to the first embodiment moves during a cleaning operation.
Figure 5:
FIG. 5 is a diagram illustrating one example of an operation sequence table according to the first embodiment.
Figure 6:
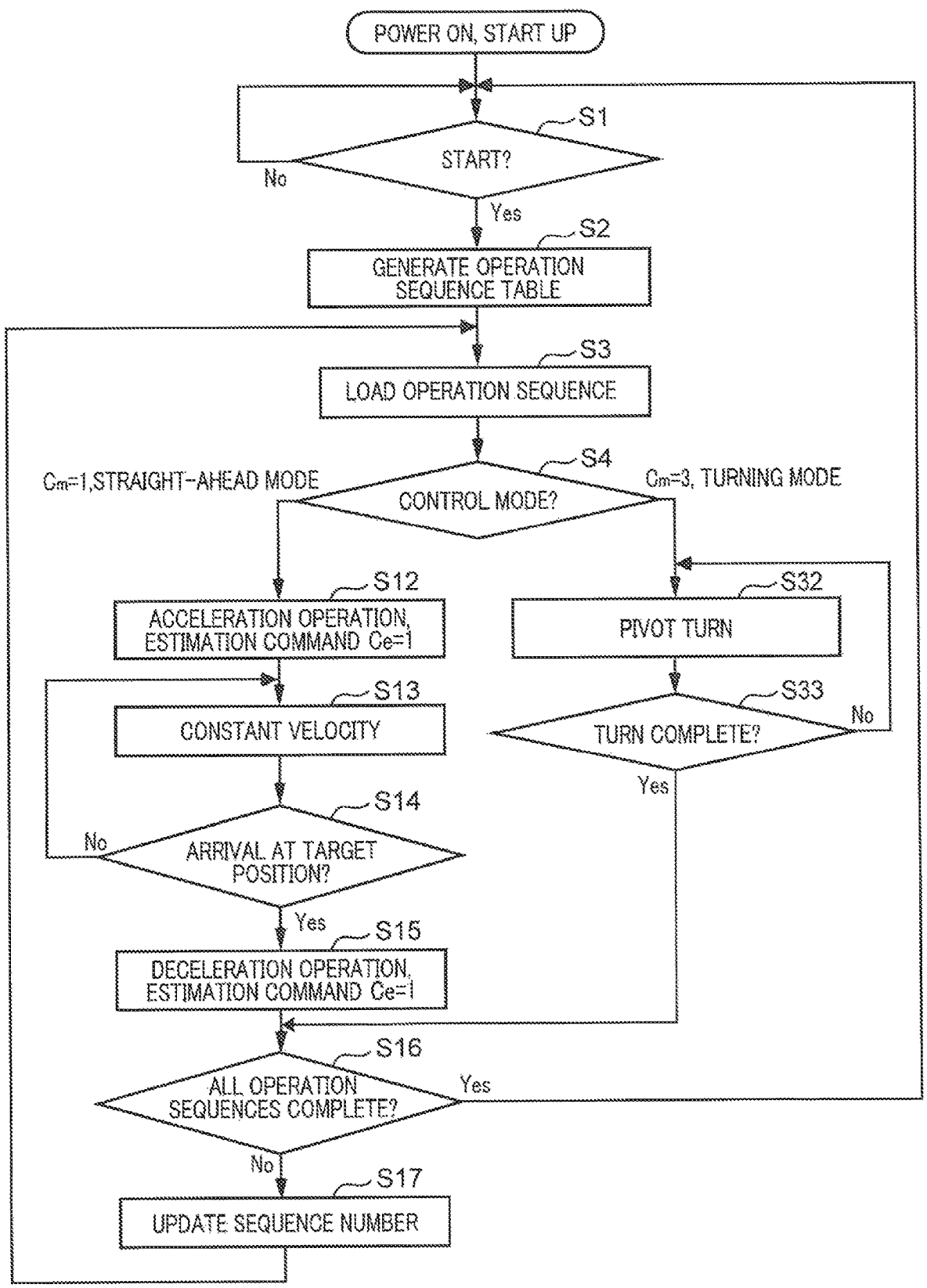
FIG. 6 is a flowchart illustrating one example of a cleaning operation by the self-propelled cleaning robot according to the first embodiment.

Next, as an example of a cleaning operation performed by the self-propelled cleaning robot 100, a cleaning operation that the self-propelled cleaning robot 100 performs while moving on the path illustrated in FIG. 4 will be described with reference to FIGS. 5 and 6. FIG. 4 is a diagram illustrating one example of a path on which the self-propelled cleaning robot 100 according to the first embodiment moves during a cleaning operation. FIG. 5 is a diagram illustrating one example of an operation sequence table T1 according to the first embodiment. FIG. 6 is a flowchart illustrating one example of a cleaning operation by the self-propelled cleaning robot 100 according to the first embodiment.

In the self-propelled cleaning robot 100 of the present embodiment, first, information (hereinafter, an operation sequence) related to the path on which the self-propelled cleaning robot 100 is to move during the cleaning operation is generated by the operation planning unit 14. The cleaning operation by the self-propelled cleaning robot 100 is then achieved by having the processing circuit 9 control the suction device 6 (FIG. 1) while the movement control unit 15 causes the self-propelled cleaning robot 100 to move on the path indicated by the generated operation sequence.

Specifically, as illustrated in FIG. 6, when a power button not illustrated that is provided on the self-propelled cleaning robot 100 is pressed, a supply of power from the battery 11 (FIG. 1) to the control circuit board 8, the wheel servo motors 3a and 3b, and the suction device 6 (FIG. 1) is started, and the self-propelled cleaning robot 100 starts up. With this arrangement, the processing circuit 9 disposed on the control circuit board 8 enters a standby state.

After that, when a start button not illustrated that is provided on the self-propelled cleaning robot 100 is pressed by a user (step S1, Yes), the self-propelled cleaning robot 100 starts the cleaning operation. Note that the processing circuit 9 treats the position and attitude in the robot coordinate system $\Sigma_R$ at the time when the start button is pressed, as the position and attitude in the absolute coordinate system $\Sigma$.

When the cleaning operation is started, the operation planning unit 14 generates an operation sequence table T1 (step S2). The operation sequence table T1 is a table stipulating an operation sequence related to each of one or more paths on which the self-propelled cleaning robot 100 consecutively moves during the cleaning operation. Specifically, in step S2, the operation planning unit 14 generates the operation sequence table T1 by reading one or more operation sequences pre-stored in the non-volatile memory provided in the processing circuit 9.

As illustrated in FIG. 5, an operation sequence related to each of one or more paths on which the self-propelled cleaning robot 100 moves during the cleaning operation is set in the operation sequence table T1. The operation sequence includes a sequence number (for example, 1) indicating the order in which the self-propelled cleaning robot 100 moves on each path, the target position $X_d=(X_d, y_d)$ (for example, $(L_1, 0)$) that acts as the end point of each path, the command movement velocity $v_d$ (for example, $v_L$) and the command direction angle $\psi_d$ (for example, 0) when the self-propelled cleaning robot 100 moves on each path, and the control mode command $C_m$ (for example, 1).

After step S2, the operation planning unit 14 consecutively loads, according to the sequence number, an operation sequence that has not been loaded yet from the operation sequence table T1 generated in step S2 (step S3). Specifically, in the case of executing step S3 for the first time after the end of step S2, the operation planning unit 14 loads the operation sequence whose sequence number is set to "1" (FIG. 5). Additionally, the operation planning unit 14 outputs the control mode command $C_m$, the target position $X_d$, the command movement velocity $v_d$, and the command direction angle $\psi_d$ included in the loaded operation sequence to the movement control unit 15.

On the basis of the control mode command $C_m$ input from the operation planning unit 14, the movement control unit 15 determines which control mode to switch to (step S4). In the present embodiment, in the case where the control mode command $C_m$ with a value of "1" is input into the movement control unit 15, in step S4, the movement control unit 15 determines that a switch to the straight-ahead mode ($C_m=1$) has been indicated ($C_m=1$, straight-ahead mode). On the other hand, in the case where the control mode command $C_m$ with a value of "3" is input into the movement control unit 15, in step S4, the movement control unit 15 determines that a switch to the turning mode ($C_m=3$) has been indicated ($C_m=3$, turning mode). Note that the values of the control mode command $C_m$ are not limited to "1" and "3" above, and may be changed appropriately.

Assume that in step S4, the movement control unit 15 determines that a switch to the straight-ahead mode is indicated (in step S4, $C_m=1$, straight-ahead mode). In this case, as described above, the movement control unit 15 uses the target position $X_d$ and the command movement velocity $v_d$ input in step S3 to cause the self-propelled cleaning robot 100 to move in the straight-ahead mode. With this arrangement, when the self-propelled cleaning robot 100 starts an acceleration operation, the movement control unit 15 sets the estimation command $C_e$ to "1", and outputs the set estimation command $C_e$ to the carpet weave estimation unit 19 (FIG. 2) (step S12). With this arrangement, the carpet weave estimation unit 19 estimates the inclination $X_{ci}$ of the pile.

After that, when the movement velocity of the self-propelled cleaning robot 100 reaches the command movement velocity $v_d$, the self-propelled cleaning robot 100 ends the acceleration operation and moves at a constant velocity according to the command movement velocity $v_d$ (step S13). Note that in step S13, if the inclination $X_{ci}$ of the pile estimated by the carpet weave estimation unit 19 is input, the movement control unit 15 corrects the target movement velocity $v_{dtg}$ and the target direction angle $\psi_{dtg}$ on the basis of the input inclination $X_{ci}$ of the pile. Details about the correction method will be described later.

After that, as described above, when the distance from the current position X of the self-propelled cleaning robot 100 to the target position $X_d$ input in step S3 becomes shorter than a predetermined distance (for example, 5 mm), the movement control unit 15 determines that the self-propelled cleaning robot 100 has reached the target position $X_d$ (step S14, Yes).

In this case (step S14, Yes), the movement control unit 15 lowers the target movement velocity $v_{dtg}$ by setting the command movement velocity $v_d$ to "0" in Formula (1) above. With this arrangement, when the self-propelled cleaning robot 100 starts a deceleration operation, the movement control unit 15 sets the estimation command $C_e$ to "1", and outputs the set estimation command Cc to the carpet weave estimation unit 19 (step S15). With this arrangement, the carpet weave estimation unit 19 estimates the inclination $X_{ci}$ of the pile.

Note that in step S15, if the inclination $X_{ci}$ of the pile estimated by the carpet weave estimation unit 19 is input during the deceleration operation by the self-propelled cleaning robot 100, the movement control unit 15 corrects the target movement velocity $v_{dtg}$ and the target direction angle $\psi_{dtg}$ on the basis of the input inclination $X_{ci}$ of the pile. Details about the correction method will be described later.

After that, when the self-propelled cleaning robot 100 stops, the operation planning unit 14 determines whether or not the movement by the self-propelled cleaning robot 100 has been completed on the basis of all of the operation sequences included in the operation sequence table T1 (step S16).

Specifically, in step S16, in the case where an operation sequence that has not been loaded in step S3 exists among all of the operation sequences included in the operation sequence table T1, the operation planning unit 14 determines that the movement by the self-propelled cleaning robot 100 has not been completed (step S16, No). In this case, the operation planning unit 14 updates the sequence number to a number indicating the next movement step (step S17). After that, the process from step S3 is performed. In step S3, the operation planning unit 14 loads the operation sequence whose sequence number is the updated sequence number set in step S17.

On the other hand, in step S16, in the case where an operation sequence that has not been loaded in step S3 does not exist among all of the operation sequences included in the operation sequence table T1, the operation planning unit 14 determines that the movement by the self-propelled cleaning robot 100 has been completed (step S16, Yes). In this case, the process proceeds to step S1, and the processing circuit 9 returns to the standby state.

Also, in step S4, in the case where the movement control unit 15 determines that a switch to the turning mode is indicated (in step S4, $C_m=3$, turning mode), as described above, the movement control unit 15 uses the command direction angle $\psi_d$ input in step S3 to cause the self-propelled cleaning robot 100 to perform a pivot turn (step S32).

When the movement control unit 15 determines that the pivot turn by the self-propelled cleaning robot 100 in step S32 has been completed (step S33, Yes), the process from step S16 is performed.

(Specific Example of Movement)

Next, a specific example of moving in accordance with the flow described above when the self-propelled cleaning robot 100 cleans will be described. In this specific example, the self-propelled cleaning robot 100 is assumed to move on the path illustrated in FIG. 4 when cleaning. Correspondingly, in step S2, it is assumed that the operation sequence table T1 illustrated in FIG. 5 is generated.

In this case, in step S3 performed initially, the operation sequence whose sequence number is set to "1" is loaded from the operation sequence table T1 (FIG. 5). The operation sequence is information related to the path "Sequence 1" in FIG. 4. The control mode command $C_m$ included in the operation sequence has a value of "1". For this reason, in step S4, it is determined that a switch to the straight-ahead mode ($C_m=1$) is indicated ($C_m=1$, straight-ahead mode).

After that, the process from step S12 is performed, and the self-propelled cleaning robot 100 starts moving in the straight-ahead mode. With this arrangement, the self-propelled cleaning robot 100 accelerates until the movement velocity reaches the command movement velocity $v_d$. Also, the estimation command $C_e$ directing the carpet weave estimation unit 19 to estimate the inclination $X_{ci}$ of the pile is output to the carpet weave estimation unit 19 (step S12). With this arrangement, the inclination $X_{ci}$ of the pile is estimated by the carpet weave estimation unit 19. After accelerating up to the command movement velocity $v_d$, the self-propelled cleaning robot 100 moves at a constant velocity (step S13).

Here, it is assumed that the estimation result of the inclination $X_{ci}$ of the pile is input into the movement control unit 15 while the self-propelled cleaning robot 100 is moving at a constant velocity. In this case, the target movement velocity $V_{dtg}$ and the target direction angle $\psi_{dtg}$ are corrected by the movement control unit 15 on the basis of the inclination $X_{ci}$ of the pile.

After that, when it is determined that the self-propelled cleaning robot 100 has reached the target position $X_d=(L_1, 0)$ (step S14, Yes), the self-propelled cleaning robot 100 starts a deceleration operation. Also, the estimation command $C_e$ directing the carpet weave estimation unit 19 to estimate the inclination $X_{ci}$ of the pile is output to the carpet weave estimation unit 19 (step S15). Here, it is assumed that the estimation result of the inclination $X_{ci}$ of the pile is input into the movement control unit 15 while the self-propelled cleaning robot 100 is performing the deceleration operation. Likewise, in this case, the target movement velocity $V_{dtg}$ and the target direction angle $\psi_{dtg}$ are corrected by the movement control unit 15 on the basis of the input inclination $X_{ci}$ of the pile.

After that, it is determined that the movement by the self-propelled cleaning robot 100 has not been completed (step S16, No), and the sequence number is updated to the number "2" indicating the next movement step (step S17).

Additionally, the process from step S3 is performed, and in step S3, the operation sequence whose sequence number is set to "2" is loaded from the operation sequence table T1 (FIG. 5). The operation sequence is information related to the path "Sequence 2" in FIG. 4. Because the control mode command $C_m$ included in the operation sequence has a value of "3", in step S4, it is determined that a switch to the turning mode ($C_m=3$) is indicated ($C_m=3$, turning mode).

As a result, the process from step S32 is performed, and in step S32, the command direction angle $\psi_d$ of "−90" included in the operation sequence loaded in step S3 is used, and the self-propelled cleaning robot 100 is made to perform a pivot turn clockwise by "90" degrees.

Thereafter, the process from step S3 is performed similarly, and in step S3, the operation sequence whose sequence number is set to "3" is loaded from the operation sequence table T1 (FIG. 5). The operation sequence is information related to the path "Sequence 3" in FIG. 4. In this case, because the control mode command $C_m$ included in the operation sequence has a value of "1", like the operation sequence of the path "Sequence 1" in FIG. 4, the self-propelled cleaning robot 100 moves in the straight-ahead mode until reaching the target position $X_d=(L_1, -L_2)$ included in the operation sequence. Thereafter, the process from step S3 is performed similarly using each operation sequence set in the operation sequence table T1. As a result, the self-propelled cleaning robot 100 moves along the path in FIG. 4 during the cleaning operation.

(Estimating Inclination of Pile)

Figure 7:
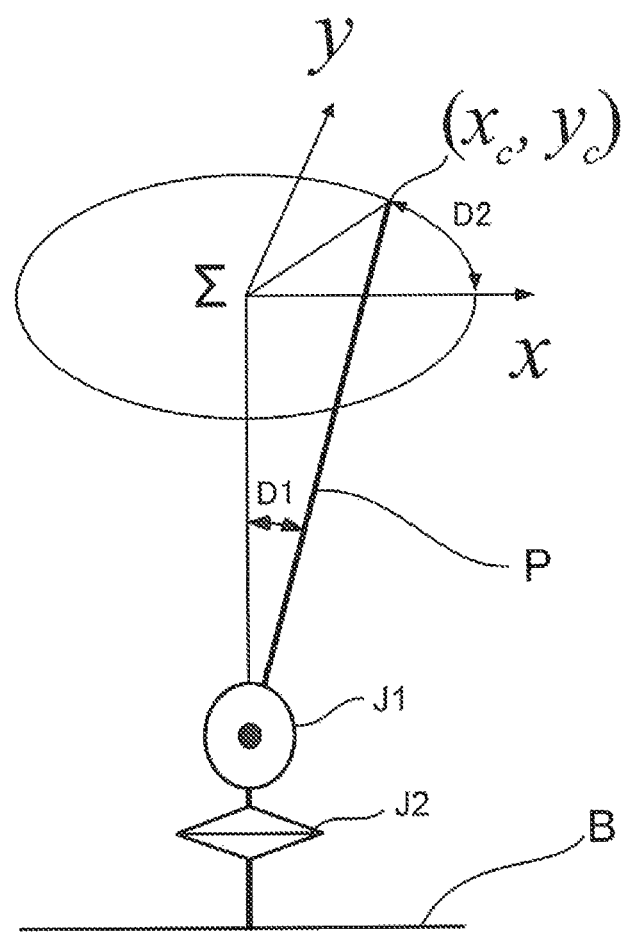
FIG. 7 is a diagram illustrating one example of a two degree-of-freedom model approximating the pile of a carpet.

Next, the inclination $X_{ci}$ of the pile estimated by the carpet weave estimation unit 19 will be described. FIG. 7 is a diagram illustrating one example of a two degree-of-freedom model approximating the pile P of a carpet. As illustrated in FIG. 7, the pile P of a carpet can be approximated by a rigid bar in a two degree-of-freedom model coupled to a base B. In other words, the pile P is assumed to be freely pivotable in two arrow directions D1 and D2 through two joints J1 and J2 having viscoelastic properties.

Because of the structure of carpet, the pile P of the carpet is inclined in a certain specific direction in the initial state. When the wheels 2a and 2b of the self-propelled cleaning robot 100 pass over the pile P, the inclination of the pile P changes. As described above, the inclination of the pile P can be expressed by the degree of inclination ($X_c=(x_c, y_c)$) in each of the x direction and the y direction in the absolute coordinate system $\Sigma$.

If the equation of motion for the self-propelled cleaning robot 100, the geometric constraint relationship between the self-propelled cleaning robot 100 and the pile P, and the above two degree-of-freedom model are used, it is possible to simulate a pile inclination $X_c$ when the self-propelled cleaning robot 100 moves over the carpet with numerical operations.

Figure 8:
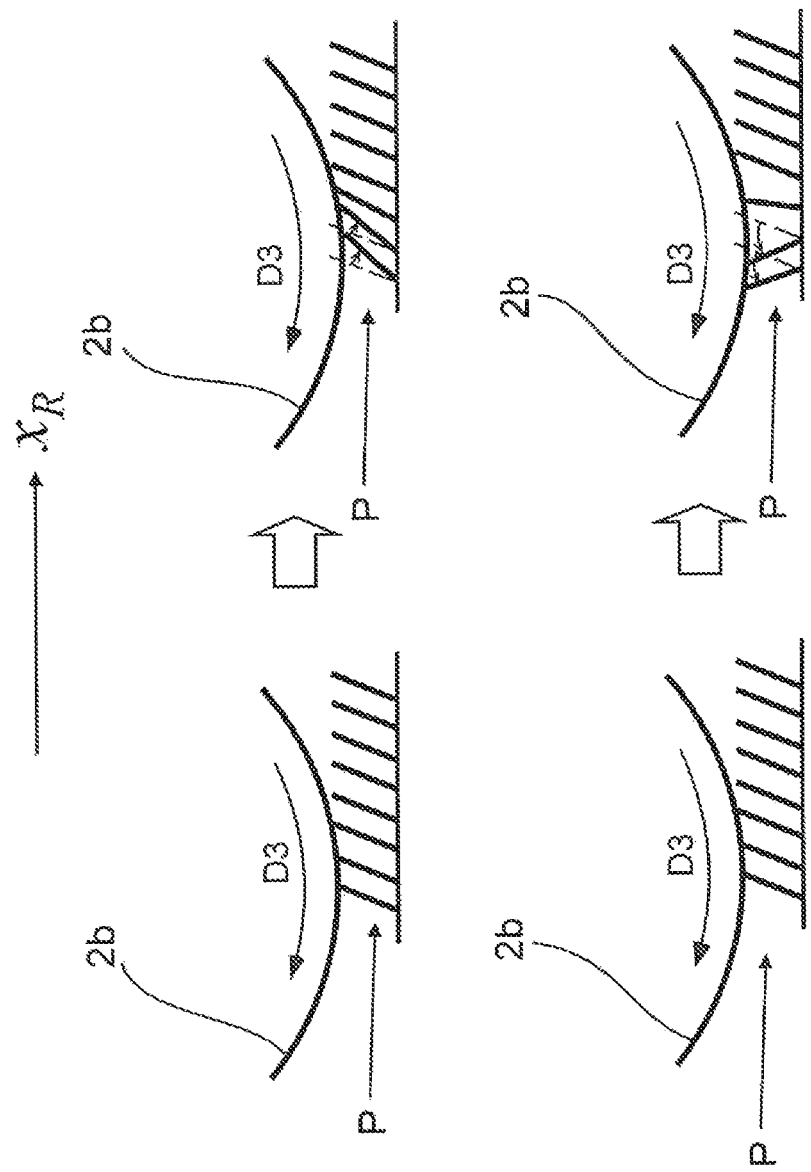
FIG. 8 is a diagram explaining the behavior of the pile of a carpet.
Figure 9:
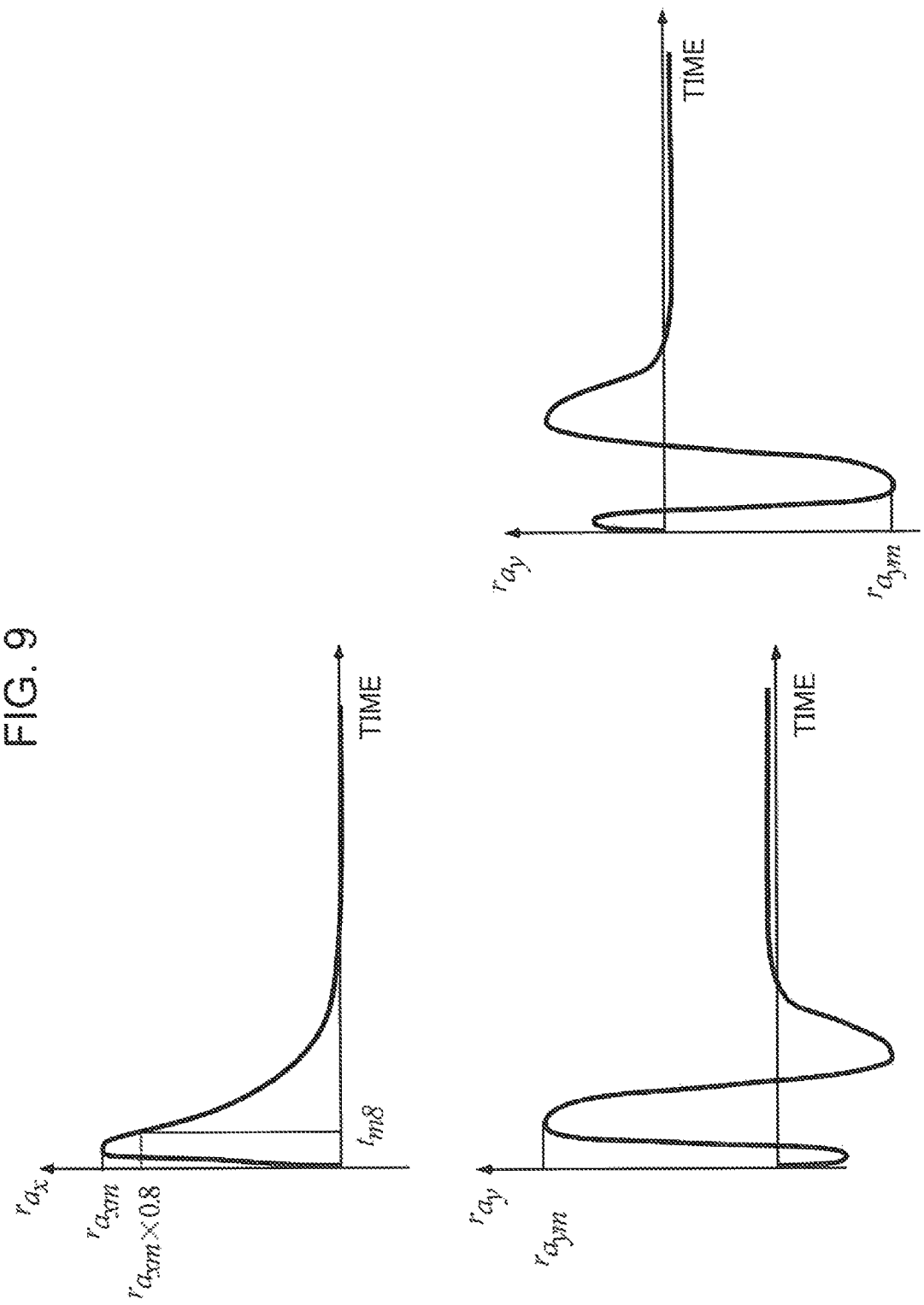
FIG. 9 is a diagram illustrating one example of simulation results of the translational acceleration of a self-propelled cleaning robot.
Figure 10:
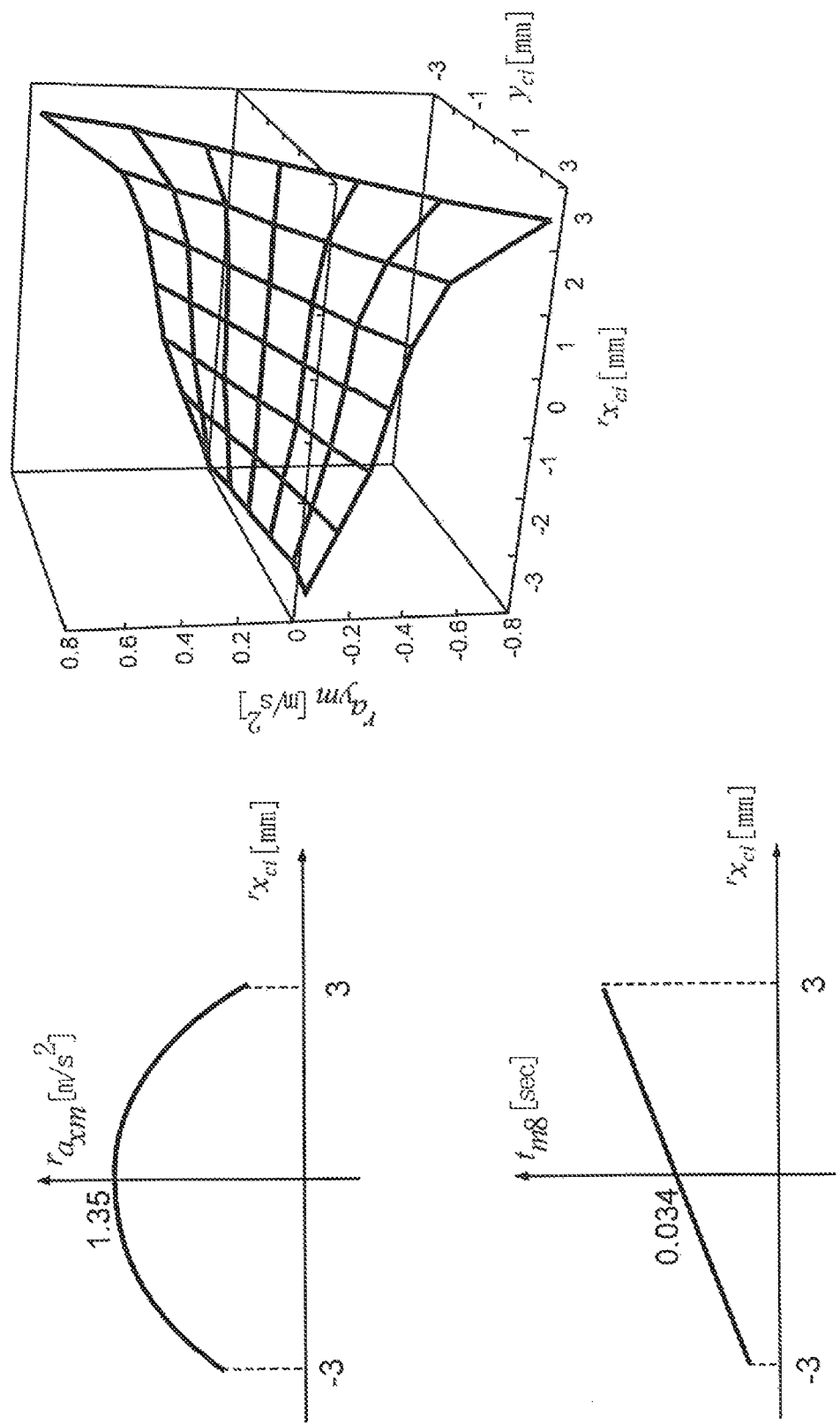
FIG. 10 is a diagram illustrating one example of simulation results of a maximum value of the translational acceleration of a self-propelled cleaning robot.

On example of the simulation results is illustrated in FIGS. 8, 9, and 10. FIG. 8 is a diagram explaining the behavior of the pile P of a carpet. FIG. 9 is a diagram illustrating one example of simulation results of the translational acceleration ⌈a of a self-propelled cleaning robot 100. FIG. 10 is a diagram illustrating one example of simulation results of a maximum value of the translational acceleration ⌈a of a self-propelled cleaning robot 100.

Note that the simulation presupposes that the self-propelled cleaning robot 100 moves over a typical carpet. Specifically, it is assumed that the weight of the self-propelled cleaning robot 100 is 4 kg and the maximum outer radius is 30 cm, similar to typical cleaning robots for home use. Also, it is assumed that the length of the pile P (the length of the fibers of the carpet, hereinafter the pile length) is 7 mm, and the interval at which the fibers of the pile P are arranged (hereinafter, the pile pitch) is 3 mm. Also, it is assumed that the elastic modulus of the pile P is 0.03 N/rad, and the viscous modulus of the pile P is 0.05 N/rad. Furthermore, FIGS. 9 and 10 illustrate simulation results of the translational acceleration ⌈a of the self-propelled cleaning robot 100 and the maximum value thereof in the case where the command movement velocity $v_d$ is set to 0.12 m/s.

The upper diagrams in FIG. 8 illustrate the simulation result of the behavior of the pile P in the $y_R$ direction when the self-propelled cleaning robot 100 is moving at a constant velocity. As illustrated in the upper-left diagram in FIG. 8, assume that the wheel 2b rotating at a constant velocity in the arrow direction D3 moves over the pile P, which is slightly inclined in the $x_R$ direction. In this case, as illustrated in the upper-right diagram in FIG. 8, the weight of the self-propelled cleaning robot 100 imposed on the pile P causes the pile P to be inclined farther in the $x_R$ direction compared to the state before the wheel 2b passed over as illustrated by the dashed lines.

Consequently, the self-propelled cleaning robot 100 lying on top of the pile P is influenced by drifting in the $x_R$ direction. For this reason, in the case where the pile inclination $X_c$ has an $x_R$ direction component, a phenomenon occurs in which the movement distance of the self-propelled cleaning robot 100 is extended or contracted compared to the distance set as the target.

On the other hand, in the case where the pile inclination $X_c$ has a $y_R$ direction (axle direction) component, the self-propelled cleaning robot 100 lying on top of the pile P is influenced by drifting in the $y_R$ direction. For this reason, in the case where the pile inclination $X_c$ has a $y_R$ direction component, a phenomenon occurs in which the movement direction of the self-propelled cleaning robot 100 is shifted away from the direction set as the target.

Consequently, if the inclination $X_{ci}=(x_{ci}, y_{ci})$ of the pile P at the current position X of the self-propelled cleaning robot 100 can be estimated, the influence that the inclination $X_{ci}$ of the pile P exerts on the movement of the self-propelled cleaning robot 100 can be anticipated.

On the other hand, the lower diagrams in FIG. 8 illustrate the simulation result of the behavior of the pile P in the $y_R$ direction when the self-propelled cleaning robot 100 accelerates from a still state. As illustrated in the lower-left diagram in FIG. 8, assume that after bringing the self-propelled cleaning robot 100 to a stop on the pile P inclined slightly in the $x_R$ direction, the wheel 2b is rotated rapidly in the arrow direction D3, causing the self-propelled cleaning robot 100 to accelerate. Because a torque is applied to the wheel 2b during the acceleration, as illustrated in the lower-right diagram in FIG. 8, the pile P is moved to be swept in the $-x_R$ direction by the wheel 2b.

In this way, when the self-propelled cleaning robot 100 accelerates, the inclination of the pile P changes more greatly than when the self-propelled cleaning robot 100 is moving at a constant velocity. Consequently, the behavior of the self-propelled cleaning robot 100 is influenced more than when moving at a constant velocity. The degree of influence can be observed by the translational acceleration ⌈a=(⌈$a_x$, ⌈$a_y$) of the self-propelled cleaning robot 100 measured by the acceleration sensor 5.

Note that when the self-propelled cleaning robot 100 decelerates, similarly to when the self-propelled cleaning robot 100 accelerates, a torque is applied to the wheel 2b, and the pile P is moved to be toppled in the $x_R$ direction by the wheel 2b. Consequently, when the self-propelled cleaning robot 100 decelerates, the behavior of the self-propelled cleaning robot 100 is likewise influenced more than when moving at a constant velocity. The degree of influence likewise can be observed by the translational acceleration ⌈a=(⌈$a_x$, ⌈$a_y$) of the self-propelled cleaning robot 100 measured by the acceleration sensor 5.

As above, when the self-propelled cleaning robot 100 accelerates (from time $t_{11}$ to time $t_{12}$ in FIG. 3) and decelerates (time $t_{13}$ and thereafter in FIG. 3), depending on the change in the inclination of the pile P, the behavior of the self-propelled cleaning robot 100 is influenced more than when moving at a constant velocity. Accordingly, when the self-propelled cleaning robot 100 accelerates and decelerates, the carpet weave estimation unit 19 estimates the inclination of the pile P on the basis of the translational acceleration ⌈a=(⌈$a_x$, ⌈$a_y$) measured by the acceleration sensor 5. With this arrangement, the carpet weave estimation unit 19 can estimate the inclination of the pile P more precisely than when moving at a constant velocity, on the basis of the translational acceleration ⌈a=(⌈$a_x$, ⌈$a_y$) that is greater than when moving at a constant velocity.

(Method of Estimating Inclination of Pile)

Next, a method of estimating the inclination $X_{ci}$ of the pile P by the carpet weave estimation unit 19 will be described. It is assumed that the self-propelled cleaning robot 100 in the still state is accelerated at a position where an $x_R$ direction component ⌈$X_{ci}$ of the inclination ⌈$X_{ci}$ of the pile P is 2 mm and a $y_R$ direction component ⌈$y_{ci}$ is ±2 mm. FIG. 9 illustrates a result obtained by simulating the change over time in the acceleration ⌈$a_x$ in the $x_R$ direction and the acceleration ⌈$a_y$ in the $y_R$ direction (axle direction) of the self-propelled cleaning robot 100 in this case on the basis of the approximation model of the pile P illustrated in FIG. 7.

As illustrated in the upper diagram in FIG. 9, the acceleration ⌈$a_x$ in the $x_R$ direction reaches a maximum value ⌈$a_{xm}$ immediately after the self-propelled cleaning robot 100 starts moving, and then decreases. Here, let $t_{m8}$ be the time when the acceleration ⌈$a_x$ decreases to 80% of the magnitude of the maximum value ⌈$a_{xm}$.

On the other hand, as illustrated in the lower-left diagram in FIG. 9, in the case where the $y_R$ direction component ⌈$y_{ci}$ of the inclination ⌈$X_{ci}$ of the pile P is a positive value (⌈$y_{ci}$>0), the acceleration ⌈$a_y$ in the $y_R$ direction takes a negative value immediately after the self-propelled cleaning robot 100 starts moving, and then inverts to a positive value. After that, the absolute value of the acceleration ⌈$a_y$ reaches a maximum value ⌈$a_{ym}$. Also, as illustrated in the lower-right diagram in FIG. 9, in the case where the $y_R$ direction component ⌈$y_{ci}$ of the inclination ⌈$X_{ci}$ of the pile P is a negative value (⌈$y_{ci}$<0), the change over time in the acceleration ⌈$a_y$ in the $y_R$ direction is the sign inverse of the lower-left diagram in FIG. 9, taking a positive value immediately after the self-propelled cleaning robot 100 starts moving, and then inverting to a negative value. After that, the absolute value of the acceleration ⌈$a_y$ reaches the maximum value ⌈$a_{ym}$, or in other words, the acceleration ⌈$a_y$ reaches a minimum value (the absolute value being the maximum negative value).

Next, the result of simulating the maximum value ⌈$a_{xm}$ of the acceleration ⌈$a_x$ in the $x_R$ direction according to the inclination ⌈$X_{ci}$ of the pile P is illustrated in the upper-left diagram in FIG. 10. In the upper-left diagram in FIG. 10, the horizontal axis represents the $x_R$ direction component ⌈$x_{ci}$ of the inclination ⌈$X_{ci}$ of the pile P. The vertical axis represents the maximum value ⌈$a_{xm}$ of the acceleration ⌈$a_x$ in the $x_R$ direction. As illustrated in the upper-left diagram in FIG. 10, the maximum value ⌈$a_{xm}$ of the acceleration ⌈$a_x$ in the $x_R$ direction can be approximated by the quadratic curve expressed by Formula (9) below.

[Math.9]

$$\lceil a_{xm} = K_x v_d \,^r x_{ci}^2 \qquad (9)$$

In Formula (9) above, $K_x$ is a gain constant. Note that compared to the $x_R$ direction component ⌈$x_{ci}$ of the inclination '$X_{ci}$ of the pile P, the $y_R$ direction component ⌈$y_{ci}$ of the inclination ⌈$X_{ci}$ of the pile P conceivably exerts less influence on the maximum value ⌈$a_{xm}$ of the acceleration ⌈$a_x$ in the $x_R$ direction. For this reason, Formula (9) above is taken to be an approximation formula related to only the $x_R$ direction component ⌈$x_{ci}$ of the inclination ⌈$X_{ci}$ of the pile P Next, the result of simulating the maximum value ⌈$a_{ym}$ of the acceleration ⌈$a_y$ in the $y_R$ direction according to the inclination ⌈$X_{ci}$ of the pile P is illustrated in diagram on the right in FIG. 10. In the diagram on the right in FIG. 10, the horizontal axis represents the $x_R$ direction component ⌈$x_{ci}$ of the inclination ⌈$X_{ci}$ of the pile P. The depth axis represents the $y_R$ direction component ⌈$y_{ci}$ of the inclination ⌈$X_{ci}$ of the pile P. The height axis represents the maximum value ⌈$a_{ym}$ of the acceleration ⌈$a_y$ in the $y_R$ direction and the $-y_R$ direction.

Also, the result of simulating the time $t_{m8}$ when the acceleration ⌈$a_x$ in the $x_R$ direction reaches 80% of the magnitude of the maximum value ⌈$a_{xm}$ according to the inclination ⌈$X_{ci}$ of the pile P is illustrated in the lower-left diagram in FIG. 10. In the lower-left diagram in FIG. 10, the horizontal axis represents the $x_R$ direction component ⌈$x_{ci}$ of the inclination ⌈$X_{ci}$ of the pile P. The vertical axis represents the time $t_{m8}$.

The maximum value ⌈$a_{ym}$ of the acceleration ⌈$a_y$ in the $y_R$ direction can be approximated from the three simulation results illustrated in FIG. 10 by Formula (10) below.

[Math.10]

$$\lceil a_{ym} = K_y v_d \,^r y_{ci} \exp{}^r x_{ci} \qquad (10)$$

In Formula (10) above, $K_y$ is a gain constant.

Consequently, if the maximum value ⌈$a_{xm}$ of the acceleration ⌈$a_x$ in the $x_R$ direction and the maximum value ⌈$a_{ym}$ of the acceleration ⌈$a_y$ in the $y_R$ direction are measured by the acceleration sensor 5, the $x_R$ direction component ⌈$x_{ci}$ of the inclination ⌈$X_{ci}$ of the pile P can be estimated using the measured maximum value ⌈$a_{xm}$ of the acceleration ⌈$a_x$ in the $x_R$ direction, the command movement velocity $v_d$, and Formula (9). Also, the $y_R$ direction component ⌈$x_{ci}$ of the inclination ⌈$X_{ci}$ of the pile P can be estimated using the $x_R$ direction component ⌈$x_{ci}$ of the inclination $X_{ci}$ of the pile P estimated using the measured maximum value ⌈$a_{xm}$ of the acceleration ⌈$a_x$ in the $x_R$ direction, the measured maximum value ⌈$a_{ym}$ of the acceleration ⌈$a_y$ in the $y_R$ direction, the command movement velocity $v_d$, and Formula (10).

Furthermore, Formulas (11), (12), and (13) below for deriving the inclination $X_{ci}=(x_{ci}, y_{ci})$ of the pile P in the absolute coordinate system Σ can be obtained using Formulas (9) and (10) above and the current direction angle ψ computed by the odometry calculation unit 18.

[Math. 11]

$$x_{ci} = \pm R_r \sqrt{\frac{^r a_{xm}}{K_x v_d}} \qquad (11)$$

[Math. 12]

$$y_{ci} = \pm R_r \frac{^r a_{xm}}{K_y v_d \exp\sqrt{^r a_{xm}/K_x v_d}} \qquad (12)$$

Note that in the case where the time $t_{m8}$ is greater than 0.283 $v_d/K_v$ ($t_{m8}$>0.283 $v_d/K_v$), the sign of the right side of Formulas (11) and (12) is + (positive). In the case where the time $t_{m8}$ is less than 0.283 $v_d/K_v$ ($t_{m8}$<0.283 $v_d/K_v$), the sign of the right side of Formulas (11) and (12) is − (negative). Also, in Formulas (11) and (12), $R_r$ is a rotation matrix for converting coordinates from the robot coordinate system $\Sigma_R$ to the absolute coordinate system Σ. The rotation matrix $R_r$ is expressed by Formula (13) below using the current direction angle ψ computed by the odometry calculation unit 18.

[Math. 13]

$$R_r = \begin{bmatrix} \cos\psi & -\sin\psi \\ \sin\psi & \cos\psi \end{bmatrix} \qquad (13)$$

In other words, the carpet weave estimation unit 19 estimates the component ⌈$x_{ci}$, in the $x_R$ direction of the inclination ⌈$X_{ci}$ of the pile P in the robot coordinate system $\Sigma_R$ by using an expression (first arithmetic expression) proportional to the square root of the maximum value ⌈$a_{xm}$ of the component in the $x_R$ direction of the translational acceleration ⌈a, which is obtained by dividing Formula (11) above by the rotation matrix $R_r$. In addition, the carpet weave estimation unit 19 estimates the component ⌈$y_{ci}$ in the $y_R$ direction of the inclination $\lceil X_{ci}$ of the pile P in the robot coordinate system $\Sigma_R$ by using an expression (second arithmetic expression) proportional to the maximum value $\lceil a_{ym}$ in the $y_R$ direction of the translational acceleration $\lceil a$ and also inversely proportional to an exponential function using the square root of the maximum value $\lceil a_{xm}$ of the component in the $x_R$ direction of the translational acceleration $\lceil a$, which is obtained by dividing Formula (12) by the rotation matrix $R_r$. Furthermore, the carpet weave estimation unit 19 estimates the inclination $X_{ci}=(x_{ci}, y_{ci})$ of the pile P in the absolute coordinate system $\Sigma$ by multiplying the estimated inclination $\lceil X_{ci}$ of the pile P in the robot coordinate system $\Sigma_R$ by the rotation matrix $R_r$ expressed by Formula (13) using the current direction angle $\psi$ computed by the odometry calculation unit 18.

Note that the above gain constants $K_x$ and $K_y$ are adjusted according to differences in the mechanism of the self-propelled cleaning robot 100 (such as the weight and size) and differences in the material of the carpet (such as the length of the pile P and the viscoclastic properties of the pile P). For example, it is sufficient to adjust the gain constants $K_x$ and $K_y$ on the basis of simulated or experimental results corresponding to the mechanism of the self-propelled cleaning robot 100 acting as the target. Also, if the material of the carpet under the moving self-propelled cleaning robot 100 is known, it is sufficient to adjust the gain constants $K_x$ and $K_y$ in accordance with the material of the carpet. In the case where the material of the carpet is unknown, the gain constants $K_x$ and $K_y$ may be adjusted by treating the material of the carpet as a typical carpet material (such as a pile length of 7 mm and a pile pitch of 3 mm, for example). In this case, even if the carpet is of an unknown material, the influence exerted on the movement of the self-propelled cleaning robot 100 by the inclination $X_{ci}$ of the pile P can be reduced to some degree.

When the inclination $X_{ci}=(x_{ci}, y_{ci})$ of the pile P estimated by the carpet weave estimation unit 19 is input, the movement control unit 15 computes the target movement velocity $V_{dtg}$ and the target direction angle $\psi_{dtg}$ using Formulas (14) and (15) below based on the inclination $X_{ci}$ of the pile P.

[Math. 14]

$$V_{dtg}=v_d-K_v(v_d-v_{dtg\_prv})+K_{vc}R_r^{-1}x_{ci} \quad (14)$$

[Math. 15]

$$\psi_{dtg}=\psi_{dtg\_prv}+\omega_{dtg}\Delta t+K_{\psi c}R_r^{-1}y_{ci} \quad (15)$$

$K_{vc}$ in Formula (14) and $K_{\psi c}$ in Formula (15) are gain constants, and it is sufficient to adjust and decide these gain constants experimentally while confirming the effects of correction. In other words, the movement control unit 15 corrects the target movement velocity $v_{dtg}$ computed according to Formula (1) by the correction movement velocity $K_{vc}R_r^{-1}x_{ci}$, and corrects the target direction angle $\psi_{dtg}$ computed according to Formula (3) by the correction direction angle $K_{\psi c}R_r^{-1}Y_{ci}$.

In other words, the movement control unit 15 uses Formula (14) to control the target movement velocity $v_{dtg}$ according to the component $R_r^{-1}c_{ci}$ in the $x_R$ direction parallel to the forward direction of the self-propelled cleaning robot 100 in the inclination $X_{ci}$ of the pile P estimated by the carpet weave estimation unit 19. Also, the movement control unit 15 uses Formula (15) to control the target direction angle $\psi_{dtg}$ indicating the movement direction of the self-propelled cleaning robot 100 according to the component $R_r^{-1}y_{ci}$ in the $y_R$ direction perpendicular to the forward direction of the self-propelled cleaning robot 100 and also parallel to the floor in the inclination $X_{ci}$ of the pile P estimated by the carpet weave estimation unit 19.

Consequently, when the target movement velocity $v_{dtg}$ is adjusted by the movement control unit 15 using Formula (14), the influence whereby the self-propelled cleaning robot 100 drifts in the forward direction ($x_R$ direction) and the movement distance of the self-propelled cleaning robot 100 is extended or contracted compared to normal is reduced. Also, when the target direction angle $\psi_{dtg}$ is adjusted by the movement control unit 15 using Formula (15), the influence whereby the self-propelled cleaning robot 100 drifts in the axle direction ($y_R$ direction) is reduced.

As above, in the self-propelled cleaning robot 100 of the present embodiment, when the self-propelled cleaning robot 100 accelerates and decelerates, the inclination $X_{ci}$ of the pile P is estimated on the basis of the translational acceleration $\lceil a$ measured by the acceleration sensor 5. Furthermore, the movement velocity and the movement direction of the self-propelled cleaning robot 100 are adjusted on the basis of the estimation result of the inclination $X_{ci}$ of the pile P.

For this reason, in the case where the self-propelled cleaning robot 100 is moving, it is possible to reduce the influence on the movement velocity and the movement direction of the self-propelled cleaning robot 100 exerted by the inclination $X_{ci}$ of the pile P on the floor where the self-propelled cleaning robot 100 has accelerated or decelerated just before. As a result, the self-propelled cleaning robot 100 can precisely follow the path planned by the operation planning unit 14.

Also, in the self-propelled cleaning robot 100 of the present embodiment, the inclination $X_{ci}$ of the pile P is estimated when the self-propelled cleaning robot 100 accelerates/decelerates. For this reason, when estimating the inclination $X_{ci}$ of the pile P, the value of the translational acceleration $\lceil a$ measured by the acceleration sensor 5 becomes a larger value than in the case of estimating the inclination $X_{ci}$ of the pile P while the self-propelled cleaning robot 100 is moving at a constant velocity. With this arrangement, the precision of the estimation of the inclination $X_{ci}$ of the pile P performed using the translational acceleration $\lceil a$ can be increased compared to the case of estimating the inclination $X_{ci}$ of the pile P while the self-propelled cleaning robot 100 is moving at a constant velocity.

In addition, it is sufficient to provide the self-propelled cleaning robot 100 with the acceleration sensor 5 to estimate the inclination $X_{ci}$ of the pile P, thereby enabling estimation of the inclination $X_{ci}$ of the pile P and control of the movement velocity and the movement direction based on the estimation result with a simple configuration. Consequently, according to the self-propelled cleaning robot 100, the planned path can be followed precisely to perform cleaning accurately, and efficient cleaning can be achieved without leaving behind uncleaned areas.

(Modification of First Embodiment)

The first embodiment is modifiable as follows.

(1) The movement control unit 15 may also not cause the carpet weave estimation unit 19 to estimate the inclination $X_{ci}$ of the pile P when the self-propelled cleaning robot 100 decelerates, and cause the carpet weave estimation unit 19 to estimate the inclination $X_{ci}$ of the pile P only when the self-propelled cleaning robot 100 accelerates. Specifically, in step S15 (FIG. 6), the movement control unit 15 may cause the carpet weave estimation unit 19 not to output the estimation command $C_e$.

Alternatively, the movement control unit 15 may also not cause the carpet weave estimation unit 19 to estimate the inclination $X_{ci}$ of the pile P when the self-propelled cleaning robot 100 accelerates, and cause the carpet weave estimation unit 19 to estimate the inclination $X_{ci}$ of the pile P only when the self-propelled cleaning robot 100 decelerates. Specifically, in step S12 (FIG. 6), the movement control unit 15 may cause the carpet weave estimation unit 19 not to output the estimation command $C_e$.

Second Embodiment

Hereinafter, a second embodiment of the present disclosure will be described in detail on the basis of the drawings.

Figure 11:
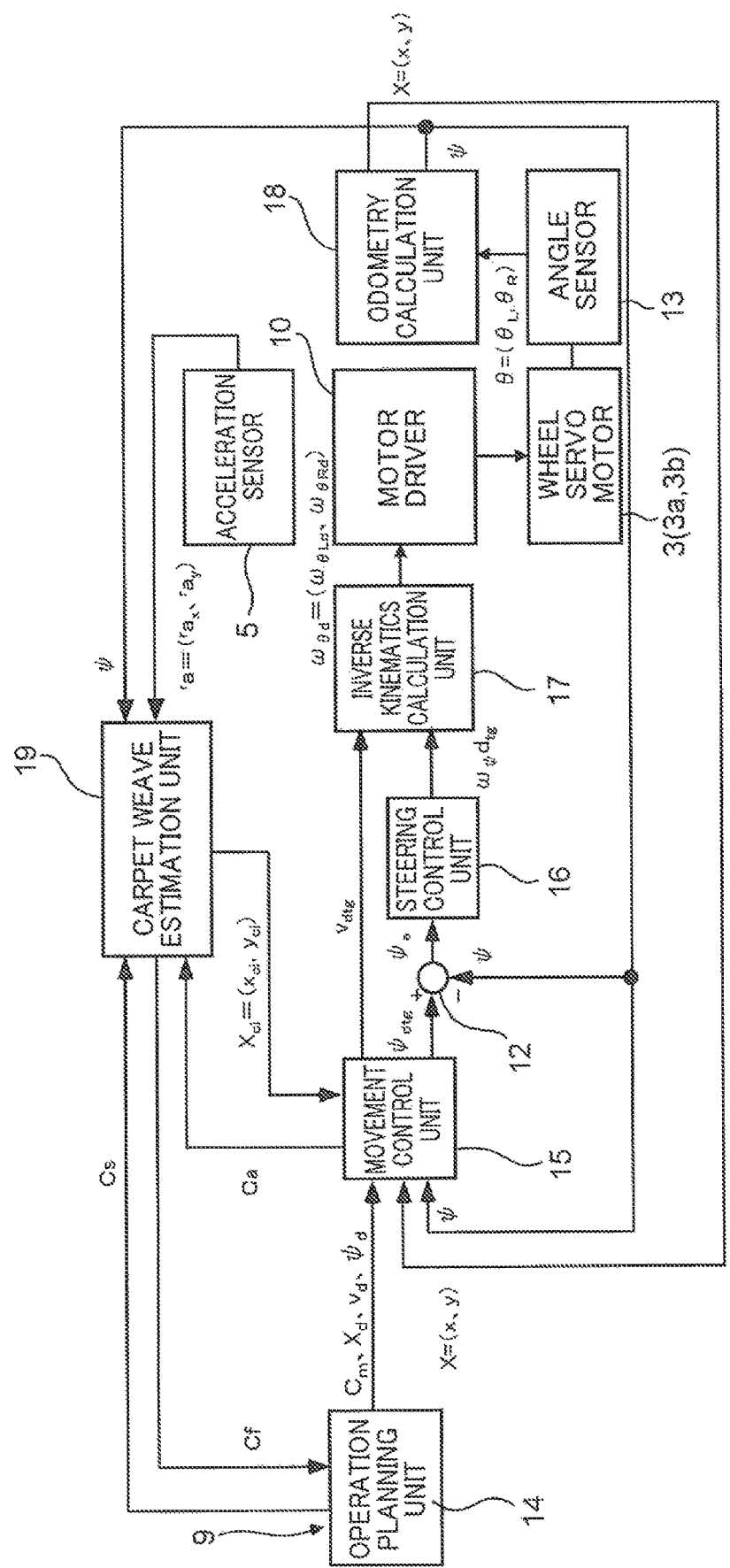
FIG. 11 is a block diagram of a control system of a self-propelled cleaning robot according to a second embodiment.

FIG. 11 is a block diagram of a control system of a self-propelled cleaning robot 100 according to the second embodiment. As illustrated in FIG. 11, by having the CPU execute the control program, the processing circuit 9 functions as an operation planning unit 14, a movement control unit 15, an error calculation unit 12, a steering control unit 16, an inverse kinematics calculation unit 17, an odometry calculation unit 18, and a carpet weave estimation unit 19 (estimation unit). The processing circuit 9 is communicably connected to the acceleration sensor 5, the motor driver 10, and an angle sensor 13.

The operation planning unit 14 fulfills the role of an intelligence unit of the self-propelled cleaning robot 100. Specifically, the operation planning unit 14 plans a path on which the self-propelled cleaning robot 100 is to move when cleaning. Also, the operation planning unit 14 plans an operation (hereinafter, the operation for estimation) causing the self-propelled cleaning robot 100 to perform an operation for estimating the inclination of the pile. The pile refers to the fibers of the carpet on which the self-propelled cleaning robot 100 moves, and includes styles such as cut pile and loop pile for example.

The operation planning unit 14 outputs the control mode command $C_m$, the target position $X_d=(x_d, y_d)$ of the self-propelled cleaning robot 100, the command movement velocity $v_d$, and the command direction angle $\psi_d$ corresponding to the plan to the movement control unit 15. Also, the operation planning unit 14 controls an estimation operation for estimating the inclination of the pile by the carpet weave estimation unit 19 by outputting an estimation command $C_s$ to the carpet weave estimation unit 19. Note that, as described later, after the estimation operation starts, the carpet weave estimation unit 19 causes the operation planning unit 14 to plan the operation for estimation by outputting an estimation operation request $C_f$ to the operation planning unit 14. The method of planning a path and the operation for estimation by the operation planning unit 14 will be described later.

The movement control unit 15 controls the movement of the self-propelled cleaning robot 100. Specifically, the movement control unit 15 accepts the input from the operation planning unit 14 as well as the input of an inclination $X_{ci}=(x_{ci}, y_{ci})$ of the pile from the carpet weave estimation unit 19.

The inclination $X_{ci}$ of the pile is expressed as the degree to which the pile is inclined in the directions parallel to the two coordinate axes (x axis, y axis) of the absolute coordinate system $\Sigma$ (FIG. 1). For example, in the case where the pile is orthogonal (upright) with respect to the base of the carpet, the inclination $X_{ci}$ of the pile is expressed as $X_{ci}=(0, 0)$. Also, in the case where the pile is inclined by $x_1$ in the direction parallel to the x axis of the absolute coordinate system $\Sigma$ (hereinafter, the x direction), but is not inclined in the direction parallel to they axis of the absolute coordinate system $\Sigma$ (hereinafter, the y direction), the inclination $X_{ci}$ of the pile is expressed as $X_{ci}=(x_1, 0)$. Also, in the case where the pile is inclined by $y_1$ in the y direction but is not inclined in the x direction, the inclination $X_{ci}$ of the pile is expressed as $X_{ci}=(0, y_1)$.

Note that the inclination of the pile is also expressed as the degree to which the pile is inclined in the directions parallel to the two coordinate axes ($x_R$ axis, $y_R$ axis) of the robot coordinate system $\Sigma_R$ (FIG. 1). In this case, the sign denoting the inclination of the pile is denoted $\lceil X_{ci}$. In other words, in the case where the pile is orthogonal (upright) with respect to the base of the self-propelled cleaning robot 100, the inclination $\lceil X_{ci}$ of the pile is expressed as $\lceil X_{ci}=(0, 0)$. Also, in the case where the pile is inclined by $x_2$ in the direction parallel to the $x_R$ axis of the robot coordinate system $\Sigma_R$ (hereinafter, the $x_R$ direction), but is not inclined in the direction parallel to the $y_R$ axis of the robot coordinate system $\Sigma_R$ (hereinafter, the $y_R$ direction), the inclination $\lceil X_{ci}$ of the pile is expressed as $\lceil X_{ci}=(x_2, 0)$. Also, in the case where the pile is inclined by $y_2$ in the $y_R$ direction but is not inclined in the $x_R$ direction, the inclination $\lceil X_{ci}$ of the pile is expressed as $\lceil X_{ci}=(0, y_2)$.

The movement control unit 15 additionally accepts the input of a current position $X=(x, y)$ and a current direction angle $\psi$ of the self-propelled cleaning robot 100 from the odometry calculation unit 18.

On the basis of the input control parameters described above, the movement control unit 15 computes a target movement velocity $v_{dtg}$ and a target direction angle $\psi_{dtg}$ of the self-propelled cleaning robot 100. The movement control unit 15 outputs the computed target movement velocity $v_{dtg}$ to the inverse kinematics calculation unit 17, and outputs the computed target direction angle $\psi_{dtg}$ to the error calculation unit 12.

With this arrangement, the error calculation unit 12, the steering control unit 16, the inverse kinematics calculation unit 17, and the motor driver 10 which are located on and after the error calculation unit 12 and the inverse kinematics calculation unit 17 process control parameters based on the target movement velocity $v_{dtg}$ and the target direction angle $\psi_{dtg}$. As a result, the movement of the self-propelled cleaning robot 100 is controlled such that the movement velocity of the self-propelled cleaning robot 100 approaches the target movement velocity $v_{dtg}$ and the movement direction of the self-propelled cleaning robot 100 approaches the target direction angle $\psi_{dtg}$.

Furthermore, the movement control unit 15 controls the estimation of the inclination $X_{ci}$ of the pile by the carpet weave estimation unit 19. Specifically, the movement control unit 15 causes the carpet weave estimation unit 19 to estimate the inclination $X_{ci}$ of the pile by outputting an acceleration/deceleration notification $C_a$ indicating that the self-propelled cleaning robot 100 is performing an acceleration operation or a deceleration operation to the carpet weave estimation unit 19.

The error calculation unit 12 computes an error $\psi_e$ between the target direction angle $\psi_{dtg}$ computed by the movement control unit 15 and the current direction angle $\psi$.

The steering control unit 16 controls the steering of the self-propelled cleaning robot 100. Specifically, the steering control unit 16 computes a target direction angular velocity $\omega_\psi d_{tg}$ on the basis of the error $\psi_e$ computed by the error calculation unit 12. The target direction angular velocity $\omega_\psi d_{tg}$ refers to the angular velocity when turning the self-propelled cleaning robot 100 in order to change the movement direction of the self-propelled cleaning robot 100 from the direction indicated by the current direction angle $\psi$ to the direction indicated by the target direction angle $\psi_{dtg}$.

The inverse kinematics calculation unit 17 controls the rotation of the wheels 2a and 2b (FIG. 1) of the self-propelled cleaning robot 100. Specifically, the inverse kinematics calculation unit 17 computes a target rotational angular velocity $\omega_{\theta Ld}$ of the left wheel 2a (FIG. 1) and a target rotational angular velocity $\omega_{\theta Rd}$ of the right wheel 2b (FIG. 1) on the basis of the target movement velocity $v_{dtg}$ and the target direction angular velocity $\omega_\psi d_{tg}$.

The motor driver 10 accepts the input of the target rotational angular velocity $\omega_{\theta d}=(\omega_{\theta Ld}, \omega_{\theta Rd})$ of the wheels 2a and 2b (FIG. 1) computed by the inverse kinematics calculation unit 17. The motor driver 10 rotationally drives the wheel servo motors 3a and 3b according to the input target rotational angular velocity $\omega_{\theta d}$. The angle sensor 13 that detects the rotational angle of the wheel servo motors 3a and 3b is provided near the rotating shafts of the wheel servo motors 3a and 3b. The angle sensor 13 outputs the detected rotational angle at the current time (hereinafter, the current rotational angle) $\theta=(\theta_L, \theta_R)$ of the wheel servo motors 3a and 3b to the odometry calculation unit 18.

On the basis of the current rotational angle $\theta_L$ of the left wheel 2a (FIG. 1) and the current rotational angle $\theta_R$ of the right wheel 2b (FIG. 1), the odometry calculation unit 18 computes the current position $X=(x, y)$ and the current direction angle $\psi$ of the self-propelled cleaning robot 100. The current position $X=(x, y)$ is the position of the origin of the robot coordinate system $\Sigma_R$ (FIG. 1) in the absolute coordinate system $\Sigma$ (FIG. 1). The position of the origin of the robot coordinate system $\Sigma_R$ (FIG. 1) is the position where the $x_R$ axis and the $y_R$ axis intersect. The current direction angle $\psi$ is the angle obtained between the x direction in the absolute coordinate system $\Sigma$ (FIG. 1) and the $x_R$ direction in the robot coordinate system $\Sigma_R$ (FIG. 1).

The carpet weave estimation unit 19 estimates the inclination $X_{ci}$ of the pile on the basis of the estimation command C, input from the operation planning unit 14 and the acceleration/deceleration notification $C_a$ input from the movement control unit 15. Specifically, the carpet weave estimation unit 19 estimates the inclination $X_{ci}$ of the pile in the case where the estimation command $C_s$ directing the carpet weave estimation unit 19 to estimate the inclination $X_{ci}$ of the pile is input or in the case where the acceleration/deceleration notification $C_a$ indicating that the self-propelled cleaning robot 100 is performing an acceleration operation or a deceleration operation is input. Specifically, the carpet weave estimation unit 19 estimates the inclination $X_{ci}=(x_{ci}, y_{ci})$ of the pile on the basis of a translational acceleration $\lceil a=(\lceil a_x, \lceil a_y)$ of the self-propelled cleaning robot 100 calculated by the acceleration sensor 5 and the current direction angle $\psi$ computed by the odometry calculation unit 18. The carpet weave estimation unit 19 outputs the computed inclination $X_{ci}=(x_{ci}, y_{ci})$ of the pile to the movement control unit 15 as the estimation result of the inclination $X_{ci}$ of the pile.

Also, in the case of determining that a change has occurred in the estimated inclination $X_{ci}$ of the pile, the carpet weave estimation unit 19 outputs an estimation operation request $C_r$ to the operation planning unit 14. With this arrangement, the carpet weave estimation unit 19 causes the operation planning unit 14 to plan the operation for estimation. Note that the method of determining a change in the inclination $X_{ci}$ of the pile by the carpet weave estimation unit 19 will be described later.

After planning the operation for estimation, the operation planning unit 14 outputs the control mode command $C_m$, the target position $X_d=(x_d, y_d)$ of the self-propelled cleaning robot 100, the command movement velocity $v_d$, and the command direction angle $\psi_d$ corresponding to the planned operation for estimation to the movement control unit 15, and outputs the estimation command $C_s$ corresponding to the planned operation for estimation to the carpet weave estimation unit 19. With this arrangement, the inclination $X_{ci}$ of the pile is estimated by the carpet weave estimation unit 19 while the movement control unit 15 causes the self-propelled cleaning robot 100 to move on a path following the planned operation for estimation.

(Details about Control Modes)

Next, details about control modes will be described. The movement control unit 15 causes the self-propelled cleaning robot 100 to move according to one of three control modes, namely a straight-ahead mode, an acceleration/deceleration mode, and a turning mode. The movement control unit 15 switches the control mode according to the control mode command $C_m$ input from the operation planning unit 14, and controls the movement of the self-propelled cleaning robot 100 on the basis of the control parameters input from the operation planning unit 14.

In the case where the control mode is the straight-ahead mode, the movement control unit 15 causes the self-propelled cleaning robot 100 to move straight ahead at the command movement velocity $v_d$. Specifically, when the control mode is switched to the straight-ahead mode, the movement control unit 15 computes the target movement velocity $v_{dtg}$ using the Formula (1) above every time a predetermined control time (sampling time) elapses.

On the other hand, the movement control unit 15 keeps the target direction angle $\psi_{dtg}$ at the value computed in the last control mode, and outputs the target direction angle $\psi_{dtg}$ to the error calculation unit 12. With this arrangement, the movement control unit 15 causes the error $\psi_c$ computed by the error calculation unit 12 to approach 0.

In the case where the control mode is the straight-ahead mode, the self-propelled cleaning robot 100 moves straight ahead with an acceleration/deceleration pattern as illustrated in FIG. 3. The vertical axis in FIG. 3 represents the target movement velocity $v_{dtg}$ of the self-propelled cleaning robot 100, while the horizontal axis of FIG. 3 represents time.

Specifically, as illustrated in FIG. 3, when the control mode command $C_m$ directing the movement control unit 15 to switch the control mode to the straight-ahead mode is input (time $t_{11}$), every time the control time elapses, the movement control unit 15 computes the target movement velocity $v_{dtg}$ using Formula (1), and outputs the computed target movement velocity $v_{dtg}$ to the inverse kinematics calculation unit 17. Also, the movement control unit 15 outputs the target direction angle $\psi_{dtg}$ computed in the last control mode to the error calculation unit 12.

The target direction angle $\psi_{dtg}$ is in the absolute coordinate system $\Sigma$, and in the last control mode, the current direction angle $\psi$ of the self-propelled cleaning robot 100 is the target direction angle $\psi_{dtg}$. As a result, the self-propelled cleaning robot 100 moves straight ahead while accelerating, and the movement velocity of the self-propelled cleaning robot 100 reaches the command movement velocity $v_d$ (time $t_{12}$). Thereafter, every time the control time elapses, the movement control unit 15 uses Formula (1) to compute the target movement velocity $v_{dtg}$. Also, the movement control unit 15 outputs the target direction angle $\psi_{dtg}$ computed in the last control mode to the error calculation unit 12. With this arrangement, the self-propelled cleaning robot 100 moves straight ahead at a constant command movement velocity $v_d$ without turning.

After that, the movement control unit 15 computes a distance ΔX from the current position X input from the odometry calculation unit 18 to the target position $X_d$ input from the operation planning unit 14. When ΔX becomes shorter than a predetermined distance (for example, 5 mm), the movement control unit 15 determines that the self-propelled cleaning robot 100 has reached the target position $X_d$. Additionally, the movement control unit 15 sets the command movement velocity $v_d$ in Formula (1) to 0 (time $t_{13}$). With this arrangement, the target movement velocity $v_{dtg}$ computed by the movement control unit 15 falls, and the self-propelled cleaning robot 100 decelerates. As a result, the movement of the self-propelled cleaning robot 100 is stopped.

Figure 12:
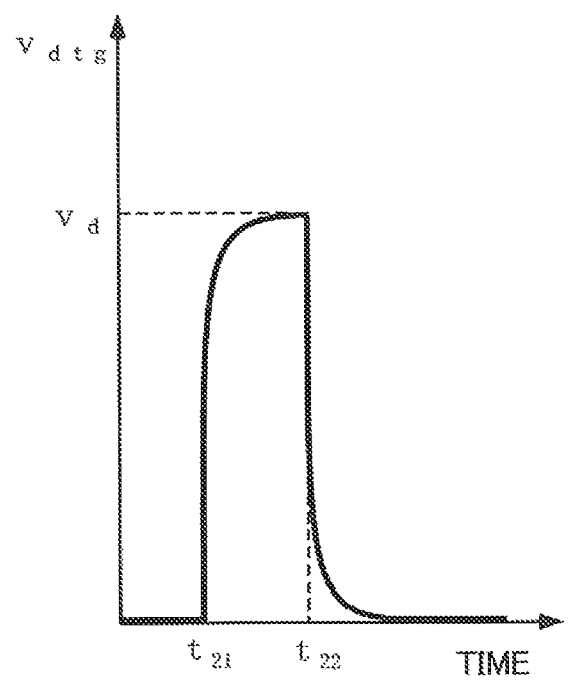
FIG. 12 is a diagram illustrating an acceleration/deceleration pattern in an acceleration/deceleration mode of a self-propelled cleaning robot.

FIG. 12 is a diagram illustrating an acceleration/deceleration pattern in an acceleration/deceleration mode of a self-propelled cleaning robot 100. In the case where the control mode is the acceleration/deceleration mode, the self-propelled cleaning robot 100 moves straight ahead with an acceleration/deceleration pattern as illustrated in FIG. 12. The vertical axis in FIG. 12 represents the target movement velocity $v_{dtg}$ of the self-propelled cleaning robot 100, while the horizontal axis of FIG. 12 represents time.

Specifically, as illustrated in FIG. 12, when the control mode command $C_m$ directing the movement control unit 15 to switch the control mode to the acceleration/deceleration mode is input (time $t_{21}$), every time the control time elapses, the movement control unit 15 computes the target movement velocity $v_{dtg}$ using Formula (1), and outputs the computed target movement velocity $v_{dtg}$ to the inverse kinematics calculation unit 17. Also, the movement control unit 15 outputs the target direction angle $\psi_{dg}$ computed in the last control mode to the error calculation unit 12.

As a result, when the self-propelled cleaning robot 100 move straight ahead while accelerating and the movement velocity of the self-propelled cleaning robot 100 reaches the command movement velocity $v_d$ (time $t_{22}$), the movement control unit 15 sets the command movement velocity $v_d$ in Formula (1) to 0. With this arrangement, the target movement velocity $v_{dtg}$ computed by the movement control unit 15 falls, the self-propelled cleaning robot 100 accelerates, and then immediately decelerates. As a result, the movement of the self-propelled cleaning robot 100 is stopped.

On the other hand, in the case where the control mode is the turning mode, the operation planning unit 14 uses Formula (2) above to compute the command direction angle $\psi_d$ for moving the self-propelled cleaning robot 100 from the current position X=(x, y) to the next target position $X_d=(x_d, y_d)$, and sets the command movement velocity $v_d$ to 0.

The movement control unit 15 causes the self-propelled cleaning robot 100 to perform a pivot turn at a constant command turning velocity $\omega_{dtg}$ until the direction of the self-propelled cleaning robot 100 changes from the current direction angle $\psi$ input from the odometry calculation unit 18 to the command direction angle $\psi_d$ set by the operation planning unit 14. In the pivot turn, the movement control unit 15 uses Formula (3) above to compute the target direction angle $\psi_{dtg}$ to output to the steering control unit 16.

Finally, the motor driver 10 is driven on the basis of the control parameters output by each of the above function units. The motor driver 10 rotationally drives the left and right wheel servo motors 3a and 3b. Specifically, the motor driver 10 accepts the input of the target rotational angular velocity $\omega_{\theta d}=(\omega_{\theta Ld}, \omega_{\theta Rd})$ computed by the inverse kinematics calculation unit 17. The motor driver 10 rotationally drives the wheel servo motors 3a and 3b such that the rotational angular velocity of the wheel servo motors 3a and 3b approaches the input target rotational angular velocity $\omega_{\theta d}$.

The angle sensor 13 detects the current rotational angle $\theta=(\theta_L, \theta_R)$ of the wheel servo motors 3a and 3b, and outputs the detected current rotational angle θ to the odometry calculation unit 18.

The odometry calculation unit 18 computes the current position X=(x, y) and the current direction angle ψ by using time derivatives ($\theta_L$ dot, $\theta_R$ dot) of the current rotational angle $\theta=(\theta_L, \theta_R)$ input from the angle sensor 13 that indicate the current rotational angular velocity of the wheel servo motors 3a and 3b, and Formulas (4) to (8) above. The odometry calculation unit 18 outputs the computed current position X=(x, y) to the movement control unit 15, and outputs the computed current direction angle ψ to the error calculation unit 12, the movement control unit 15, and the carpet weave estimation unit 19.

(Flow of Cleaning Operation)

Figure 13:
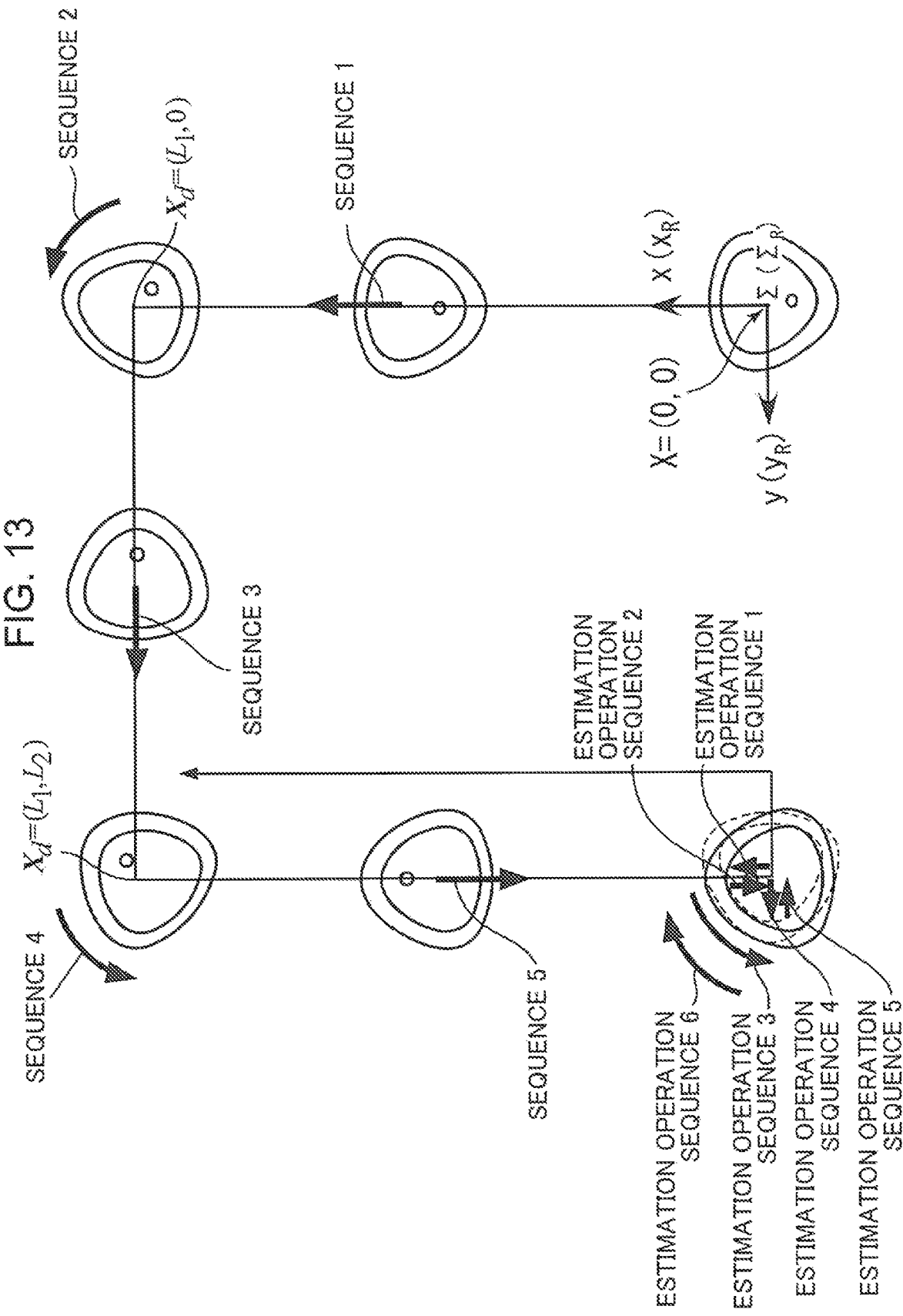
FIG. 13 is a diagram illustrating one example of a path on which the self-propelled cleaning robot according to the second embodiment moves during a cleaning operation.
Figure 15:
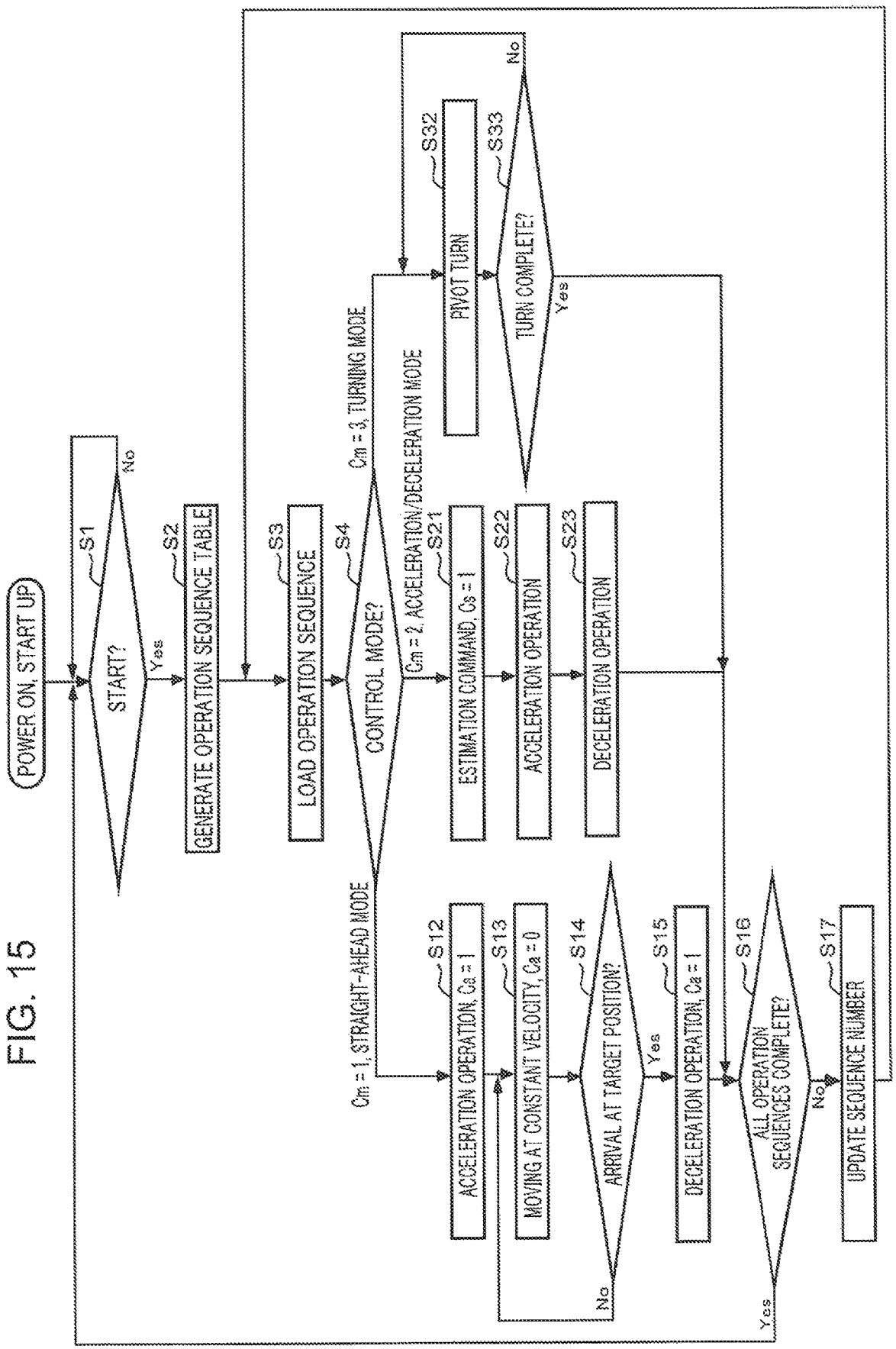
FIG. 15 is a flowchart illustrating one example of a cleaning operation by the self-propelled cleaning robot according to the second embodiment.

Next, as an example of a cleaning operation performed by the self-propelled cleaning robot 100, a cleaning operation that the self-propelled cleaning robot 100 performs while moving on the path illustrated in FIG. 13 will be described with reference to FIGS. 14 and 15. FIG. 13 is a diagram illustrating one example of a path on which the self-propelled cleaning robot 100 according to the second embodiment moves during a cleaning operation. FIG. 14 is a diagram illustrating one example of an operation sequence table T1 and the estimation operation sequence table T2 according to the second embodiment. FIG. 15 is a flowchart illustrating one example of a cleaning operation by the self-propelled cleaning robot 100 according to the second embodiment.

In the self-propelled cleaning robot 100 of the present embodiment, first, information (hereinafter, an operation sequence) related to the path on which the self-propelled cleaning robot 100 is to move during the cleaning operation is generated by the operation planning unit 14. The cleaning operation by the self-propelled cleaning robot 100 is then achieved by having the processing circuit 9 control the suction device 6 (FIG. 1) while the movement control unit 15 causes the self-propelled cleaning robot 100 to move on the path indicated by the generated operation sequence.

Specifically, as illustrated in FIG. 15, when a power button not illustrated that is provided on the self-propelled cleaning robot 100 is pressed, a supply of power from the battery 11 (FIG. 1) to the control circuit board 8, the wheel servo motors 3a and 3b, and the suction device 6 (FIG. 1) is started, and the self-propelled cleaning robot 100 starts up. With this arrangement, the processing circuit 9 disposed on the control circuit board 8 enters a standby state.

After that, when a start button not illustrated that is provided on the self-propelled cleaning robot 100 is pressed by a user (step S1, Yes), the self-propelled cleaning robot 100 starts the cleaning operation. Note that the processing circuit 9 treats the position and attitude in the robot coordinate system $\Sigma_R$ at the time when the start button is pressed, as the position and attitude in the absolute coordinate system Σ. Also, in the present embodiment, it is assumed that the current position X=(x, y) when the start button is pressed is the position (0, 0) of the origin in the absolute coordinate system Σ.

When the cleaning operation is started, the operation planning unit 14 generates an operation sequence table T1 (step S2). The operation sequence table T1 is a table stipulating an operation sequence related to each of one or more paths on which the self-propelled cleaning robot 100 consecutively moves during the cleaning operation. Specifically, in step S2, the operation planning unit 14 generates the operation sequence table T1 by reading one or more operation sequences pre-stored in the non-volatile memory provided in the processing circuit 9.

As illustrated in FIG. 14, an operation sequence related to each of one or more paths on which the self-propelled cleaning robot 100 moves during the cleaning operation is set in the operation sequence table T1. The operation sequence includes a sequence number (for example, 1) indicating the order in which the self-propelled cleaning robot 100 moves on each path, the target position $X_d=(X_d, y_d)$ (for example, $(L_1, 0)$) that acts as the end point of each path, the command movement velocity $v_d$ (for example, $v_L$) and the command direction angle $\psi_d$ (for example, 0) when the self-propelled cleaning robot 100 moves on each path, the control mode command $C_m$ (for example, 1), and the estimation command $C_s$ (for example, 0).

After step S2, the operation planning unit 14 consecutively loads, according to the sequence number, an operation sequence that has not been loaded yet from the operation sequence table T1 generated in step S2 (step S3). Specifically, in the case of executing step S3 for the first time after the end of step S2, the operation planning unit 14 loads the operation sequence whose sequence number is set to "1" (FIG. 14). Additionally, the operation planning unit 14 outputs the control mode command $C_m$, the target position $X_d$, the command movement velocity $v_d$, and the command direction angle $\psi_d$ included in the loaded operation sequence to the movement control unit 15. Also, the operation planning unit 14 outputs the estimation command $C_s$ included in the loaded operation sequence to the carpet weave estimation unit 19.

On the basis of the control mode command $C_m$ input from the operation planning unit 14, the movement control unit 15 determines which control mode to switch to (step S4). In the present embodiment, in the case where the control mode command $C_m$ with a value of "1" is input into the movement control unit 15, in step S4, the movement control unit 15 determines that a switch to the straight-ahead mode ($C_m=1$) has been indicated ($C_m=1$, straight-ahead mode). In the case where the control mode command $C_m$ with a value of "2" is input into the movement control unit 15, in step S4, the movement control unit 15 determines that a switch to the acceleration/deceleration mode ($C_m=2$) has been indicated ($C_m=2$, acceleration/deceleration mode). In the case where the control mode command $C_m$ with a value of "3" is input into the movement control unit 15, in step S4, the movement control unit 15 determines that a switch to the turning mode ($C_m=3$) has been indicated ($C_m=3$, turning mode). Note that the values of the control mode command $C_m$ are not limited to "1", "2", and "3" above, and may be changed appropriately.

Assume that in step S4, the movement control unit 15 determines that a switch to the straight-ahead mode is indicated (in step S4, $C_m=1$, straight-ahead mode). In this case, as described above, the movement control unit 15 uses the target position $X_d$ and the command movement velocity $v_d$ input in step S3 to cause the self-propelled cleaning robot 100 to move in the straight-ahead mode. With this arrangement, when the self-propelled cleaning robot 100 starts an acceleration operation, the movement control unit 15 sets the acceleration/deceleration notification $C_a$ to "1", and outputs the set acceleration/deceleration notification $C_a$ to the carpet weave estimation unit 19 (FIG. 11) (step S12). With this arrangement, the carpet weave estimation unit 19 estimates the inclination $X_{ci}$ of the pile.

After that, when the movement velocity of the self-propelled cleaning robot 100 reaches the command movement velocity $v_d$, the self-propelled cleaning robot 100 ends the acceleration operation and moves at a constant velocity according to the command movement velocity $v_d$. Also, the movement control unit 15 sets the acceleration/deceleration notification $C_a$ to "0", and outputs the set acceleration/deceleration notification $C_a$ to the carpet weave estimation unit 19 (FIG. 11) (step S13). Note that in step S13, if the inclination $X_{ci}$ of the pile estimated by the carpet weave estimation unit 19 is input, the movement control unit 15 corrects the target movement velocity $v_{dtg}$ and the target direction angle $\psi_{dtg}$ on the basis of the input inclination $X_{ci}$ of the pile. Details about the correction method will be described later.

After that, as described above, when the distance from the current position X of the self-propelled cleaning robot 100 to the target position $X_d$ input in step S3 becomes shorter than a predetermined distance (for example, 5 mm), the movement control unit 15 determines that the self-propelled cleaning robot 100 has reached the target position $X_d$ (step S14, Yes).

In this case (step S14, Yes), the movement control unit 15 lowers the target movement velocity $v_{dtg}$ by setting the command movement velocity $v_d$ to "0" in Formula (1) above. With this arrangement, when the self-propelled cleaning robot 100 starts a deceleration operation, the movement control unit 15 sets the acceleration/deceleration notification $C_a$ to "1", and outputs the set acceleration/deceleration notification $C_a$ to the carpet weave estimation unit 19 (step S15). With this arrangement, the carpet weave estimation unit 19 estimates the inclination $X_{ci}$ of the pile.

Note that in step S15, if the inclination $X_{ci}$ of the pile estimated by the carpet weave estimation unit 19 is input during the deceleration operation by the self-propelled cleaning robot 100, the movement control unit 15 corrects the target movement velocity $v_{dtg}$ and the target direction angle $\psi_{dtg}$ on the basis of the input inclination $X_{ci}$ of the pile. Details about the correction method will be described later.

After that, when the self-propelled cleaning robot 100 stops, the operation planning unit 14 determines whether or not the movement by the self-propelled cleaning robot 100 has been completed on the basis of all of the operation sequences included in the operation sequence table T1 (step S16).

Specifically, in step S16, in the case where an operation sequence that has not been loaded in step S3 exists among all of the operation sequences included in the operation sequence table T1, the operation planning unit 14 determines that the movement by the self-propelled cleaning robot 100 has not been completed (step S16, No). In this case, the operation planning unit 14 updates the sequence number to a number indicating the next movement step (step S17). After that, the process from step S3 is performed. In step S3, the operation planning unit 14 loads the operation sequence whose sequence number is the updated sequence number set in step S17.

On the other hand, in step S16, in the case where an operation sequence that has not been loaded in step S3 does not exist among all of the operation sequences included in the operation sequence table T1, the operation planning unit 14 determines that the movement by the self-propelled cleaning robot 100 has been completed (step S16, Yes). In this case, the process proceeds to step S1, and the processing circuit 9 returns to the standby state.

Also, assume that in step S4, the movement control unit 15 determines that a switch to the acceleration/deceleration mode is indicated (in step S4, $C_m$=2, acceleration/deceleration mode). In this case, the operation planning unit 14 sets the estimation command $C_s$ to "1", and outputs the set estimation command $C_s$ to the carpet weave estimation unit 19 (step S21). Consequently, the carpet weave estimation unit 19 estimates the inclination $X_{ci}$ of the pile on the basis of the set estimation command $C_s$. Also, as described above, the movement control unit 15 uses the target position $X_d$ and the command movement velocity $v_d$ input in step S3 to cause the self-propelled cleaning robot 100 to move in the acceleration/deceleration mode.

With this arrangement, after the self-propelled cleaning robot 100 performs the acceleration operation (step S22), when the self-propelled cleaning robot 100 reaches the command movement velocity $v_d$, the self-propelled cleaning robot 100 immediately performs the deceleration operation (step S23). When the self-propelled cleaning robot 100 comes to a stop due to the deceleration operation, the process from step S16 is performed.

Also, in step S4, in the case where the movement control unit 15 determines that a switch to the turning mode is indicated (in step S4, $C_m$=3, turning mode), as described above, the movement control unit 15 uses the command direction angle $\psi_d$ input in step S3 to cause the self-propelled cleaning robot 100 to perform a pivot turn (step S32).

When the movement control unit 15 determines that the pivot turn by the self-propelled cleaning robot 100 in step S32 has been completed (step S33, Yes), the process from step S16 is performed.

(Specific Example of Movement)

Next, a specific example of moving in accordance with the flow described above when the self-propelled cleaning robot 100 cleans will be described. In this specific example, the self-propelled cleaning robot 100 is assumed to move on the path illustrated in FIG. 13 when cleaning. Correspondingly, in step S2, it is assumed that the operation sequence table T1 illustrated on the left in FIG. 14 is generated.

In this case, in step S3 performed initially, the operation sequence whose sequence number is set to "1" is loaded from the operation sequence table T1 (FIG. 14). The operation sequence is information related to the path "Sequence 1" in FIG. 13. The control mode command $C_m$ included in the operation sequence has a value of "1". For this reason, in step S4, it is determined that a switch to the straight-ahead mode ($C_m$=1) is indicated ($C_m$=1, straight-ahead mode).

After that, the process from step S12 is performed, and the self-propelled cleaning robot 100 starts moving in the straight-ahead mode. With this arrangement, the self-propelled cleaning robot 100 accelerates until the movement velocity reaches the command movement velocity $v_d$. Also, the acceleration/deceleration notification $C_a$ set to "1" indicating that the self-propelled cleaning robot 100 is performing the acceleration operation is output to the carpet weave estimation unit 19 (step S12). With this arrangement, the inclination $X_{ci}$ of the pile is estimated by the carpet weave estimation unit 19. After accelerating up to the command movement velocity $v_d$, the self-propelled cleaning robot 100 moves at a constant velocity (step S13). Here, it is assumed that the estimation result of the inclination $X_{ci}$ of the pile is input into the movement control unit 15 while the self-propelled cleaning robot 100 is moving at a constant velocity. In this case, the target movement velocity $v_{dtg}$ and the target direction angle $\psi_{dtg}$ are corrected by the movement control unit 15 on the basis of the inclination $X_{ci}$ of the pile.

After that, when it is determined that the self-propelled cleaning robot 100 has reached the target position $X_d$=($L_1$, 0) (step S14, Yes), the self-propelled cleaning robot 100 starts a deceleration operation. Also, the acceleration/deceleration notification $C_a$ set to "1" indicating that the self-propelled cleaning robot 100 is performing the deceleration operation is output to the carpet weave estimation unit 19 (step S15). Here, it is assumed that the estimation result of the inclination $X_{ci}$ of the pile is input into the movement control unit 15 while the self-propelled cleaning robot 100 is performing the deceleration operation. Likewise, in this case, the target movement velocity $v_{dtg}$ and the target direction angle $\psi_{dtg}$ are corrected by the movement control unit 15 on the basis of the input inclination $X_{ci}$ of the pile.

After that, it is determined that the movement by the self-propelled cleaning robot 100 has not been completed (step S16, No), and the sequence number is updated to the number "2" indicating the next movement step (step S17).

Additionally, the process from step S3 is performed, and in step S3, the operation sequence whose sequence number is set to "2" is loaded from the operation sequence table T1 (FIG. 14). The operation sequence is information related to the path "Sequence 2" in FIG. 13. Because the control mode command $C_m$ included in the operation sequence has a value of "3", in step S4, it is determined that a switch to the turning mode ($C_m$=3) is indicated ($C_m$=3, turning mode).

As a result, the process from step S32 is performed, and in step S32, the command direction angle $\psi_d$ of "90" included in the operation sequence loaded in step S3 is used, and the self-propelled cleaning robot 100 is made to perform a pivot turn counterclockwise by "90" degrees.

Thereafter, the process from step S3 is performed similarly, and in step S3, the operation sequence whose sequence number is set to "3" is loaded from the operation sequence table T1 (FIG. 14). The operation sequence is information related to the path "Sequence 3" in FIG. 13. In this case, because the control mode command $C_m$ included in the operation sequence has a value of "1", like the operation sequence of the path "Sequence 1" in FIG. 13, the self-propelled cleaning robot 100 moves in the straight-ahead mode until reaching the target position $X_d$=($L_1$, $L_2$) included in the operation sequence. Thereafter, the process from step S3 is performed similarly using each operation sequence set in the operation sequence table T1. As a result, the self-propelled cleaning robot 100 moves along the path in FIG. 13 during the cleaning operation.

(Estimating Inclination of Pile)

Next, the inclination $X_{ci}$ of the pile estimated by the carpet weave estimation unit 19 will be described. As illustrated in FIG. 7, the pile P of a carpet can be approximated by a rigid bar in a two degree-of-freedom model coupled to a base B. In other words, the pile P is assumed to be freely pivotable in two arrow directions D1 and D2 through two joints J1 and J2 having viscoelastic properties.

Because of the structure of carpet, the pile P of the carpet is inclined in a certain specific direction in the initial state. When the wheels 2a and 2b of the self-propelled cleaning robot 100 pass over the pile P, the inclination of the pile P changes. As described above, the inclination of the pile P can be expressed by the degree of inclination ($X_c$=($x_c$, $y_c$)) in each of the x direction and the y direction in the absolute coordinate system $\Sigma$.

If the equation of motion for the self-propelled cleaning robot 100, the geometric constraint relationship between the self-propelled cleaning robot 100 and the pile P, and the above two degree-of-freedom model are used, it is possible to simulate a pile inclination $X_C$ when the self-propelled cleaning robot 100 moves over the carpet with numerical operations.

One example of the simulation results is illustrated in FIGS. 8, 9, and 10.

Note that the simulation presupposes that the self-propelled cleaning robot 100 moves over a typical carpet. Specifically, it is assumed that the weight of the self-propelled cleaning robot 100 is 4 kg and the maximum outer radius is 30 cm, similar to typical cleaning robots for home use. Also, it is assumed that the length of the pile P (the length of the fibers of the carpet, hereinafter the pile length) is 7 mm, and the interval at which the fibers of the pile P are arranged (hereinafter, the pile pitch) is 3 mm. Also, it is assumed that the elastic modulus of the pile P is 0.03 N/rad, and the viscous modulus of the pile P is 0.05 Ns/rad. Furthermore, FIGS. 9 and 10 illustrate simulation results of the translational acceleration ⌈a of the self-propelled cleaning robot 100 and the maximum value thereof in the case where the command movement velocity $v_d$ is set to 0.12 m/s.

The upper diagrams in FIG. 8 illustrate the simulation result of the behavior of the pile P in the $y_R$ direction when the self-propelled cleaning robot 100 is moving at a constant velocity. As illustrated in the upper-left diagram in FIG. 8, assume that the wheel 2b rotating at a constant velocity in the arrow direction D3 moves over the pile P, which is slightly inclined in the $x_R$ direction. In this case, as illustrated in the upper-right diagram in FIG. 8, the weight of the self-propelled cleaning robot 100 imposed on the pile P causes the pile P to be inclined farther in the $x_R$ direction compared to the state before the wheel 2b passed over as illustrated by the dashed lines.

Consequently, the self-propelled cleaning robot 100 lying on top of the pile P is influenced by drifting in the $x_R$ direction. For this reason, in the case where the pile inclination $X_c$ has an $x_R$ direction component, a phenomenon occurs in which the movement distance of the self-propelled cleaning robot 100 is extended or contracted compared to the distance set as the target.

On the other hand, in the case where the pile inclination $X_c$ has a $y_R$ direction (axle direction) component, the self-propelled cleaning robot 100 lying on top of the pile P is influenced by drifting in the $y_R$ direction. For this reason, in the case where the pile inclination $X_c$ has a $y_R$ direction component, a phenomenon occurs in which the movement direction of the self-propelled cleaning robot 100 is shifted away from the direction set as the target.

Consequently, if the inclination $X_{ci}=(x_{ci}, y_{ci})$ of the pile P at the current position X of the self-propelled cleaning robot 100 can be estimated, the influence that the inclination $X_{ci}$ of the pile P exerts on the movement of the self-propelled cleaning robot 100 can be anticipated.

On the other hand, the lower diagrams in FIG. 8 illustrate the simulation result of the behavior of the pile P in the $y_R$ direction when the self-propelled cleaning robot 100 accelerates from a still state. As illustrated in the lower-left diagram in FIG. 8, assume that after bringing the self-propelled cleaning robot 100 to a stop on the pile P inclined slightly in the $x_R$ direction, the wheel 2b is rotated rapidly in the arrow direction D3, causing the self-propelled cleaning robot 100 to accelerate. Because a torque is applied to the wheel 2b during the acceleration, as illustrated in the lower-right diagram in FIG. 8, the pile P is moved to be swept in the $-x_R$ direction by the wheel 2b.

In this way, when the self-propelled cleaning robot 100 accelerates, the inclination of the pile P changes more greatly than when the self-propelled cleaning robot 100 is moving at a constant velocity. Consequently, the behavior of the self-propelled cleaning robot 100 is influenced more than when moving at a constant velocity. The degree of influence can be observed by the translational acceleration ⌈a=(⌈$a_x$, ⌈$a_y$) of the self-propelled cleaning robot 100 measured by the acceleration sensor 5.

Note that when the self-propelled cleaning robot 100 decelerates, similarly to when the self-propelled cleaning robot 100 accelerates, a torque is applied to the wheel 2b, and the pile P is moved to be toppled in the $x_R$ direction by the wheel 2b. Consequently, when the self-propelled cleaning robot 100 decelerates, the behavior of the self-propelled cleaning robot 100 is likewise influenced more than when moving at a constant velocity. The degree of influence likewise can be observed by the translational acceleration ⌈a=(⌈$a_x$, ⌈$a_y$) of the self-propelled cleaning robot 100 measured by the acceleration sensor 5.

As above, when the self-propelled cleaning robot 100 accelerates (from time $t_{11}$ to time $t_{12}$ in FIG. 3) and decelerates (time $t_{13}$ and thereafter in FIG. 3), depending on the change in the inclination of the pile P, the behavior of the self-propelled cleaning robot 100 is influenced more than when moving at a constant velocity. Accordingly, when the self-propelled cleaning robot 100 accelerates and decelerates, if acceleration/deceleration notification $C_a$ set to "1" is input, the carpet weave estimation unit 19 estimates the inclination of the pile P on the basis of the translational acceleration ⌈a=(⌈$a_x$, ⌈$a_y$) measured by the acceleration sensor 5. With this arrangement, the carpet weave estimation unit 19 can estimate the inclination of the pile P more precisely than when moving at a constant velocity, on the basis of the translational acceleration ⌈a=(⌈$a_x$, ⌈$a_y$) that is greater than when moving at a constant velocity.

(Method of Estimating Inclination of Pile)

Next, a method of estimating the inclination $X_{ci}$ of the pile P by the carpet weave estimation unit 19 will be described. It is assumed that the self-propelled cleaning robot 100 in the still state is accelerated at a position where an $x_R$ direction component ⌈$x_{ci}$ of the inclination ⌈$X_{ci}$ of the pile P is 2 mm and a $y_R$ direction component ⌈$y_{ci}$ is ±2 mm. FIG. 9 illustrates a result obtained by simulating the change over time in the acceleration ⌈$a_x$ in the $x_R$ direction and the acceleration ⌈$a_y$ in the $y_R$ direction (axle direction) of the self-propelled cleaning robot 100 in this case on the basis of the approximation model of the pile P illustrated in FIG. 7.

As illustrated in the upper diagram in FIG. 9, the acceleration ⌈$a_x$ in the $x_R$ direction reaches a maximum value ⌈$a_{xm}$ immediately after the self-propelled cleaning robot 100 starts moving, and then decreases. Here, let $t_{m8}$ be the time when the acceleration ⌈$a_x$ decreases to 80% of the magnitude of the maximum value ⌈$a_{xm}$.

On the other hand, as illustrated in the lower-left diagram in FIG. 9, in the case where the $y_R$ direction component ⌈$y_{ci}$ of the inclination ⌈$X_{ci}$ of the pile P is a positive value (⌈$y_{ci}$>0), the acceleration ⌈$a_y$ in the $y_R$ direction takes a negative value immediately after the self-propelled cleaning robot 100 starts moving, and then inverts to a positive value. After that, the absolute value of the acceleration ⌈$a_y$ reaches a maximum value ⌈$a_{ym}$. Also, as illustrated in the lower-right diagram in FIG. 9, in the case where the $y_R$ direction component ⌈$y_{ci}$ of the inclination ⌈$X_{ci}$ of the pile P is a negative value (⌈$y_{ci}$<0), the change over time in the acceleration ⌈$a_y$ in the $y_R$ direction is the sign inverse of the lower-left diagram in FIG. 9, taking a positive value immediately after the self-propelled cleaning robot 100 starts moving, and then inverting to a negative value. After that, the absolute value of the acceleration ⌈$a_y$ reaches the maximum value ⌈$a_{ym}$, or in other words, the acceleration ⌈$a_y$ reaches a minimum value (the absolute value being the maximum negative value).

Next, the result of simulating the maximum value $\lceil a_{xm}$ of the acceleration $\lceil a_x$ in the $x_R$ direction according to the inclination $\lceil X_{ci}$ of the pile P is illustrated in the upper-left diagram in FIG. 10. In the upper-left diagram in FIG. 10, the horizontal axis represents the $x_R$ direction component $\lceil x_{ci}$ of the inclination $\lceil X_{ci}$ of the pile P. The vertical axis represents the maximum value $\lceil a_{ax}$ of the acceleration $\lceil a_x$ in the $x_R$ direction. As illustrated in the upper-left diagram in FIG. 10, the maximum value $\lceil a_{xm}$ of the acceleration $\lceil a_x$ in the $x_R$ direction can be approximated by the quadratic curve expressed by Formula (9) above.

Next, the result of simulating the maximum value $\lceil a_{ym}$ of the acceleration $\lceil a_y$ in the $y_R$ direction according to the inclination $\lceil X_{ci}$ of the pile P is illustrated in diagram on the right in FIG. 10. In the diagram on the right in FIG. 10, the horizontal axis represents the $x_R$ direction component $\lceil x_{ci}$ of the inclination $\lceil X_{ci}$ of the pile P. The depth axis represents the $y_R$ direction component $\lceil y_{ci}$ of the inclination $\lceil X_{ci}$ of the pile P. The height axis represents the maximum value $\lceil a_{ym}$ of the acceleration $\lceil a_y$ in the $y_R$ direction and the $-y_R$ direction.

Also, the result of simulating the time $t_{m8}$ when the acceleration $\lceil a_x$ in the $x_R$ direction reaches 80% of the magnitude of the maximum value $\lceil a_{xm}$ according to the inclination $\lceil X_{ci}$ of the pile P is illustrated in the lower-left diagram in FIG. 10. In the lower-left diagram in FIG. 10, the horizontal axis represents the $x_R$ direction component $\lceil x_{ci}$ of the inclination $\lceil X_{ci}$ of the pile P. The vertical axis represents the time $t_{m8}$.

The maximum value $\lceil a_{ym}$ of the acceleration $\lceil a_y$ in the $y_R$ direction can be approximated from the three simulation results illustrated in FIG. 10 by Formula (10) above.

Consequently, if the maximum value $\lceil a_{xm}$ of the acceleration $\lceil a_x$ in the $X_R$ direction and the maximum value $\lceil a_{ym}$ of the acceleration $\lceil a_y$ in the $y_R$ direction are measured by the acceleration sensor 5, the $x_R$ direction component $\lceil x_{ci}$ of the inclination $\lceil X_{ci}$ of the pile P can be estimated using the measured maximum value $\lceil a_{xm}$ of the acceleration $\lceil a_x$ in the $x_R$ direction, the command movement velocity $v_d$, and Formula (9). Also, the $y_R$ direction component $\lceil y_{ci}$ of the inclination $\lceil X_{ci}$ of the pile P can be estimated using the $X_R$ direction component $\lceil x_{ci}$ of the inclination $\lceil X_{ci}$ of the pile P estimated, the measured maximum value $\lceil a_{ym}$ of the acceleration $\lceil a_y$ in the $y_R$ direction, the command movement velocity $v_d$, and Formula (10).

Furthermore, Formulas (11), (12), and (13) above for deriving the inclination $X_{ci}=(x_{ci}, y_{ci})$ of the pile P in the absolute coordinate system $\Sigma$ can be obtained using Formulas (9) and (10) above and the current direction angle $\psi$ computed by the odometry calculation unit 18.

As above, the carpet weave estimation unit 19 estimates the inclination $X_{ci}=(x_{ci}, y_{ci})$ of the pile P in the absolute coordinate system $\Sigma$ by using the translational acceleration $\lceil a=(\lceil a_x, \lceil a_y)$ measured by the acceleration sensor 5, the current direction angler computed by the odometry calculation unit 18, and Formulas (11) to (13) above.

In other words, the carpet weave estimation unit 19 estimates the component $\lceil x_{ci}$ in the $x_R$ direction of the inclination $\lceil X_{ci}$ of the pile P in the robot coordinate system $\Sigma_R$ by using an expression proportional to the square root of the maximum value $\lceil a_{xm}$ of the component in the $x_R$ direction of the translational acceleration $\lceil a$, which is obtained by dividing Formula (11) above by the rotation matrix $R_r$. In addition, the carpet weave estimation unit 19 estimates the component $\lceil_{ci}$ in the $y_R$ direction of the inclination $\lceil X_{ci}$ of the pile P in the robot coordinate system $\Sigma_R$ by using an expression proportional to the maximum value $\lceil a_{ym}$ in the $y_R$ direction of the translational acceleration $\lceil a$ and also inversely proportional to an exponential function using the square root of the maximum value $\lceil a_{xm}$ of the component in the $x_R$ direction of the translational acceleration $\in a$, which is obtained by dividing Formula (12) by the rotation matrix $R_r$. Furthermore, the carpet weave estimation unit 19 estimates the inclination $X_{ci}=(x_{ci}, y_{ci})$ of the pile P in the absolute coordinate system $\Sigma$ by multiplying the estimated inclination $\in X_{ci}$ of the pile P in the robot coordinate system $\Sigma_R$ by the rotation matrix $R_r$ expressed by Formula (13) using the current direction angle $\psi$ computed by the odometry calculation unit 18.

Note that the above gain constants $K_x$ and $K_y$ are adjusted according to differences in the mechanism of the self-propelled cleaning robot 100 (such as the weight and size) and differences in the material of the carpet (such as the length of the pile P and the viscoelastic properties of the pile P). For example, it is sufficient to adjust the gain constants $K_x$ and $K_y$ on the basis of simulated or experimental results corresponding to the mechanism of the self-propelled cleaning robot 100 acting as the target. Also, if the material of the carpet under the moving self-propelled cleaning robot 100 is known, it is sufficient to adjust the gain constants $K_x$ and $K_y$ in accordance with the material of the carpet. In the case where the material of the carpet is unknown, the gain constants $K_x$ and $K_y$ may be adjusted by treating the material of the carpet as a typical carpet material (such as a pile length of 7 mm and a pile pitch of 3 mm, for example). In this case, even if the carpet is of an unknown material, the influence exerted on the movement of the self-propelled cleaning robot 100 by the inclination $X_{ci}$ of the pile P can be reduced to some degree.

(Estimation Operation for Estimating Inclination $X_{ci}$ of pile P by Carpet Weave Estimation Unit 19)

Figure 16:
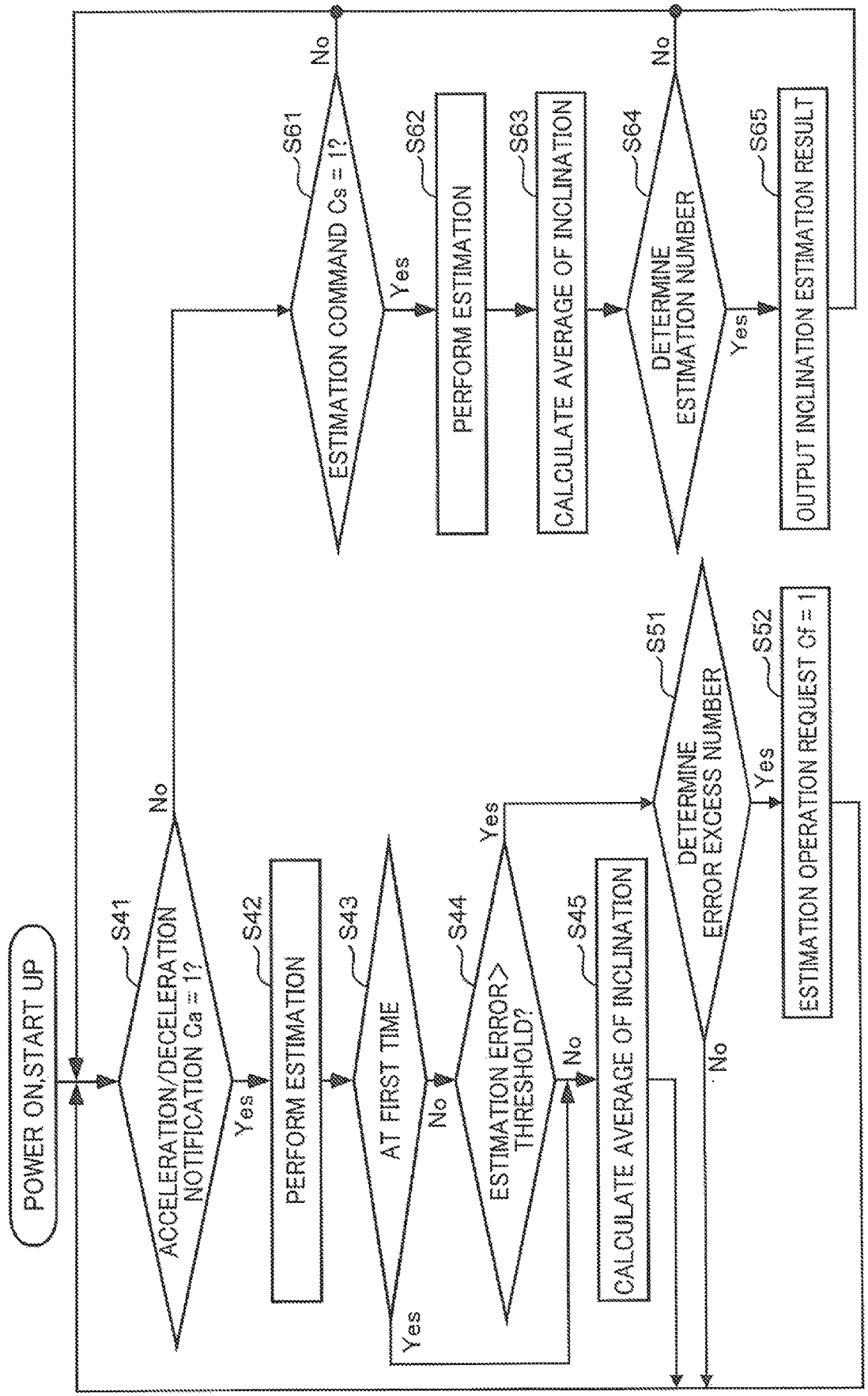
FIG. 16 is a flowchart illustrating one example of an estimation operation by the self-propelled cleaning robot according to the second embodiment.

Next, the estimation operation for estimating the inclination $X_{ci}$ of the pile P by the carpet weave estimation unit 19 will be described with reference to FIG. 16. FIG. 16 is a flowchart illustrating one example of an estimation operation by the self-propelled cleaning robot 100 according to the second embodiment.

As illustrated in FIG. 16, after the self-propelled cleaning robot 100 starts up, the carpet weave estimation unit 19 enters a standby state waiting for the input of the acceleration/deceleration notification $C_a$ from the movement control unit 15. Additionally, when the acceleration/deceleration notification $C_a$ set to "1" is input (step S41, Yes), the carpet weave estimation unit 19 determines that the self-propelled cleaning robot 100 is in an accelerating or decelerating state, and estimates the inclination $X_{ci}$ of the pile P according to the method described above (step S42).

In the case of performing step S42 for the first time after the acceleration/deceleration notification $C_a$ set to "1" is input (step S43, Yes), the carpet weave estimation unit 19 sets the inclination $X_{ci}=(x_{ci}, y_{ci})$ of the pile P estimated in step S42 as an average $X_{cia}=(X_{cia}, Y_{cia})$ of the inclination. $X_{ci}$ of the pile P (step S45). Thereafter, the process from step S42 is repeated until the acceleration/deceleration notification $C_a$ set to a value different from "1" is input into the carpet weave estimation unit 19 (step S41, Yes).

In the case where step S42 is performed for the second and subsequent times after the acceleration/deceleration notification $C_a$ set to "1" is input (step S43, No), the carpet weave estimation unit 19 determines whether or not the error between the inclination $X_{ci}$ of the pile P estimated in the current step S42 and the average $X_{cia}$ of the inclination $X_{ci}$ of the pile P exceeds a threshold (step S44).

Specifically, in step S44, the carpet weave estimation unit 19 uses a threshold $x_{e1}$ for the x direction component and a threshold $y_{e1}$ for the y direction component of the inclination $X_{ci}$ of the pile P to determine the error as follows. That is, it is assumed that the absolute value of the difference between the x direction component $x_{ci}$ of the inclination $X_{ci}$ of the pile P estimated in the current step S42 and the x direction component $x_{cia}$ of the average $X_{cia}$ of the inclination $X_{ci}$ of the pile P is less than or equal to the threshold $x_{e1}$ ($|x_{cia}-x_{ci}| \leq x_{e1}$), and in addition, the absolute value of the difference between the y direction component $y_{ci}$ of the inclination $X_{ci}$ of the pile P estimated in the current step S42 and the y direction component $y_{cia}$ of the average $X_{cia}$ of the inclination $X_{ci}$ of the pile P is less than or equal to the threshold $y_{e1}$ ($|y_{cia}-y_{ci}| \leq y_{e1}$). In this case, the carpet weave estimation unit 19 determines that the error does not exceed the threshold (step S44, No). Consequently, the carpet weave estimation unit 19 determines that a change has not occurred in the inclination $X_{ci}$ of the pile P.

On the other hand, it is assumed that the absolute value of the difference between the x direction component $x_{ci}$ of the inclination $X_{ci}$ of the pile P estimated in the current step S42 and the x direction component $x_{cia}$ of the average $X_{cia}$ of the inclination $X_{ci}$ of the pile P is larger than the threshold $x_{e1}$ ($|x_{cia}-x_{ci}| > x_{e1}$), or, the absolute value of the difference between the y direction component $y_{ci}$ of the inclination $X_{ci}$ of the pile P estimated in the current step S42 and the y direction component $y_{cia}$ of the average $X_{cia}$ of the inclination $X_{ci}$ of the pile P is larger than the threshold $y_{e1}$ ($|y_{cia}-y_{ci}| > y_{e1}$). In these cases, the carpet weave estimation unit 19 determines that the error exceeds the threshold (step S44, Yes).

In step S44, in the case of determining that the error does not exceed the threshold (step S44, No), the carpet weave estimation unit 19 computes the average of the inclination $X_{ci}$ of the pile P estimated in the current step S42 and the inclination $X_{ci}$ of the pile P used to compute the current average of the inclination $X_{ci}$ of the pile P as the new average $X_{cia}$ of the inclination $X_{ci}$ of the pile P (step S45).

On the other hand, in step S44, in the case of determining that the error exceeds the threshold (step S44, Yes), the carpet weave estimation unit 19 determines whether or not the error has been determined to exceed the threshold in step S44 a predetermined number of times (for example, two times) consecutively (step S51).

In step S51, in the case of determining that the error has been determined to exceed the threshold in step S44 the predetermined number of times consecutively (step S51, Yes), the carpet weave estimation unit 19 determines that the state of the inclination $X_{ci}$ of the pile P has changed during the movement of the self-propelled cleaning robot 100, or that a change has occurred in the inclination $X_{ci}$ of the pile P due to a change in the type of carpet that the self-propelled cleaning robot 100 is moving over. In this case, the carpet weave estimation unit 19 sets the estimation operation request $C_f$ to "1", and outputs the estimation operation request $C_f$ set to "1" to the operation planning unit 14 (step S52).

When the estimation operation request $C_f$ set to "1" is input from the carpet weave estimation unit 19, the operation planning unit 14 newly generates the estimation operation sequence table T2 illustrated in FIG. 14. The estimation operation sequence table T2 is a table stipulating information (hereinafter, an estimation operation sequence) related to each of one or more operations for estimation to be performed by the self-propelled cleaning robot 100 to estimate the inclination $X_{ci}$ of the pile P.

Like the operation sequence, the estimation operation sequence includes a sequence number (for example, 1) indicating the order in which the self-propelled cleaning robot 100 operates according to each operation for estimation, the target position $X_d = (X_d, y_d)$ (for example, (−, −)) that acts as the end point when the self-propelled cleaning robot 100 moves during each operation for estimation, the command movement velocity $v_d$ (for example, $v_s$), the command direction angle $\psi_d$ (for example, 180), the control mode command $C_m$ (for example, 2), and the estimation command $C_s$ (for example, 1) when the self-propelled cleaning robot 100 moves during each operation for estimation.

Specifically, when the estimation operation request $C_f$ set to "1" is input, the operation planning unit 14 reads six estimation operation sequences pre-stored in the non-volatile memory provided in the processing circuit 9, and thereby generates the estimation operation sequence table T2 including the six estimation operation sequences as illustrated by the diagram on the right in FIG. 14.

Additionally, when the estimation operation request $C_f$ set to "1" is input from the carpet weave estimation unit 19, the operation planning unit 14 references the command direction angle $\psi_d$ (for example, 180) included in the operation sequence loaded in step S3 (for example, the operation sequence with the sequence number "5"). In addition, the operation planning unit 14 changes the command direction angle $\psi_d$ included in the estimation operation sequences with the sequence numbers "1", "2", and "6" to the referenced command direction angle $\psi_d$. Furthermore, the operation planning unit 14 changes the command direction angle $\psi_d$ included in the estimation operation sequences with the sequence numbers "3", "4", and "5" to an angle (for example, −90 or 270) rotated 90 degrees counterclockwise from the referenced command direction angle $\psi_d$ (for example, 180).

Note that in the estimation operation sequence table T2 illustrated in FIG. 14, the target position $X_d = (-, -)$ included in each estimation operation sequence indicates that the operation for estimation indicated by each estimation operation sequence is a short-duration acceleration/deceleration operation, and that the target position $X_d$ is not stipulated.

When the estimation operation sequence table T2 is generated by the operation planning unit 14, the movement control unit 15 pauses the movement of the self-propelled cleaning robot 100 according to the operation sequence included in the operation sequence table T1. After that, a process similar to the process from step S3 illustrated in FIG. 15 is performed using each estimation operation sequence included in the estimation operation sequence table T2 instead of each operation sequence included in the operation sequence table T1. With this arrangement, the inclination $X_{ci}$ of the pile is estimated by the carpet weave estimation unit 19 at timings according to each operation for estimation while the movement control unit 15 causes the self-propelled cleaning robot 100 to move on a path following each estimation operation sequence included in the estimation operation sequence table T2.

For example, in step S3 (FIG. 15), first, the estimation operation sequence with the sequence number "1" is loaded. The estimation operation sequence is information related to the path "Estimation Operation Sequence 1" in FIG. 13. The control mode command $C_m$ included in the estimation operation sequence has a value of "2". For this reason, in step S4 (FIG. 15), it is determined that a switch to the acceleration/deceleration mode ($C_m=2$) is indicated ($C_m=2$, acceleration/deceleration mode). In this case, because the estimation command $C_s$ included in the estimation operation sequence has a value of "1", in step S21 (FIG. 15), the operation planning unit 14 sets the estimation command $C_s$ to "1", and outputs the set estimation command $C_s$ to the carpet weave estimation unit 19.

With this arrangement, as illustrated in FIG. 16, when the acceleration/deceleration notification $C_a$ set to "1" is not input (step S41, No) but rather the estimation command $C_s$ set to "1" is input (step S61, Yes), similarly to step S42, the carpet weave estimation unit 19 estimates the inclination $X_{ci}$ of the pile P according to the method described above (step S62). The carpet weave estimation unit 19 computes the average of the inclination $X_{ci}$ of the pile P estimated in step S62 while the movement control unit 15 is causing the self-propelled cleaning robot 100 to move on the path following each estimation operation sequence included in the estimation operation sequence table T2 (step S63).

At this point, assume that the number of times that step S62 is executed, or in other words, the number of times that the inclination $X_{ci}$ of the pile P is estimated, reaches a predetermined number of times (step S64, Yes). In this case, the carpet weave estimation unit 19 outputs the average calculated in step S63 as the estimation result of the inclination $X_{ci}$ of the pile P (step S65).

Note that the predetermined number of times used in step S64 is stipulated to be the number of estimation operation sequences for which the value of the estimation command $C_s$ is set to "1" in the estimation operation sequence table T2. For example, in the estimation operation sequence table T2 illustrated in FIG. 14, the value of the estimation command $C_s$ is set to "1" in the four estimation operation sequences with the sequence numbers "1", "2", "4", and "5". For this reason, the predetermined number of times used in step S64 is stipulated to be "4".

When the self-propelled cleaning robot 100 completes the operations according to all of the estimation operation sequences included in the estimation operation sequence table T2, the process from step S3 in FIG. 15 is performed using each operation sequence starting from the operation sequence that was paused in the operation sequence table T1. With this arrangement, the self-propelled cleaning robot 100 resumes movement on the path indicated by each operation sequence from the paused operation sequence.

(Specific Example of Operation According to Estimation Operation Sequence)

Next, a specific example of the self-propelled cleaning robot 100 operating according to an estimation operation sequence will be described. In this specific example, the self-propelled cleaning robot 100 is assumed to move on the path illustrated in FIG. 13 when cleaning. Additionally, it is assumed that step S52 (FIG. 16) is executed while the self-propelled cleaning robot 100 is performing a deceleration operation after starting to move on the path according to the operation sequence with the sequence number "5" (the path "Sequence 5" illustrated in FIG. 13). As a result, it is assumed that the estimation operation sequence table T2 illustrated in the diagram on the right in FIG. 14 is generated by the operation planning unit 14, and the process from step S3 is executed.

In this case, first, the estimation operation sequence whose sequence number is set to "1" is loaded from the estimation operation sequence table T2. The estimation operation sequence is information related to the operation for estimation "Estimation Operation Sequence 1" in FIG. 13. The control mode command $C_m$ included in the estimation operation sequence has a value of "2". For this reason, in step S4 (FIG. 15), it is determined that a switch to the acceleration/deceleration mode ($C_m=2$) is indicated ($C_m=2$, acceleration/deceleration mode).

In this case, because the estimation command $C_s$ included in the estimation operation sequence has a value of "1", in step S21 (FIG. 15), the operation planning unit 14 sets the estimation command $C_s$ to "1", and outputs the set estimation command $C_s$ to the carpet weave estimation unit 19. With this arrangement, the process from step S62 in FIG. 16 is performed Subsequently, after the self-propelled cleaning robot 100 performs the acceleration operation (step S22) and reaches the command movement velocity $v_d$ "$v_s$" included in the estimation operation sequence, the self-propelled cleaning robot 100 immediately performs the deceleration operation (step S23). After that, it is determined that the movement by the self-propelled cleaning robot 100 has not been completed (step S16, No), and the sequence number is updated to the number "2" indicating the next movement step (step S17).

Additionally, the process from step S3 is performed, and in step S3, the estimation operation sequence whose sequence number is set to "2" is loaded from the estimation operation sequence table T2 (FIG. 14). The estimation operation sequence is information related to the operation for estimation "Estimation Operation Sequence 2" in FIG. 13. In this case, because the estimation command $C_s$ included in the estimation operation sequence has a value of "1", in step S21 (FIG. 15), the operation planning unit 14 sets the estimation command $C_s$ to "1", and outputs the set estimation command $C_s$ to the carpet weave estimation unit 19. With this arrangement, the process from step S62 in FIG. 16 is performed Also, the command movement velocity $v_d$ included in the estimation operation sequence is set to "$-v_s$", which indicates movement at the same speed but in the opposite direction from the command movement velocity $v_d$ "$v_s$" included in the estimation operation sequence with the sequence number "1". For this reason, the self-propelled cleaning robot 100 subsequently performs the acceleration operation in the opposite direction from the movement direction in the operation for estimation "Estimation Operation Sequence 1" (step S22). After that, when the movement velocity of the self-propelled cleaning robot 100 reaches the command movement velocity $v_d$ "$-v_s$" included in the estimation operation sequence, the self-propelled cleaning robot 100 immediately performs the deceleration operation (step S23). Consequently, the self-propelled cleaning robot 100 returns to substantially the same position as the position when the operation according to the operation for estimation "Estimation Operation Sequence 1" was started.

Additionally, the process from step S3 is performed, and in step S3, the estimation operation sequence whose sequence number is set to "3" is loaded from the estimation operation sequence table T2 (FIG. 14). The estimation operation sequence is information related to the operation for estimation "Estimation Operation Sequence 3" in FIG. 13. In this case, because the control mode command $C_m$ included in the estimation operation sequence has a value of "3", in step S4, it is determined that a switch to the turning mode ($C_m=3$) is indicated ($C_m=3$, turning mode). As a result, the process from step S32 is performed, and in step S32, and the self-propelled cleaning robot 100 is made to perform a pivot turn counterclockwise by "90" degrees so that the current direction angle ψ of "180" becomes the command direction angle $ψ_d$ of "-90" included in the estimation operation sequence loaded in step S3.

Thereafter, the estimation operation sequences with the sequence numbers "4" and "5" are consecutively loaded from the estimation operation sequence table T2 in a similar way. In this case, as illustrated by the operations for estimation "Estimation Operation Sequence 4" and "Estimation Operation Sequence 5" in FIG. 13, the self-propelled cleaning robot 100 performs the acceleration operation (step S22) and the deceleration operation (step S23) in a direction perpendicular to the movement direction when executing the operations for estimation "Estimation Operation Sequence 1" and "Estimation Operation Sequence 2" (FIG. 13) indicated by the estimation operation sequences with the sequence numbers "1" and "2". Note that before the above two operations for estimation "Estimation Operation Sequence 4" and "Estimation Operation Sequence 5" (FIG. 13) are performed, in step S21, the estimation command $C_s$ set to "1" is output to the carpet weave estimation unit 19, and the process from step S62 (FIG. 16) is performed.

After that, the estimation operation sequence with the sequence number "6" is loaded from the estimation operation sequence table T2, and as illustrated by the operation for estimation "Estimation Operation Sequence 6" in FIG. 13, the self-propelled cleaning robot 100 performs a pivot turn in the opposite direction compared to when executing the operation for estimation "Estimation Operation Sequence 3" (FIG. 13) with the sequence number "3" (step S33). In other words, the self-propelled cleaning robot 100 pivots clockwise by "90" degrees such that the current direction angle $\psi$ of the self-propelled cleaning robot 100 returns to the current direction angle $\psi$ "180" that is used before the self-propelled cleaning robot 100 performs the above six operations for estimation.

In this way, in this specific example, by performing the six estimation operations included in the estimation operation sequence table T2, the self-propelled cleaning robot 100 accelerates and decelerates in each of two directions perpendicular to each other, and during this time, the process from step S62 (FIG. 16) is performed four times. As a result, in step S64 (FIG. 16) it is determined that the number of times that the inclination $X_{ci}$ of the pile P is estimated has reached the predetermined number of times (step S64, Yes), and the average calculated in step S63 is output as the estimation result of the inclination $X_{ci}$ of the pile P (step S65).

When the self-propelled cleaning robot 100 completes the operations according to the six estimation operation sequences included in the estimation operation sequence table T2, the process from step S3 in FIG. 15 is performed using each operation sequence starting from the paused operation sequence with the sequence number "5". With this arrangement, the self-propelled cleaning robot 100 resumes movement on the path indicated by each operation sequence from the sequence number "5" using the estimation result of the inclination $X_{ci}$ of the pile P output in step S65.

When the inclination $X_{ci}=(x_{ci}, y_{ci})$ of the pile P estimated by the carpet weave estimation unit 19 is input, the movement control unit 15 computes the target movement velocity $v_{dtg}$ and the target direction angle $\psi_{dtg}$ using Formulas (14) and (15) above based on the inclination $X_{ci}$ of the pile P. In other words, the movement control unit 15 corrects the target movement velocity $v_{dtg}$ computed according to Formula (1) by the correction movement velocity $K_{vc}R_r^{-1}C_{ci}$, and corrects the target direction angle $\psi_{dtg}$ computed according to Formula (3) by the correction direction angle $K_{\psi c} R_r^{-1} y_{ci}$.

In other words, the movement control unit 15 uses Formula (14) to control the target movement velocity $v_{dtg}$ according to the component $R_r^{-1}x_{ci}$ in the direction parallel to the straight-ahead direction (the $x_R$ direction) of the self-propelled cleaning robot 100 in the inclination $X_{ci}$ of the pile P estimated by the carpet weave estimation unit 19. Also, the movement control unit 15 uses Formula (15) to control the target direction angle $\psi_{dtg}$ indicating the movement direction of the self-propelled cleaning robot 100 according to the component $R_r^{-1}y_{ci}$ in the direction perpendicular to the straight-ahead direction of the self-propelled cleaning robot 100 and also parallel direction (the $y_R$ direction) to the floor in the inclination $X_{ci}$ of the pile P estimated by the carpet weave estimation unit 19.

Consequently, when the target movement velocity $v_{dtg}$ is adjusted by the movement control unit 15 using Formula (14), the influence whereby the self-propelled cleaning robot 100 drifts in the straight-ahead direction ($x_R$ direction) and the movement distance of the self-propelled cleaning robot 100 is extended or contracted compared to normal is reduced. Also, when the target direction angle $\psi_{dtg}$ is adjusted by the movement control unit 15 using Formula (15), the influence whereby the self-propelled cleaning robot 100 drifts in the axle direction ($y_R$ direction) is reduced.

As above, in the self-propelled cleaning robot 100 of the present embodiment, when the self-propelled cleaning robot 100 accelerates and decelerates, the acceleration/deceleration notification $C_a$ set to "1" is input to the carpet weave estimation unit 19. With this arrangement, in the carpet weave estimation unit 19, the inclination $X_{ci}$ of the pile P is estimated on the basis of the translational acceleration ⌈a measured by the acceleration sensor 5. Furthermore, the movement velocity and the movement direction of the self-propelled cleaning robot 100 are adjusted on the basis of the estimation result of the inclination $X_{ci}$ of the pile P.

For this reason, in the case where the self-propelled cleaning robot 100 is moving, it is possible to reduce the influence on the movement velocity and the movement direction of the self-propelled cleaning robot 100 exerted by the inclination $X_{ci}$ of the pile P on the floor where the self-propelled cleaning robot 100 has accelerated or decelerated just before. As a result, the self-propelled cleaning robot 100 can precisely follow the path planned by the operation planning unit 14.

Also, in the self-propelled cleaning robot 100 of the present embodiment, the inclination $X_{ci}$ of the pile P is estimated when the self-propelled cleaning robot 100 accelerates/decelerates. For this reason, when estimating the inclination $X_{ci}$ of the pile P, the value of the translational acceleration ⌈a measured by the acceleration sensor 5 becomes a larger value than in the case of estimating the inclination $X_{ci}$ of the pile P while the self-propelled cleaning robot 100 is moving at a constant velocity. With this arrangement, the precision of the estimation of the inclination $X_{ci}$ of the pile P performed using the translational acceleration ⌈a can be increased compared to the case of estimating the inclination $X_{ci}$ of the pile P while the self-propelled cleaning robot 100 is moving at a constant velocity.

In addition, it is sufficient to provide the self-propelled cleaning robot 100 with the acceleration sensor 5 to estimate the inclination $X_{ci}$ of the pile P, thereby enabling estimation of the inclination $X_{ci}$ of the pile P and control of the movement velocity and the movement direction based on the estimation result with a simple configuration. Consequently, according to the self-propelled cleaning robot 100, the planned path can be followed precisely to perform cleaning accurately, and efficient cleaning can be achieved without leaving behind uncleaned areas.

Also, with the self-propelled cleaning robot 100 of the present embodiment, in the case where the carpet weave estimation unit 19 determines that a change has occurred in the estimation result of the inclination $X_{ci}$ of the pile P, operations for estimation that cause the self-propelled cleaning robot 100 to accelerate and decelerate are planned. For this reason, the inclination $X_{ci}$ of the pile P can be estimated again on the basis of the translational acceleration ⌈a measured by the acceleration sensor 5 while the planned operations for estimation are being performed.

With this arrangement, even in the case where the carpet over which the self-propelled cleaning robot 100 moves contains a plurality of regions with different inclinations $X_{ci}$ of the pile P, it is possible to appropriately estimate the inclination $X_{ci}$ of the pile P corresponding to each region through which the self-propelled cleaning robot 100 moves. As a result, the influence that the inclination $X_{ci}$ of the pile P in each region exerts on the movement velocity and the movement direction of the self-propelled cleaning robot 100 can be reduced, and the self-propelled cleaning robot 100 can be made to move on an accurate path even on a carpet containing a plurality of regions with different inclinations $X_{ci}$ of the pile P.

Further, in the self-propelled cleaning robot 100 of the present embodiment, the inclination $X_{ci}$ of the pile P can be estimated on the basis of the translational acceleration ⌈a measured by the acceleration sensor 5 when the self-propelled cleaning robot 100 accelerates and decelerates in each of two directions perpendicular to each other. With this arrangement, the inclination $X_{ci}$ of the pile P can be estimated precisely compared to the case of causing the self-propelled cleaning robot 100 to perform acceleration and deceleration operations in one direction only.

Note that the estimation operation sequence table T2 described above is not limited to the six estimation operation sequences illustrated in FIG. 14, and may also include estimation operation sequences related to various operations for estimation for raising the estimation precision of the inclination $X_{ci}$ of the pile P. For example, the estimation operation sequence table T2 may also include estimation operation sequences related to operations for estimation that cause the carpet weave estimation unit 19 to estimate the inclination $X_{ci}$ of the pile P while the self-propelled cleaning robot 100 is made to advance and retreat in the same direction. Additionally, the estimation operation sequence table T2 may also include estimation operation sequences related to operations for estimation that cause the carpet weave estimation unit 19 to estimate the inclination $X_{ci}$ of the pile P while the self-propelled cleaning robot 100 is made to move in two directions between which an angle of 90 degrees or some other angle is obtained.

(First Modification of Second Embodiment)

Next, a first modification of the second embodiment of the present disclosure will be described in detail with reference to the drawings. The second embodiment describes an example where, in steps S42 to S45 and step S51 (FIG. 16), while the self-propelled cleaning robot 100 is accelerating or decelerating, the carpet weave estimation unit 19 repeatedly estimates the inclination $X_{ci}$ of the pile P, and determines whether or not a change has occurred in the inclination $X_{ci}$ of the pile P on the basis of the difference between the currently estimated inclination $X_{ci}$ of the pile P and the previously estimated inclination $X_{ci}$ of the pile P.

However, in some cases, the floor over which the self-propelled cleaning robot 100 moves is a carpet that includes neighboring carpet blocks (a first carpet region and a second carpet region) having mutually different inclinations $X_{ci}$ of the pile P. When the self-propelled cleaning robot 100 moves over such a carpet, the influence that the inclination $X_{ci}$ of the pile P exerts on the movement of the self-propelled cleaning robot 100 changes every time the carpet block under the moving self-propelled cleaning robot 100 changes.

Accordingly, to reduce the above changes in the influence, the carpet weave estimation unit 19 may additionally estimate that the self-propelled cleaning robot 100 has moved over a boundary between the neighboring carpet blocks on the basis of the translational acceleration ⌈a measured by the acceleration sensor 5 while the self-propelled cleaning robot 100 is moving at a constant velocity. Additionally, in the case of estimating that the self-propelled cleaning robot 100 has moved over the boundary, the carpet weave estimation unit 19 may change the estimation result of the inclination $X_{ci}$ of the pile P to an estimation result of the inclination $X_{ci}$ of the pile P at the time when the self-propelled cleaning robot 100 previously moved over the carpet block after crossing the boundary.

Figure 17:
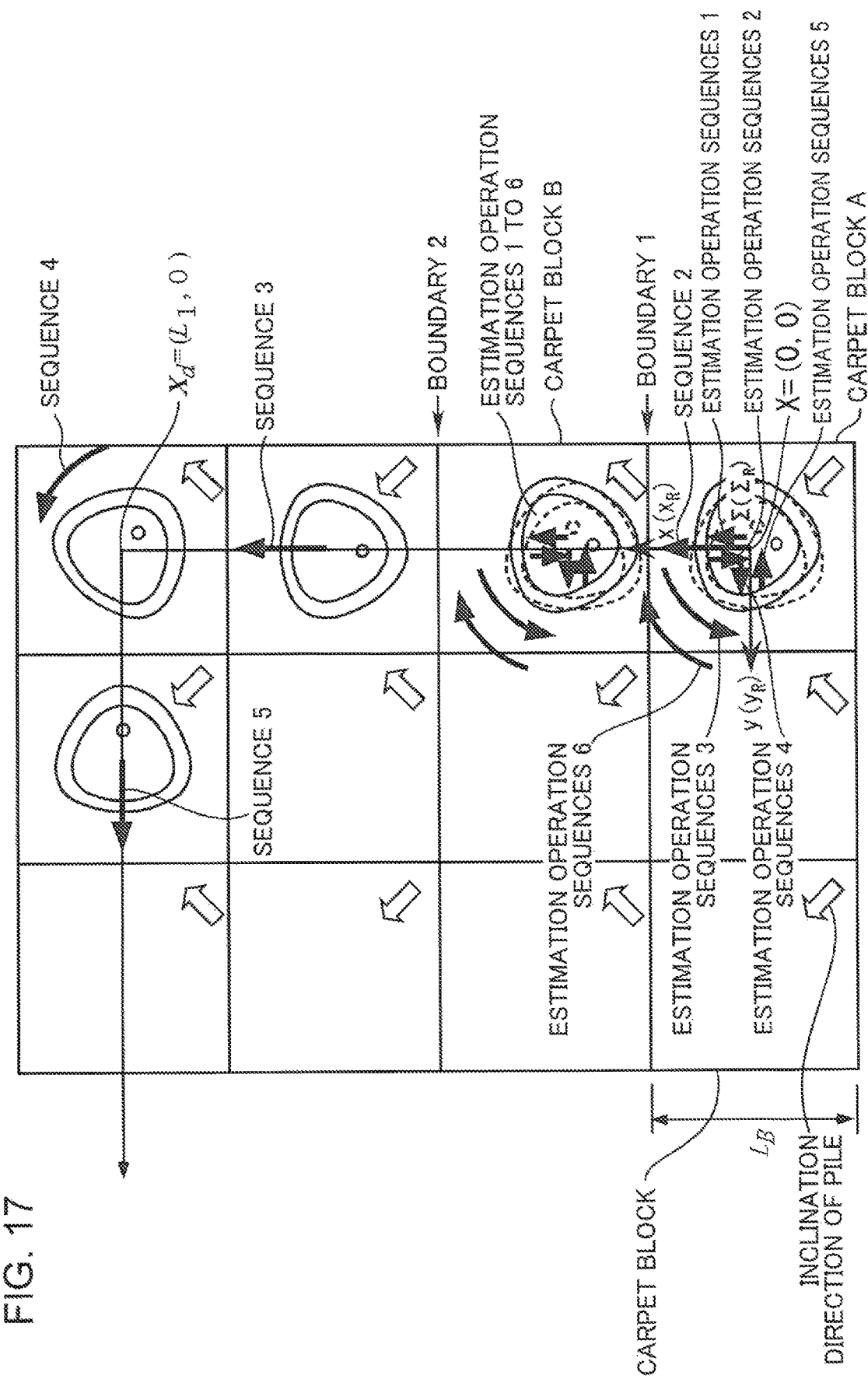
FIG. 17 is a diagram illustrating one example of a path on which the self-propelled cleaning robot according to a first modification of the second embodiment moves when cleaning a floor carpeted with square carpet blocks.
Figure 18:
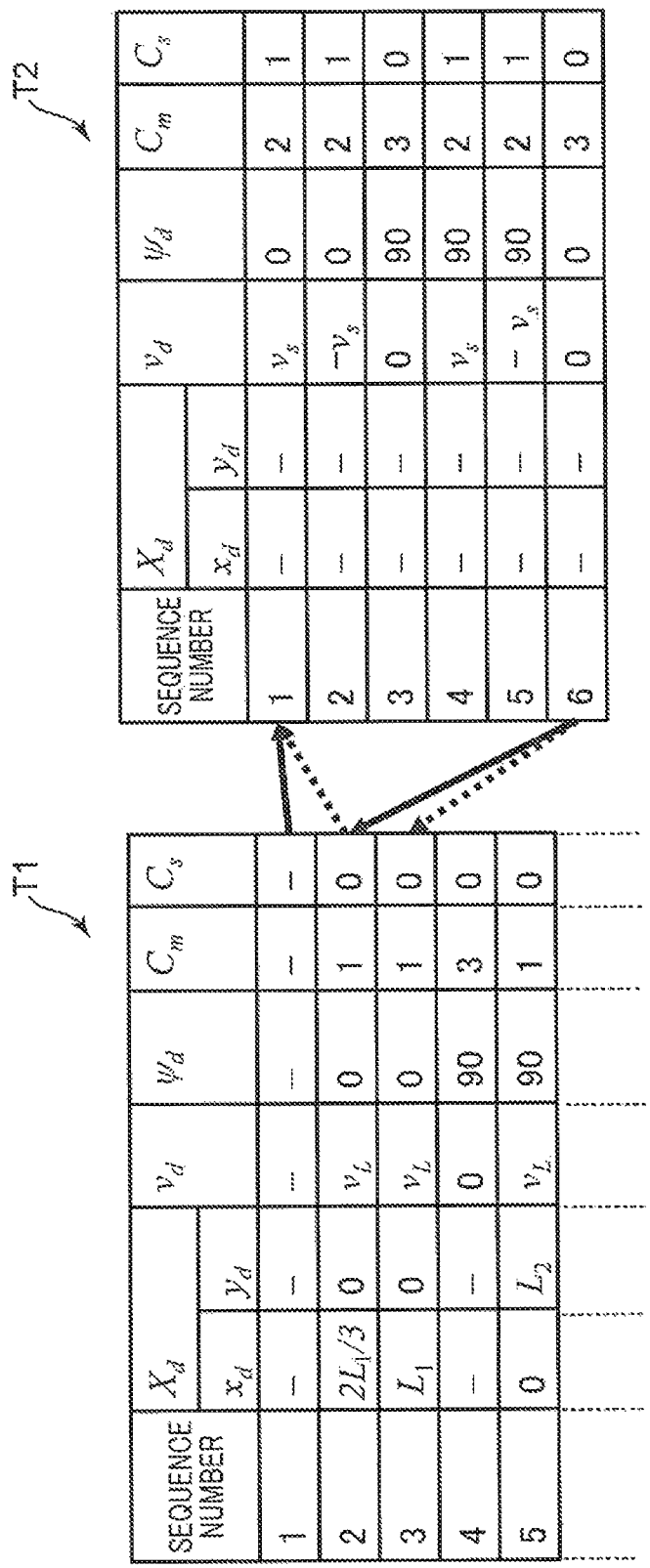
FIG. 18 is a diagram illustrating another example of an operation sequence table and an estimation operation sequence table according to the first modification of the second embodiment.
Figure 19:
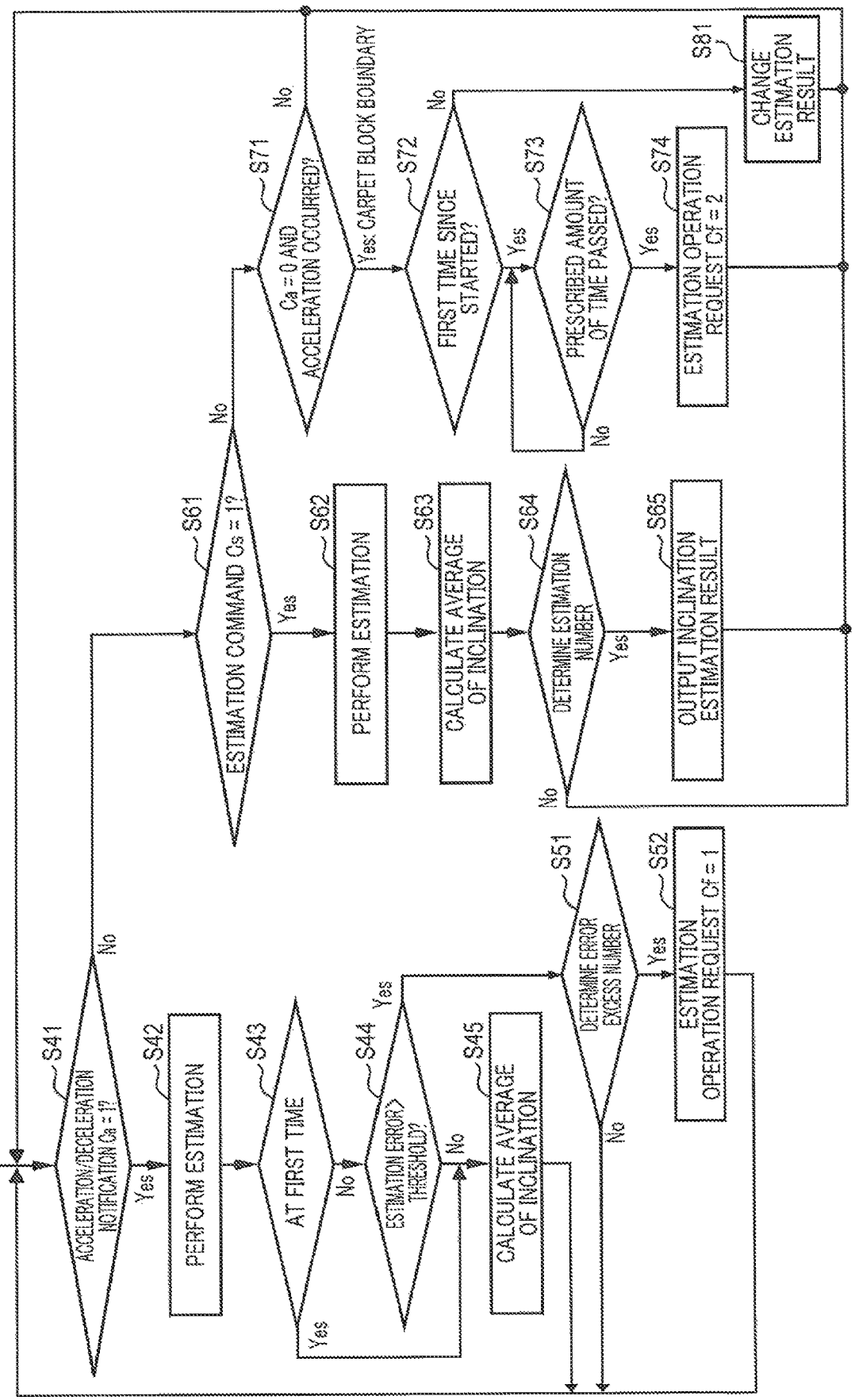
FIG. 19 is a flowchart illustrating another example of an estimation operation by the self-propelled cleaning robot according to the first modification of the second embodiment.

FIG. 17 is a diagram illustrating one example of a path on which the self-propelled cleaning robot 100 according to a first modification of the second embodiment moves when cleaning a floor carpeted with square carpet blocks; FIG. 18 is a diagram illustrating another example of an operation sequence table T1 and an estimation operation sequence table T2 according to the first modification of the second embodiment; FIG. 19 is a flowchart illustrating another example of an estimation operation by the self-propelled cleaning robot 100 according to the first modification of the second embodiment; Specifically, as illustrated in FIG. 17, assume that two carpet blocks "Carpet Block A" and "Carpet Block B" whose inclination $X_{ci}$ of the pile P differs from each other by 90 degrees are laid out alternately in a checkerboard pattern over the floor to be cleaned by the self-propelled cleaning robot 100.

Also, as illustrated in FIG. 17, assume that the self-propelled cleaning robot 100 is placed near the center of a carpet block such that the forward direction of the self-propelled cleaning robot 100 is parallel to an edge of the carpet block, and then the start button is pressed to start the cleaning operation. Note that the processing circuit 9 treats the position and attitude in the robot coordinate system $\Sigma_R$ at the time when the start button is pressed, as the position and attitude in the absolute coordinate system $\Sigma$. Also in the present embodiment, it is assumed that the current position $X=(x, y)$ when the start button is pressed is the position (0, 0) of the origin in the absolute coordinate system $\Sigma$.

Also, in the present embodiment, it is assumed that during the cleaning operation, the self-propelled cleaning robot 100 moves on the basis of each operation sequence included in the operation sequence table T1 illustrated in FIG. 18. Note that the operation sequence with the sequence number "1" illustrated in FIG. 18 is illustrated as not having any control parameters set. When the operation sequence is loaded, the operation planning unit 14 generates the estimation operation sequence table T2 illustrated in FIG. 18, similarly to the case when the estimation operation request $C_f$ set to "1" is input.

In addition, the operation planning unit 14 changes the command direction angle $\psi_d$ included in the estimation operation sequences with the sequence numbers "1", "2", and "6" to the command direction angle $\psi_d$ "0" when the start button is pressed. Furthermore, the operation planning unit 14 changes the command direction angle $\psi_d$ included in the estimation operation sequences with the sequence numbers "3", "4", and "5" to an angle (for example, 90) rotated 90 degrees counterclockwise from the command direction angle $\psi_d$ "0" when the start button is pressed.

After that, a process similar to the process from step S3 illustrated in FIG. 15 is performed. With this arrangement, the estimation of the inclination $X_{ci}$ of the pile P in the carpet block "Carpet Block A" by the carpet weave estimation unit 19 (step S62 (FIG. 19)) is performed four times while the movement control unit 15 makes the self-propelled cleaning robot 100 move on the paths "Estimation Operation Sequence 1" to "Estimation Operation Sequence 6" (FIG. 17) according to each estimation operation sequence included in the estimation operation sequence table T2. Additionally, in step S65 (FIG. 19), the average of the four estimation results of the inclination $X_{ci}$ of the pile P is output as the estimation result of the inclination $X_{ci}$ of the pile P in the carpet block "Carpet Block A".

When the operations according to all of the estimation operation sequences included in the estimation operation sequence table T2 end, the self-propelled cleaning robot 100 moves on the path indicated by each operation sequence with the sequence number "2" and thereafter included in the operation sequence table T1.

Additionally, it is assumed that the translational acceleration ⌈a is measured by the acceleration sensor 5 while the self-propelled cleaning robot 100 is moving at a constant velocity on the path "Sequence 2" indicated by the operation sequence with the sequence number "2" and the acceleration/deceleration notification $C_a$ set to "0" is input, or in other words, when the self-propelled cleaning robot 100 is not performing the acceleration operation or the deceleration operation.

In this case, as illustrated in FIG. 19, the carpet weave estimation unit 19 determines whether or not the translational acceleration ⌈a measured by the acceleration sensor 5 is the translational acceleration ⌈a produced when the self-propelled cleaning robot 100 crosses the boundary between the two carpet blocks "Carpet Block A" and "Carpet Block B" (step S71). With this arrangement, the carpet weave estimation unit 19 estimates whether or not the self-propelled cleaning robot 100 has crossed the boundary between the two carpet blocks "Carpet Block A" and "Carpet Block B".

FIG. 20 is a diagram illustrating one example of simulation results of translational acceleration ⌈a measured when crossing a carpet block boundary in the case where the self-propelled cleaning robot 100 according to the first modification of the second embodiment moves straight ahead at a constant velocity. For example, FIG. 20 illustrates simulation results of the translational acceleration ⌈a measured when the self-propelled cleaning robot 100 crosses the boundary between the two carpet blocks "Carpet Block A" and "Carpet Block B", under the assumption that the inclination $X_{ci}$ of the pile P changes from $X_{ci}$=(3 mm, 3 mm) to $X_{ci}$=(3 mm, −3 mm) when the two wheels 2a and 2b of the self-propelled cleaning robot 100 cross the boundary at the same time.

In the upper and lower diagrams in FIG. 20, the horizontal axis represents the elapsed time from when the self-propelled cleaning robot 100 placed on either one of the two carpet blocks "Carpet Block A" and "Carpet Block B" starts moving straight ahead. The vertical axis in the upper diagram in FIG. 20 represents the acceleration ⌈$a_x$ in the $x_R$ direction of the translational acceleration ⌈a measured by the acceleration sensor 5, while the vertical axis in the lower diagram in FIG. 20 represents the acceleration ⌈$a_y$ in the $y_R$ direction of the translational acceleration ⌈a measured by the acceleration sensor 5.

The upper and lower diagrams in FIG. 20 demonstrate that when the self-propelled cleaning robot 100 starts moving straight ahead on one of the carpet blocks, the self-propelled cleaning robot 100 accelerates and decelerates, and then moves at a constant velocity. Also demonstrated is that, immediately after the self-propelled cleaning robot 100 crosses the boundary between the two carpet blocks "Carpet Block A" and "Carpet Block B", a force is exerted on the self-propelled cleaning robot 100 due to the change in the inclination direction of the pile P, and a translational acceleration ⌈a having an absolute value greater than $a_{th}$ occurs.

Accordingly, on the basis of the above simulation results, in step S71, in the case where the absolute value of the translational acceleration ⌈a measured by the acceleration sensor 5 exceeds the predetermined threshold $a_{th}$, the carpet weave estimation unit 19 determines that the measured translational acceleration ⌈a is the translational acceleration ⌈a produced when crossing the boundary (step S71, Yes: carpet block boundary). In this case, the carpet weave estimation unit 19 estimates that the self-propelled cleaning robot 100 has crossed the boundary between the two carpet blocks "Carpet Block A" and "Carpet Block B", and the process proceeds to step S72.

In step S72, the carpet weave estimation unit 19 determines whether or not the determination that the self-propelled cleaning robot 100 has crossed the boundary in the current step S71 is the first such determination since the start button was pressed (step S72).

For example, as illustrated in FIG. 17, when the start button is pressed on the self-propelled cleaning robot 100 placed on the carpet block "Carpet Block A" and the self-propelled cleaning robot 100 moves over the boundary "Boundary 1", in step S71 it is estimated that the self-propelled cleaning robot 100 has crossed the boundary.

In this case, in step S72, the carpet weave estimation unit 19 determines that the determination that the self-propelled cleaning robot 100 has crossed the boundary between two carpet blocks "Carpet Block A" and "Carpet Block B" in the current step S71 is the first such determination since the start button was pressed (Yes in step S72).

In this case, when the self-propelled cleaning robot 100 turns on the next carpet block "Carpet Block B", the carpet weave estimation unit 19 enters a standby state for a prescribed amount of time such that the wheels 2a and 2b do not cross the boundary "Boundary 1" and the self-propelled cleaning robot 100 does not return to the carpet block "Carpet Block A" (step S73). Additionally, when the prescribed amount of time elapses (step S73, Yes), the carpet weave estimation unit 19 sets the estimation operation request $C_f$ to "2", and outputs the set estimation operation request $C_f$ to the operation planning unit 14 (step S74).

When the estimation operation request $C_f$ set to "2" is input, the operation planning unit 14 newly generates the estimation operation sequence table T2, similarly to the case when the estimation operation request $C_f$ set to "1" is input in step S52. The operation planning unit 14 references the command direction angle $\psi_d$ "0" included in the operation sequence with the sequence number "2" loaded in step S3. In addition, the operation planning unit 14 changes the command direction angle $\psi_d$ included in the estimation operation sequences with the sequence numbers "1", "2", and "6" to the referenced command direction angle $\psi_d$ "0".

Furthermore, the operation planning unit 14 changes the command direction angle $\psi_d$ included in the estimation operation sequences with the sequence numbers "3", "4", and "5" to the angle "90" rotated 90 degrees counterclockwise from the referenced command direction angle $\psi_d$ "0".

The movement control unit 15 pauses the movement of the self-propelled cleaning robot 100 according to the operation sequence with the sequence number "2". After that, a process similar to the process from step S3 illustrated in FIG. 15 is performed using each estimation operation sequence included in the estimation operation sequence table T2.

Thereafter, assume that the self-propelled cleaning robot 100 crosses the boundary "Boundary 2" of the two carpet blocks "Carpet Block A" and "Carpet Block B" illustrated in FIG. 17. In this case, in step S72, the carpet weave estimation unit 19 determines that the determination that the self-propelled cleaning robot 100 has crossed the boundary between two carpet blocks "Carpet Block A" and "Carpet Block B" in the current step S71 is the second or subsequent such determination since the start button was pressed (No in step S72).

In this case, the carpet weave estimation unit 19 outputs the estimation result of the inclination $X_{ci}$ of the pile P at the time when the self-propelled cleaning robot 100 previously moved over the carpet block "Carpet Block A" after crossing the boundary "Boundary 2" as the estimation result of the inclination $X_{ci}$ of the pile P (step S81). With this arrangement, the carpet weave estimation unit 19 changes the estimation result of the inclination $X_{ci}$ of the pile P in the carpet block on which the self-propelled cleaning robot 100 had been moving before crossing the boundary to the estimation result of the inclination $X_{ci}$ of the pile P in the carpet block on which the self-propelled cleaning robot 100 is moving after crossing the boundary, without performing the estimation operation for estimating the inclination $X_{ci}$ of the pile P.

Thereafter, step S81 is normally executed every time a boundary between two carpet blocks is crossed, and the estimation result of the inclination $X_{ci}$ of the pile P when moving over the carpet block "Carpet Block A" and the estimation result of the inclination $X_{ci}$ of the pile P when moving over the carpet block "Carpet Block B" are alternately output to the movement control unit 15. With this arrangement, movement control according to the inclination $X_{ci}$ of the pile P in each carpet block is executed appropriately. As a result, when the self-propelled cleaning robot 100 moves over each carpet block, the influence due to the inclination $X_{ci}$ of the pile P can be reduced.

(Other Modifications of Second Embodiment)

The second embodiment can furthermore adopt the modifications below.

(I) The movement control unit 15 may also not cause the carpet weave estimation unit 19 to estimate the inclination $X_{ci}$ of the pile P when the self-propelled cleaning robot 100 decelerates, and cause the carpet weave estimation unit 19 to estimate the inclination $X_{ci}$ of the pile P only when the self-propelled cleaning robot 100 accelerates. Specifically, in step S15 (FIG. 15), the movement control unit 15 may cause the carpet weave estimation unit 19 not to output the acceleration/deceleration notification $C_a$ set to "1" is input.

Alternatively, the movement control unit 15 may also not cause the carpet weave estimation unit 19 to estimate the inclination $X_{ci}$ of the pile P when the self-propelled cleaning robot 100 accelerates, and cause the carpet weave estimation unit 19 to estimate the inclination $X_{ci}$ of the pile P only when the self-propelled cleaning robot 100 decelerates. Specifically, in step S12 (FIG. 15), the movement control unit 15 may cause the carpet weave estimation unit 19 not to output the acceleration/deceleration notification $C_a$ set to "1" is input.

Note that in the second embodiment and the first modification of the second embodiment above, the current position X=(x, y) when the start button is pressed is treated as the position (0, 0) of the origin in the absolute coordinate system Σ. However, the configuration is not limited thereto. The self-propelled cleaning robot 100 may also be provided with a device such as a LiDAR sensor, and may be configured to acquire a map of the region in which the self-propelled cleaning robot 100 is moving as the self-propelled cleaning robot 100 moves. Additionally, on the basis of the acquired map, the position (0, 0) of the origin of the absolute coordinate system Σ may be stipulated, and additionally the direction of the x axis or the direction of the y axis may also be stipulated.

Along with the above, the operation planning unit 14 may also dynamically generate the operation sequence table T1 on the basis of the acquired map. In this case, features such as walls may be considered to cause the self-propelled cleaning robot 100 to move appropriately on a path depending on the shape of the region in which the self-propelled cleaning robot 100 moves. As a result, the self-propelled cleaning robot 100 is capable of cleaning more efficiently and accurately.

Third Embodiment

Hereinafter, a third embodiment of the present disclosure will be described in detail with reference to the drawings.

Figure 21:
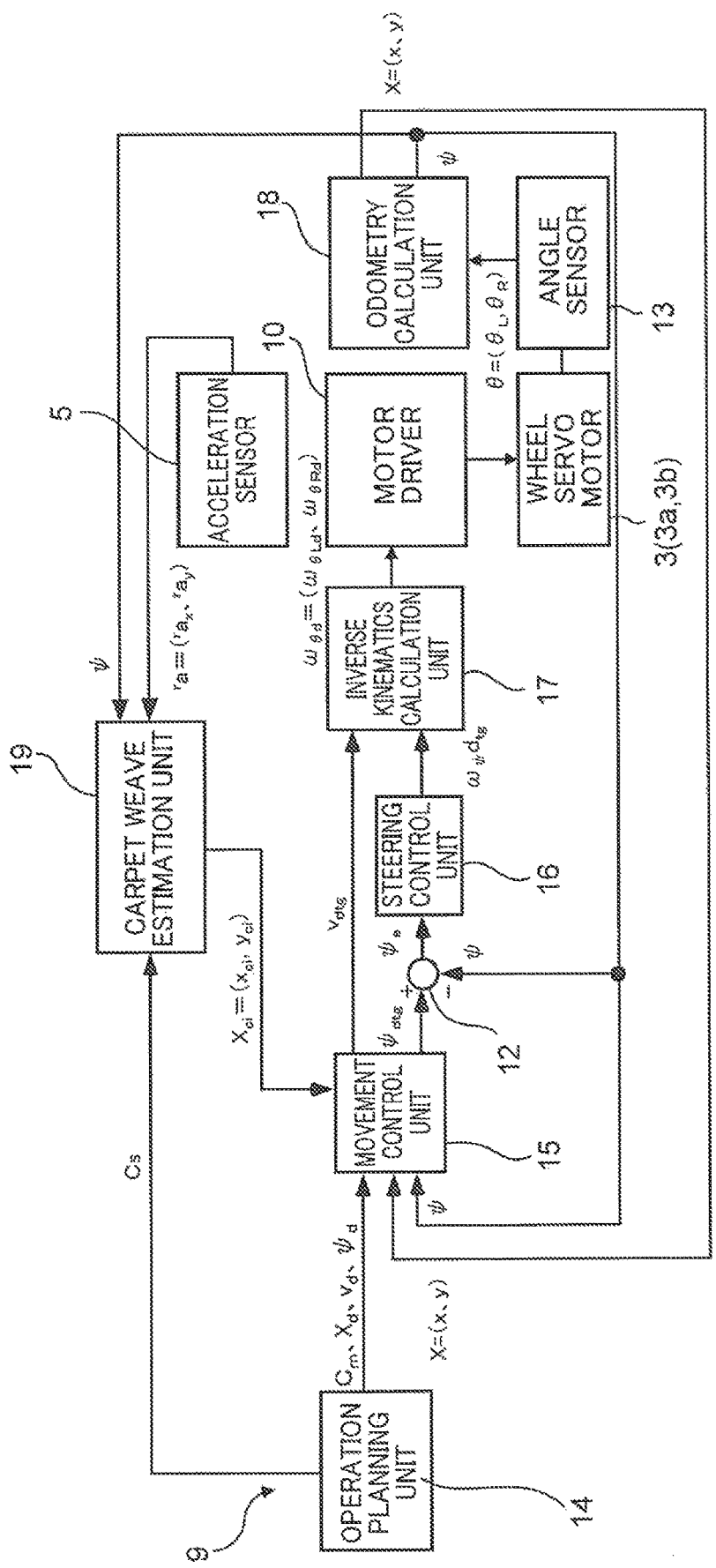
FIG. 21 is a block diagram of a control system of a self-propelled cleaning robot according to a third embodiment.

FIG. 21 is a block diagram of a control system of a self-propelled cleaning robot 100 according to the third embodiment. As illustrated in FIG. 21, by having the CPU execute the control program, the processing circuit 9 functions as an operation planning unit 14, a movement control unit 15, an error calculation unit 12, a steering control unit 16, an inverse kinematics calculation unit 17, an odometry calculation unit 18, and a carpet weave estimation unit 19 (estimation unit). The processing circuit 9 is communicably connected to the acceleration sensor 5, the motor driver 10, and an angle sensor 13.

The operation planning unit 14 fulfills the role of an intelligence unit of the self-propelled cleaning robot 100. Specifically, the operation planning unit 14 plans a path on which the self-propelled cleaning robot 100 is to move when cleaning. Also, the operation planning unit 14 plans an operation (hereinafter, the operation for estimation) causing the self-propelled cleaning robot 100 to perform an operation for estimating the inclination of the pile. The pile refers to the fibers of the carpet on which the self-propelled cleaning robot 100 moves, and includes styles such as cut pile and loop pile for example.

The operation planning unit 14 outputs the control mode command $C_m$, the target position $X_d=(X_d, y_d)$ of the self-propelled cleaning robot 100, the command movement velocity $v_d$, and the command direction angle $\psi_d$ corresponding to the plan to the movement control unit 15. Also, the operation planning unit 14 controls an estimation operation for estimating the inclination of the pile by the carpet weave estimation unit 19 by outputting an estimation command $C_s$ to the carpet weave estimation unit 19. The method of planning a path and the operation for estimation by the operation planning unit 14 will be described later.

The movement control unit 15 controls the movement of the self-propelled cleaning robot 100. Specifically, the movement control unit 15 accepts the input from the operation planning unit 14 as well as the input of an inclination $X_{ci}=(x_{ci}, y_{ci})$ of the pile from the carpet weave estimation unit 19.

The inclination $X_{ci}$ of the pile is expressed as the degree to which the pile is inclined in the directions parallel to the two coordinate axes (x axis, y axis) of the absolute coordinate system $\Sigma$ (FIG. 1). For example, in the case where the pile is orthogonal (upright) with respect to the base of the carpet, the inclination $X_{ci}$ of the pile is expressed as $X_{ci}=(0, 0)$. Also, in the case where the pile is inclined by $x_1$ in the direction parallel to the x axis of the absolute coordinate system $\Sigma$ (hereinafter, the x direction), but is not inclined in the direction parallel to the y axis of the absolute coordinate system $\Sigma$ (hereinafter, the y direction), the inclination $X_{ci}$ of the pile is expressed as $X_{ci}=(x_1, 0)$. Also, in the case where the pile is inclined by $y_1$ in the y direction but is not inclined in the x direction, the inclination $X_{ci}$ of the pile is expressed as $X_{ci}=(0, y_1)$.

Note that the inclination of the pile is also expressed as the degree to which the pile is inclined in the directions parallel to the two coordinate axes ($x_R$ axis, $y_R$ axis) of the robot coordinate system $\Sigma_R$ (FIG. 1). In this case, the sign denoting the inclination of the pile is denoted $\lceil X_{ci}$. In other words, in the case where the pile is orthogonal (upright) with respect to the base of the self-propelled cleaning robot 100, the inclination $\lceil X_{ci}$ of the pile is expressed as $\lceil X_{ci}=(0, 0)$. Also, in the case where the pile is inclined by $x_2$ in the direction parallel to the $x_R$ axis of the robot coordinate system $\Sigma_R$ (hereinafter, the $x_R$ direction) (first direction), but is not inclined in the direction parallel to the $y_R$ axis of the robot coordinate system $\Sigma_R$ (hereinafter, the $y_R$ direction) (second direction), the inclination $\in X_{ci}$ of the pile is expressed as $\in X_{ci}=(x_2, 0)$. Also, in the case where the pile is inclined by $y_2$ in the $y_R$ direction but is not inclined in the $x_R$ direction, the inclination $\in X_{ci}$ of the pile is expressed as $\in X_{ci}=(0, y_2)$.

The movement control unit 15 additionally accepts the input of a current position $X=(x, y)$ and a current direction angle yr of the self-propelled cleaning robot 100 from the odometry calculation unit 18.

On the basis of the input control parameters described above, the movement control unit 15 computes a target movement velocity $V_{dtg}$ and a target direction angle $\psi_{dtg}$ of the self-propelled cleaning robot 100. The movement control unit 15 outputs the computed target movement velocity $v_{dtg}$ to the inverse kinematics calculation unit 17, and outputs the computed target direction angle $\psi_{dtg}$ to the error calculation unit 12.

With this arrangement, the error calculation unit 12, the steering control unit 16, the inverse kinematics calculation unit 17, and the motor driver 10 which are located on and after the error calculation unit 12 and the inverse kinematics calculation unit 17 process control parameters based on the target movement velocity $v_{dtg}$ and the target direction angle $\psi_{dtg}$. As a result, the movement of the self-propelled cleaning robot 100 is controlled such that the movement velocity of the self-propelled cleaning robot 100 approaches the target movement velocity $v_{dtg}$ and the movement direction of the self-propelled cleaning robot 100 approaches the target direction angle $\psi_{dtg}$.

The error calculation unit 12 computes an error we between the target direction angle $\psi_{dtg}$ computed by the movement control unit 15 and the current direction angle $\psi$.

The steering control unit 16 controls the steering of the self-propelled cleaning robot 100. Specifically, the steering control unit 16 computes a target direction angular velocity $\omega_\psi d_{tg}$ on the basis of the error $\psi_e$ computed by the error calculation unit 12. The target direction angular velocity $\omega_\psi d_{tg}$ refers to the angular velocity when turning the self-propelled cleaning robot 100 in order to change the movement direction of the self-propelled cleaning robot 100 from the direction indicated by the current direction angle $\psi$ to the direction indicated by the target direction angle $\psi_{dtg}$.

The inverse kinematics calculation unit 17 controls the rotation of the wheels 2a and 2b (FIG. 1) of the self-propelled cleaning robot 100. Specifically, the inverse kinematics calculation unit 17 computes a target rotational angular velocity weld of the left wheel 2a (FIG. 1) and a target rotational angular velocity $\omega_{\theta Rd}$ of the right wheel 2b (FIG. 1) on the basis of the target movement velocity $V_{dtg}$ and the target direction angular velocity $\omega_\psi d_{tg}$.

The motor driver 10 accepts the input of the target rotational angular velocity $\omega_{\theta d}=(\omega_{\theta Ld}, \omega_{\theta Rd})$ of the wheels 2a and 2b (FIG. 1) computed by the inverse kinematics calculation unit 17. The motor driver 10 rotationally drives the wheel servo motors 3a and 3b according to the input target rotational angular velocity $\omega_{\theta d}$. The angle sensor 13 that detects the rotational angle of the wheel servo motors 3a and 3b is provided near the rotating shafts of the wheel servo motors 3a and 3b. The angle sensor 13 outputs the detected rotational angle at the current time (hereinafter, the current rotational angle) $\theta=(\theta_L, \theta_R)$ of the wheel servo motors 3a and 3b to the odometry calculation unit 18.

On the basis of the current rotational angle $\theta_L$ of the left wheel 2a (FIG. 1) and the current rotational angle $\theta_R$ of the right wheel 2b (FIG. 1), the odometry calculation unit 18 computes the current position $X=(x, y)$ and the current direction angle $\psi$ of the self-propelled cleaning robot 100. The current position $X=(x, y)$ is the position of the origin of the robot coordinate system $\Sigma_R$ (FIG. 1) in the absolute coordinate system $\Sigma$ (FIG. 1). The position of the origin of the robot coordinate system $\Sigma_R$ (FIG. 1) is the position where the $x_R$ axis and the $y_R$ axis intersect. The current direction angle $\psi$ is the angle obtained between the x direction in the absolute coordinate system $\Sigma$ (FIG. 1) and the $x_R$ direction in the robot coordinate system $\Sigma_R$ (FIG. I).

The carpet weave estimation unit 19 estimates the inclination $X_{ci}$ of the pile on the basis of the estimation command $C_s$ input from the operation planning unit 14. Specifically, the carpet weave estimation unit 19 estimates the inclination $X_{ci}$ of the pile in the case where the estimation command $C_s$ directing the carpet weave estimation unit 19 to estimate the inclination $X_{ci}=(x_{ci}, y_{ci})$ of the pile is input. The carpet weave estimation unit 19 estimates the inclination $X_{ci}=(x_{ci}, y_{ci})$ of the pile on the basis of a translational acceleration $\lceil a=(\lceil a_x, \lceil a_y)$ of the self-propelled cleaning robot 100 calculated by the acceleration sensor 5 and the current direction angle $\psi$ computed by the odometry calculation unit 18. The carpet weave estimation unit 19 outputs the computed inclination $X_{ci}=(x_{ci}, y_{ci})$ of the pile to the movement control unit 15 as the estimation result of the inclination $X_{ci}$ of the pile.

(Details about Control Modes)

Next, details about control modes will be described. The movement control unit 15 causes the self-propelled cleaning robot 100 to move according to one of three control modes, namely a straight-ahead mode, an acceleration/deceleration mode, and a turning mode. The movement control unit 15 switches the control mode according to the control mode command $C_m$ input from the operation planning unit 14, and controls the movement of the self-propelled cleaning robot 100 on the basis of the control parameters input from the operation planning unit 14.

In the case where the control mode is the straight-ahead mode, the movement control unit 15 causes the self-propelled cleaning robot 100 to move straight ahead at the command movement velocity $v_d$. Specifically, when the control mode is switched to the straight-ahead mode, the movement control unit 15 computes the target movement velocity $V_{dtg}$ using the Formula (1) above every time a predetermined control time (sampling time) elapses.

On the other hand, the movement control unit 15 keeps the target direction angle $\psi_{dtg}$ at the value computed in the last control mode, and outputs the target direction angle $\psi_{dtg}$ to the error calculation unit 12. With this arrangement, the movement control unit 15 causes the error $\psi_e$ computed by the error calculation unit 12 to approach 0.

In the case where the control mode is the straight-ahead mode, the self-propelled cleaning robot 100 moves straight ahead with an acceleration/deceleration pattern as illustrated in FIG. 3. The vertical axis in FIG. 3 represents the target movement velocity $V_{dtg}$ of the self-propelled cleaning robot 100, while the horizontal axis of FIG. 3 represents time.

Specifically, as illustrated in FIG. 3, when the control mode command $C_m$ directing the movement control unit 15 to switch the control mode to the straight-ahead mode is input (time $t_{11}$), every time the control time elapses, the movement control unit 15 computes the target movement velocity $v_{dtg}$ using Formula (1), and outputs the computed target movement velocity $v_{dtg}$ to the inverse kinematics calculation unit 17. Also, the movement control unit 15 outputs the target direction angle $\psi_{dtg}$ computed in the last control mode to the error calculation unit 12.

The target direction angle $\psi_{dtg}$ is in the absolute coordinate system $\Sigma$, and in the last control mode, the current direction angle $\psi$ of the self-propelled cleaning robot 100 is the target direction angle $\psi_{dtg}$. As a result, the self-propelled cleaning robot 100 moves straight ahead while accelerating, and the movement velocity of the self-propelled cleaning robot 100 reaches the command movement velocity $v_d$ (time $t_{12}$). Thereafter, every time the control time elapses, the movement control unit 15 uses Formula (1) to compute the target movement velocity $V_{dtg}$. Also, the movement control unit 15 outputs the target direction angle $\psi_{dtg}$ computed in the last control mode to the error calculation unit 12. With this arrangement, the self-propelled cleaning robot 100 moves straight ahead at a constant command movement velocity $v_d$ without turning.

After that, the movement control unit 15 computes a distance $\Delta X$ from the current position X input from the odometry calculation unit 18 to the target position Xd input from the operation planning unit 14. When $\Delta X$ becomes shorter than a predetermined distance (for example, 5 mm), the movement control unit 15 determines that the self-propelled cleaning robot 100 has reached the target position Xd. Additionally, the movement control unit 15 sets the command movement velocity $v_d$ in Formula (1) to 0 (time $t_{13}$). With this arrangement, the target movement velocity $V_{dtg}$ computed by the movement control unit 15 falls, and the self-propelled cleaning robot 100 decelerates. As a result, the movement of the self-propelled cleaning robot 100 is stopped.

In the case where the control mode is the acceleration/deceleration mode, the self-propelled cleaning robot 100 moves straight ahead with an acceleration/deceleration pattern as illustrated in FIG. 12. The vertical axis in FIG. 12 represents the target movement velocity $V_{dtg}$ of the self-propelled cleaning robot 100, while the horizontal axis of FIG. 12 represents time.

Specifically, as illustrated in FIG. 12, when the control mode command $C_m$ directing the movement control unit 15 to switch the control mode to the acceleration/deceleration mode is input (time $t_{21}$), every time the control time elapses, the movement control unit 15 computes the target movement velocity $v_{dtg}$ using Formula (1), and outputs the computed target movement velocity $v_{dtg}$ to the inverse kinematics calculation unit 17. Also, the movement control unit 15 outputs the target direction angle $\psi_{dtg}$ computed in the last control mode to the error calculation unit 12.

As a result, when the self-propelled cleaning robot 100 move straight ahead while accelerating and the movement velocity of the self-propelled cleaning robot 100 reaches the command movement velocity $v_d$ (time $t_{22}$), the movement control unit 15 sets the command movement velocity $v_d$ in Formula (1) to 0. With this arrangement, the target movement velocity $v_{dtg}$ computed by the movement control unit 15 falls, the self-propelled cleaning robot 100 accelerates, and then immediately decelerates. As a result, the movement of the self-propelled cleaning robot 100 is stopped.

On the other hand, in the ease where the control mode is the turning mode, the operation planning unit 14 uses Formula (2) above to compute the command direction angle $\psi_d$ for moving the self-propelled cleaning robot 100 from the current position X=(x, y) to the next target position $X_d$=($X_d$, $y_d$), and sets the command movement velocity $v_d$ to 0.

The movement control unit 15 causes the self-propelled cleaning robot 100 to perform a pivot turn at a constant command turning velocity $\omega_{dtg}$ until the direction of the self-propelled cleaning robot 100 changes from the current direction angle $\psi$ input from the odometry calculation unit 18 to the command direction angle $\psi_d$ set by the operation planning unit 14. In the pivot turn, the movement control unit 15 uses Formula (3) above to compute the target direction angle $\psi_{dtg}$ to output to the steering control unit 16.

Finally, the motor driver 10 is driven on the basis of the control parameters output by each of the above function units. The motor driver 10 rotationally drives the left and right wheel servo motors 3a and 3b. Specifically, the motor driver 10 accepts the input of the target rotational angular velocity $\omega_{\theta d}$=($\omega_{\theta Ld}$, $\omega_{\theta Rd}$) computed by the inverse kinematics calculation unit 17. The motor driver 10 rotationally drives the wheel servo motors 3a and 3b such that the rotational angular velocity of the wheel servo motors 3a and 3b approaches the input target rotational angular velocity $\omega_{\theta d}$.

The angle sensor 13 detects the current rotational angle $\theta$=($\theta_L$, $\theta_R$) of the wheel servo motors 3a and 3b, and outputs the detected current rotational angle $\theta$ to the odometry calculation unit 18.

The odometry calculation unit 18 computes the current position X=(x, y) and the current direction angle $\psi$ by using time derivatives ($\theta_L$ dot, $\theta_R$ dot) of the current rotational angle $\theta$=($\theta_L$, $\theta_R$) input from the angle sensor 13 that indicate the current rotational angular velocity of the wheel servo motors 3a and 3b, and Formulas (4) to (8) above. The odometry calculation unit 18 outputs the computed current position X=(x, y) to the movement control unit 15, and outputs the computed current direction angle $\psi$ to the error calculation unit 12, the movement control unit 15, and the carpet weave estimation unit 19.

(Flow of Cleaning Operation)

Figure 22:
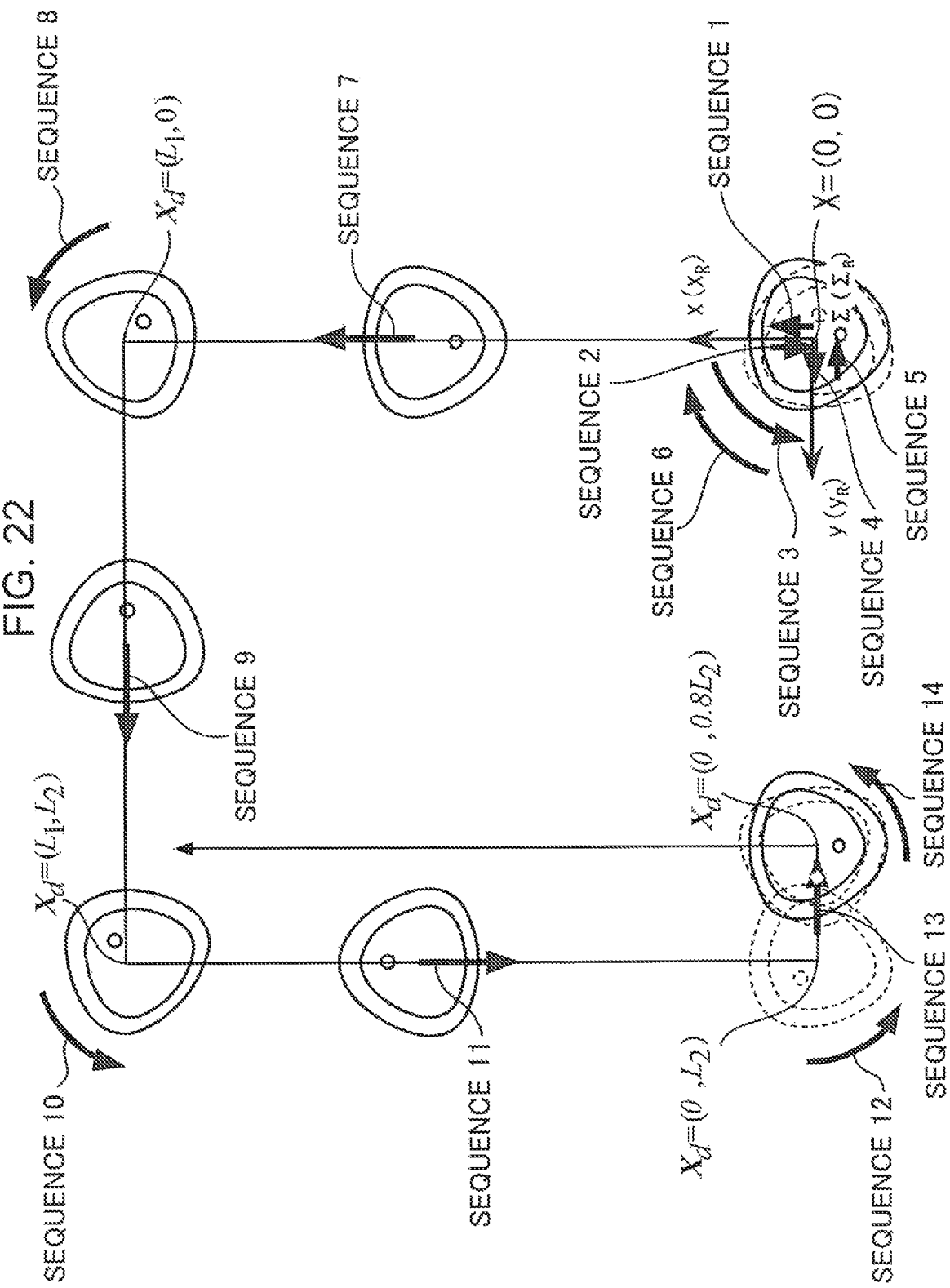
FIG. 22 is a diagram illustrating one example of a path on which the self-propelled cleaning robot according to the third embodiment moves during a cleaning operation.
Figure 24:
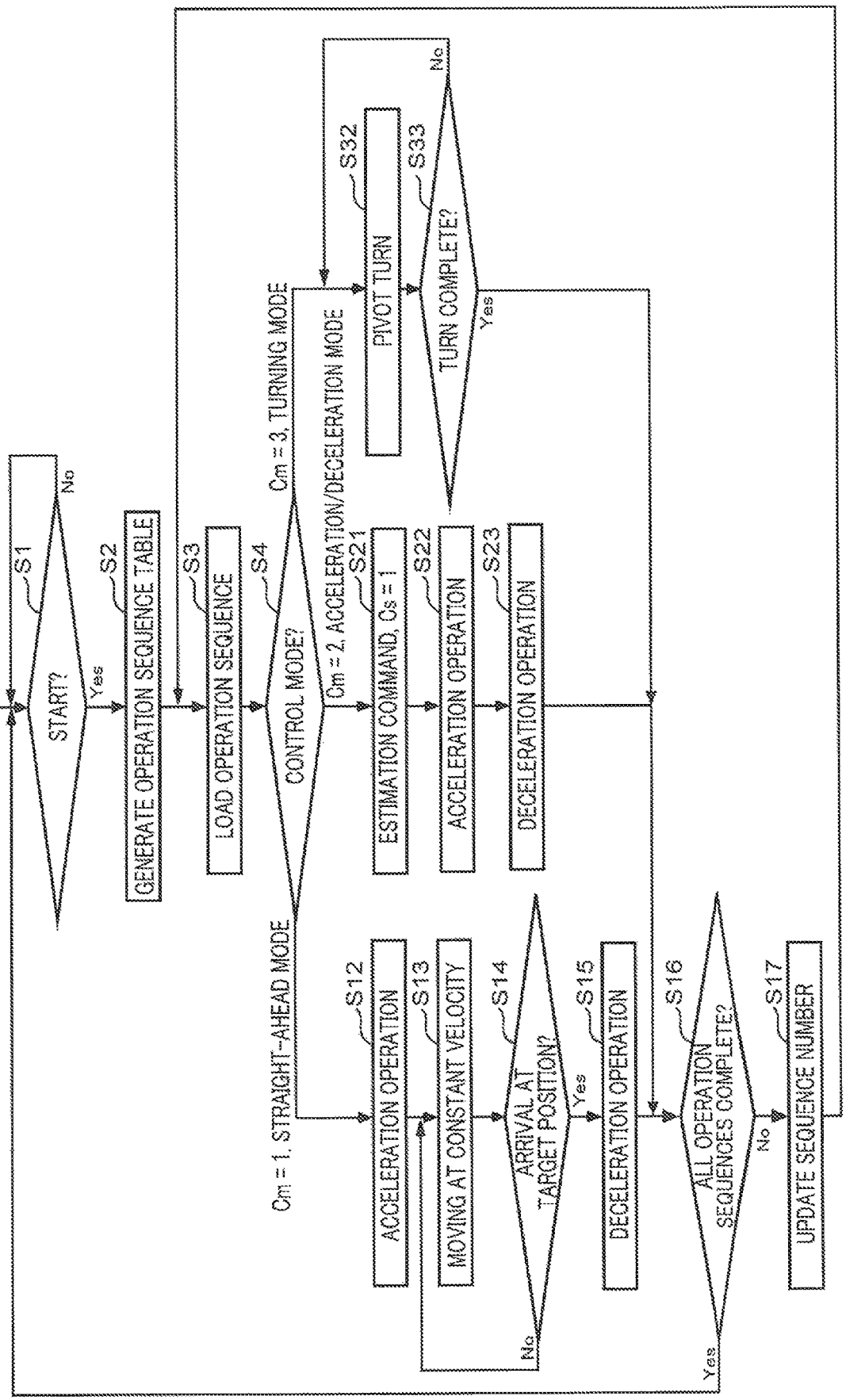
FIG. 24 is a flowchart illustrating one example of a cleaning operation by the self-propelled cleaning robot according to the third embodiment.

Next, as an example of a cleaning operation performed by the self-propelled cleaning robot 100, a cleaning operation that the self-propelled cleaning robot 100 performs while moving on the path illustrated in FIG. 22 will be described with reference to FIGS. 23 and 24. FIG. 22 is a diagram illustrating one example of a path on which the self-propelled cleaning robot 100 according to the third embodiment moves during a cleaning operation. FIG. 23 is a diagram illustrating one example of an operation sequence table T1 according to the third embodiment. FIG. 24 is a flowchart illustrating one example of a cleaning operation by the self-propelled cleaning robot 100 according to the third embodiment.

In the self-propelled cleaning robot 100 of the present embodiment, first, information (hereinafter, an operation sequence) related to the path on which the self-propelled cleaning robot 100 is to move during the cleaning operation is generated by the operation planning unit 14. The cleaning operation by the self-propelled cleaning robot 100 is then achieved by having the processing circuit 9 control the suction device 6 (FIG. 1) while the movement control unit 15 causes the self-propelled cleaning robot 100 to move on the path indicated by the generated operation sequence.

Specifically, as illustrated in FIG. 24, when a power button not illustrated that is provided on the self-propelled cleaning robot 100 is pressed, a supply of power from the battery 11 (FIG. 1) to the control circuit board 8, the wheel servo motors 3a and 3b, and the suction device 6 (FIG. 1) is started, and the self-propelled cleaning robot 100 starts up. With this arrangement, the processing circuit 9 disposed on the control circuit board 8 enters a standby state.

After that, when a start button not illustrated that is provided on the self-propelled cleaning robot 100 is pressed by a user (step S1, Yes), the self-propelled cleaning robot 100 starts the cleaning operation. Note that the processing circuit 9 treats the position and attitude in the robot coordinate system $\Sigma_R$ at the time when the start button is pressed, as the position and attitude in the absolute coordinate system E. In the present embodiment, it is assumed that the current position X=(x, y) when the start button is pressed is the position (0, 0) of the origin in the absolute coordinate system $\Sigma$.

When the cleaning operation is started, the operation planning unit 14 generates an operation sequence table T1 (step S2). The operation sequence table T1 is a table stipulating an operation sequence for each of one or more paths on which the self-propelled cleaning robot 100 consecutively runs during a cleaning operation, and information (hereinafter, an estimation operation sequence) related to each of one or more operations for estimation to be performed by the self-propelled cleaning robot 100 to estimate the inclination $X_{ci}$ of the pile. Specifically, in step S2, the operation planning unit 14 generates the operation sequence table T1 by reading one or more operation sequences and one or more estimation operation sequences pre-stored in the non-volatile memory provided in the processing circuit 9.

As illustrated in FIG. 23, an operation sequence related to each of one or more paths on which the self-propelled cleaning robot 100 moves during the cleaning operation is set in the operation sequence table T1. The operation sequence includes a sequence number (for example, 7) indicating the order in which the self-propelled cleaning robot 100 moves on each path, the target position $X_d=(x_d, y_d)$ (for example, $(L_1, 0)$) that acts as the end point of each path, the command movement velocity $v_d$ (for example, $v_L$) and the command direction angle $\psi_d$ (for example, 0) when the self-propelled cleaning robot 100 moves on each path, the control mode command $C_m$ (for example, 1), and the estimation command $C_s$ (for example, 0).

Also, as illustrated in FIG. 23, an estimation operation sequence related to each of one or more operations for estimation to be performed by the self-propelled cleaning robot 100 is set in the operation sequence table T1. Like the operation sequence, the estimation operation sequence includes a sequence number (for example, 1) indicating the order in which the self-propelled cleaning robot 100 operates according to each operation for estimation, the target position $X_d=(x_d, y_d)$ (for example, (−, −)) that acts as the end point when the self-propelled cleaning robot 100 moves during each operation for estimation, the command movement velocity $v_d$ (for example, $V_S$), the command direction angle $\psi_d$ (for example, 0), the control mode command $C_m$ (for example, 2), and the estimation command $C_s$ (for example, 1) when the self-propelled cleaning robot 100 moves during each operation for estimation.

Note that in the operation sequence table T1 illustrated in FIG. 23, the target position $X_d=(-, -)$ included in each estimation operation sequence indicates that the operation for estimation indicated by each estimation operation sequence is a short-duration acceleration/deceleration operation, and that the target position $X_d$ is not stipulated.

The operation planning unit 14 changes, when the start button is pressed, the command direction angle $\psi_d$ included in the estimation operation sequences with the sequence numbers "1", "2", and "6" to the command direction angle $\psi_d$ "0" when the start button is pressed. Furthermore, the operation planning unit 14 changes the command direction angle $\psi_d$ included in the estimation operation sequences with the sequence numbers "3", "4", and "5" to an angle (for example, 90) rotated 90 degrees counterclockwise from the command direction angle $\psi_d$ "0" when the start button is pressed.

After step S2, the operation planning unit 14 consecutively loads, according to the sequence number, an operation sequence or an estimation operation sequence that has not been loaded yet from the operation sequence table T1 generated in step S2 (step S3). Specifically, in the case of executing step S3 for the first time after the end of step S2, the operation planning unit 14 loads the operation sequence or the estimation operation sequence whose sequence number is set to "1" (FIG. 23). Additionally, the operation planning unit 14 outputs the control mode command $C_m$, the target position $X_d$, the command movement velocity $v_d$, and the command direction angle $\psi_d$ included in the loaded operation sequence or the estimation operation sequence to the movement control unit 15. Also, the operation planning unit 14 outputs the estimation command $C_s$ included in the loaded operation sequence or the loaded estimation operation sequence to the carpet weave estimation unit 19.

On the basis of the control mode command $C_m$ input from the operation planning unit 14, the movement control unit 15 determines which control mode to switch to (step S4). In the present embodiment, in the case where the control mode command $C_m$ with a value of "1" is input into the movement control unit 15, in step S4, the movement control unit 15 determines that a switch to the straight-ahead mode ($C_m=1$) has been indicated ($C_m=1$, straight-ahead mode). In the case where the control mode command $C_m$ with a value of "2" is input into the movement control unit 15, in step S4, the movement control unit 15 determines that a switch to the acceleration/deceleration mode ($C_m=2$) has been indicated ($C_m=2$, acceleration/deceleration mode). In the case where the control mode command $C_m$ with a value of "3" is input into the movement control unit 15, in step S4, the movement control unit 15 determines that a switch to the turning mode ($C_m=3$) has been indicated ($C_m=3$, turning mode). Note that the values of the control mode command $C_m$ are not limited to "1", "2", and "3" above, and may be changed appropriately.

Assume that in step S4, the movement control unit 15 determines that a switch to the straight-ahead mode is indicated (in step S4, $C_m=1$, straight-ahead mode). In this case, as described above, the movement control unit 15 uses the target position $X_d$ and the command movement velocity $v_d$ input in step S3 to cause the self-propelled cleaning robot 100 to move in the straight-ahead mode. With this arrangement, the self-propelled cleaning robot 100 starts an acceleration operation (step S12).

After that, when the movement velocity of the self-propelled cleaning robot 100 reaches the command movement velocity $v_d$, the self-propelled cleaning robot 100 ends the acceleration operation and moves at a constant velocity according to the command movement velocity $v_d$ (step S13).

After that, as described above, when the distance from the current position X of the self-propelled cleaning robot 100 to the target position $X_d$ input in step S3 becomes shorter than a predetermined distance (for example, 5 mm), the movement control unit 15 determines that the self-propelled cleaning robot 100 has reached the target position $X_d$ (step S14, Yes).

In this case (step S14, Yes), the movement control unit 15 lowers the target movement velocity $v_{dtg}$ by setting the command movement velocity $v_d$ to "0" in Formula (1) above. With this arrangement, when the self-propelled cleaning robot 100 starts a deceleration operation (step S15).

After that, when the self-propelled cleaning robot 100 stops, the operation planning unit 14 determines whether or not the movement by the self-propelled cleaning robot 100 has been completed on the basis of all of the operation sequences and the estimation operation sequences included in the operation sequence table T1 (step S16).

Specifically, in step S16, in the case where an operation sequence that has not been loaded in step S3 exists among all of the operation sequences and the estimation operation sequences included in the operation sequence table T1, the operation planning unit 14 determines that the movement by the self-propelled cleaning robot 100 has not been completed (step S16, No). In this case, the operation planning unit 14 updates the sequence number to a number indicating the next movement step (step S17). After that, the process from step S3 is performed. In step S3, the operation planning unit 14 loads the operation sequence or the estimation operation sequence whose sequence number is the updated sequence number set in step S17.

On the other hand, in step S16, in the case where an operation sequence and an estimation operation sequence that have not been loaded in step S3 does not exist among all of the operation sequences and all of the estimation operation sequences included in the operation sequence table T1, the operation planning unit 14 determines that the movement by the self-propelled cleaning robot 100 has been completed (step S16, Yes). In this case, the process proceeds to step S1, and the processing circuit 9 returns to the standby state.

Also, assume that in step S4, the movement control unit 15 determines that a switch to the acceleration/deceleration mode is indicated (in step S4, $C_m$=2, acceleration/deceleration mode). In this case, the operation planning unit 14 sets the estimation command $C_s$ to "1", and outputs the set estimation command $C_s$ to the carpet weave estimation unit 19 (step S21). Consequently, the carpet weave estimation unit 19 estimates the inclination $X_{ci}$ of the pile on the basis of the set estimation command $C_s$. Also, as described above, the movement control unit 15 uses the target position $X_d$ and the command movement velocity $v_d$ input in step S3 to cause the self-propelled cleaning robot 100 to move in the acceleration/deceleration mode.

With this arrangement, after the self-propelled cleaning robot 100 performs the acceleration operation (step S22), when the self-propelled cleaning robot 100 reaches the command movement velocity $v_d$, the self-propelled cleaning robot 100 immediately performs the deceleration operation (step S23). When the self-propelled cleaning robot 100 comes to a stop due to the deceleration operation, the process from step S16 is performed.

Also, in step S4, in the case where the movement control unit 15 determines that a switch to the turning mode is indicated (in step S4, $C_m$=3, turning mode), as described above, the movement control unit 15 uses the command direction angle $\psi_d$ input in step S3 to cause the self-propelled cleaning robot 100 to perform a pivot turn (step S32).

When the movement control unit 15 determines that the pivot turn by the self-propelled cleaning robot 100 in step S32 has been completed (step S33, Yes), the process from step S16 is performed.

(Specific Example of Movement)

Next, a specific example of moving in accordance with the flow described above when the self-propelled cleaning robot 100 cleans will be described. In this specific example, the self-propelled cleaning robot 100 is assumed to move on the path and perform an operation for estimation illustrated in FIG. 22 when cleaning. Correspondingly, in step S2, it is assumed that the operation sequence table T1 illustrated in FIG. 23 is generated.

In this case, in step S3 performed initially, the estimation operation sequence whose sequence number is set to "1" is loaded from the operation sequence table T1 (FIG. 23). The estimation operation sequence is information related to the operation for estimation "Sequence 1" in FIG. 22. The control mode command $C_m$ included in the operation sequence has a value of "2". For this reason, in step S4, it is determined that a switch to the acceleration/deceleration mode ($C_m$=2) is indicated ($C_m$=2, acceleration/deceleration mode).

In this case, because the estimation command $C_s$ included in the estimation operation sequence has a value of "1", the operation planning unit 14 sets the estimation command $C_s$ to "1", and outputs the set estimation command $C_s$ to the carpet weave estimation unit 19. With this arrangement, the inclination $X_{ci}$ of the pile is estimated by the carpet weave estimation unit 19.

Subsequently, after the self-propelled cleaning robot 100 performs the acceleration operation (step S22) and reaches the command movement velocity $v_d$ "$v_s$" included in the estimation operation sequence, the self-propelled cleaning robot 100 immediately performs the deceleration operation (step S23). After that, it is determined that the movement by the self-propelled cleaning robot 100 has not been completed (step S16, No), and the sequence number is updated to the number "2" indicating the next movement step (step S17).

Additionally, the process from step S3 is performed, and in step S3, the operation sequence whose sequence number is set to "2" is loaded from the operation sequence table T1 (FIG. 23). The estimation operation sequence is information related to the operation for estimation "Sequence 2" in FIG. 22. In this case, because the estimation command $C_s$ included in the estimation operation sequence has a value of "1", in step S21 (FIG. 24), the operation planning unit 14 sets the estimation command $C_s$ to "1", and outputs the set estimation command $C_s$ to the carpet weave estimation unit 19. With this arrangement, the inclination $X_{ci}$ of the pile is estimated by the carpet weave estimation unit 19.

Also, the command movement velocity $v_d$ included in the estimation operation sequence is set to "$-v_s$", which indicates movement at the same speed but in the opposite direction from the command movement velocity $v_d$ "$v_s$"

included in the estimation operation sequence with the sequence number "1". For this reason, the self-propelled cleaning robot 100 performs the acceleration operation in the opposite direction from the movement direction in the operation for estimation "Sequence 1" (step S22). After that, when the movement velocity of the self-propelled cleaning robot 100 reaches the command movement velocity $v_d$ "$-v_s$" included in the estimation operation sequence, the self-propelled cleaning robot 100 immediately performs the deceleration operation (step S23). Consequently, the self-propelled cleaning robot 100 returns to substantially the same position as the position when the operation according to the operation for estimation "Sequence 1" was started.

Additionally, the process from step S3 is performed, and in step S3, the estimation operation sequence whose sequence number is set to "3" is loaded from the operation sequence table T1 (FIG. 23). The estimation operation sequence is information related to the operation for estimation "Sequence 3" in FIG. 22. In this case, because the control mode command $C_m$ included in the estimation operation sequence has a value of "3", in step S4, it is determined that a switch to the turning mode ($C_m$=3) is indicated ($C_m$=3, turning mode). As a result, the process from step S32 is performed, and in step S32, and the self-propelled cleaning robot 100 is made to perform a pivot turn counterclockwise by "90" degrees so that the current direction angle $\psi$ of "0" becomes the command direction angle $\psi_d$ of "90" included in the estimation operation sequence loaded in step S3.

Thereafter, the estimation operation sequences with the sequence numbers "4" and "5" are consecutively loaded from the operation sequence table T1 (FIG. 23) in a similar way. Then, as illustrated by the operations for estimation "Sequence 4" and "Sequence 5" in FIG. 22, the self-propelled cleaning robot 100 performs the acceleration operation (step S22) and the deceleration operation (step S23) in a direction perpendicular to the movement direction when executing the operations for estimation "Sequence 1" and "Sequence 2" (FIG. 22) indicated by the estimation operation sequences with the sequence numbers "1" and "2". Note that before the above two operations for estimation "Sequence 4" and "Sequence 5" (FIG. 22) are performed, in step S21, the estimation command $C_s$ set to "1" is output to the carpet weave estimation unit 19, and the inclination $X_{ci}$ of the pile is estimated by the carpet weave estimation unit 19.

After that, the estimation operation sequence with the sequence number "6" is loaded from the operation sequence table T1 (FIG. 23). Then, as illustrated by the operation for estimation "Sequence 6" in FIG. 22, the self-propelled cleaning robot 100 performs a pivot turn in the opposite direction compared to when executing the operation for estimation "Sequence 3" (FIG. 22) with the sequence number "3" (step S33). In other words, the self-propelled cleaning robot 100 pivots clockwise by "90" degrees such that the current direction angle $\psi$ of the self-propelled cleaning robot 100 returns to the current direction angle $\psi$ "0" that is used before the self-propelled cleaning robot 100 performs the above six operations for estimation.

In this way, in the present embodiment, by having the self-propelled cleaning robot 100 execute the four operations for estimation "Sequence 1", "Sequence 2", "Sequence 4", and "Sequence 5" (FIG. 22), the inclination $X_{ci}$ of the pile is estimated by the carpet weave estimation unit 19 while the self-propelled cleaning robot 100 accelerates and decelerates along each of two directions perpendicular to each other. The carpet weave estimation unit 19 treats the average of the four estimation results of the inclination $X_{ci}$ of the pile estimated while the self-propelled cleaning robot 100 is performing the four operations for estimation "Sequence 1", "Sequence 2", "Sequence 4", and "Sequence 5" as the final estimation result of the inclination $X_{ci}$ of the pile.

After that, the operation sequence whose sequence number is set to "7" is loaded from the operation sequence table T1 (FIG. 23). The operation sequence is information related to the path "Sequence 7" in FIG. 22. The control mode command $C_m$ included in the operation sequence has a value of "1". For this reason, in step S4, it is determined that a switch to the straight-ahead mode ($C_m$=1) is indicated ($C_m$=1, straight-ahead mode).

After that, the process from step S12 is performed, and the self-propelled cleaning robot 100 starts moving in the straight-ahead mode. With this arrangement, the self-propelled cleaning robot 100 accelerates until the movement velocity reaches the command movement velocity $v_d$ (step S12). After accelerating up to the command movement velocity $v_d$, the self-propelled cleaning robot 100 moves at a constant velocity (step S13).

After that, when it is determined that the self-propelled cleaning robot 100 has reached the target position $X_d$=($L_1$, 0) (step S14, Yes), the self-propelled cleaning robot 100 starts a deceleration operation (step S15). Note that while the self-propelled cleaning robot 100 is moving in the straight-ahead mode, the movement control unit 15 corrects the target movement velocity $v_{dtg}$ and the target direction angle $\psi_{dtg}$ on the basis of the inclination $X_{ci}$ of the pile estimated by the carpet weave estimation unit 19.

After that, it is determined that the movement by the self-propelled cleaning robot 100 has not been completed (step S16, No), and the sequence number is updated to the number "8" indicating the next movement step (step S17).

Additionally, the process from step S3 is performed, and in step S3, the operation sequence whose sequence number is set to "8" is loaded from the operation sequence table T1 (FIG. 23). The operation sequence is information related to the path "Sequence 8" in FIG. 22. Because the control mode command $C_m$ included in the operation sequence has a value of "3", in step S4, it is determined that a switch to the turning mode ($C_m$=3) is indicated ($C_m$=3, turning mode).

As a result, the process from step S32 is performed, and in step S32, the command direction angle $\psi_d$ of "90" included in the operation sequence loaded in step S3 is used, and the self-propelled cleaning robot 100 is made to perform a pivot turn counterclockwise by "90" degrees.

Thereafter, the process from step S3 is performed similarly, and in step S3, the operation sequence whose sequence number is set to "9" is loaded from the operation sequence table T1 (FIG. 22). The operation sequence is information related to the path "Sequence 9" in FIG. 22. In this case, because the control mode command $C_m$ included in the operation sequence has a value of "1", like the operation sequence of the path "Sequence 7" in FIG. 22, the self-propelled cleaning robot 100 moves in the straight-ahead mode until reaching the target position $X_d$=($L_1$, $L_2$) included in the operation sequence. Thereafter, the process from step S3 is performed similarly using each operation sequence set in the operation sequence table T1. As a result, the self-propelled cleaning robot 100 moves along the path illustrated in FIG. 22 during the cleaning operation. Note that while the self-propelled cleaning robot 100 is moving in the straight-ahead mode, the movement control unit 15 corrects the target movement velocity $v_{dtg}$ and the target direction angle on the basis of the inclination $X_{ci}$ of the pile estimated by the carpet weave estimation unit 19.

(Estimating Inclination of Pile)

Next, the inclination $X_{ci}$ of the pile estimated by the carpet weave estimation unit 19 will be described. As illustrated in FIG. 7, the pile P of a carpet can be approximated by a rigid bar in a two degree-of-freedom model coupled to a base B. In other words, the pile P is assumed to be freely pivotable in two arrow directions D1 and D2 through two joints J1 and J2 having viscoelastic properties.

Because of the structure of carpet, the pile P of the carpet is inclined in a certain specific direction in the initial state. When the wheels 2*a* and 2*b* of the self-propelled cleaning robot 100 pass over the pile P, the inclination of the pile P changes. As described above, the inclination of the pile P can be expressed by the degree of inclination $(X_c=(X_c, y_c))$ in each of the x direction and the y direction in the absolute coordinate system Σ.

If the equation of motion for the self-propelled cleaning robot 100, the geometric constraint relationship between the self-propelled cleaning robot 100 and the pile P, and the above two degree-of-freedom model are used, it is possible to simulate a pile inclination $X_c$ when the self-propelled cleaning robot 100 moves over the carpet with numerical operations.

On example of the simulation results is illustrated in FIGS. 8, 9, and 10.

Note that the simulation presupposes that the self-propelled cleaning robot 100 moves over a typical carpet. Specifically, it is assumed that the weight of the self-propelled cleaning robot 100 is 4 kg and the maximum outer radius is 30 cm, similar to typical cleaning robots for home use. Also, it is assumed that the length of the pile P (the length of the fibers of the carpet, hereinafter the pile length) is 7 mm, and the interval at which the fibers of the pile P are arranged (hereinafter, the pile pitch) is 3 mm. Also, it is assumed that the elastic modulus of the pile P is 0.03 N/rad, and the viscous modulus of the pile P is 0.05 Ns/rad. Furthermore, FIGS. 9 and 10 illustrate simulation results of the translational acceleration ⌈a of the self-propelled cleaning robot 100 and the maximum value thereof in the case where the command movement velocity $v_d$ is set to 0.12 m/s.

The upper diagrams in FIG. 8 illustrate the simulation result of the behavior of the pile P in the $y_R$ direction when the self-propelled cleaning robot 100 is moving at a constant velocity. As illustrated in the upper-left diagram in FIG. 8, assume that the wheel 2*b* rotating at a constant velocity in the arrow direction D3 moves over the pile P, which is slightly inclined in the $x_R$ direction. In this case, as illustrated in the upper-right diagram in FIG. 8, the weight of the self-propelled cleaning robot 100 imposed on the pile P causes the pile P to be inclined farther in the $x_R$ direction compared to the state before the wheel 2*b* passed over as illustrated by the dashed lines.

Consequently, the self-propelled cleaning robot 100 lying on top of the pile P is influenced by drifting in the $x_R$ direction. For this reason, in the case where the pile inclination $X_c$ has an $x_R$ direction component, a phenomenon occurs in which the movement distance of the self-propelled cleaning robot 100 is extended or contracted compared to the distance set as the target.

On the other hand, in the case where the pile inclination $X_c$ has a $y_R$ direction (axle direction) component, the self-propelled cleaning robot 100 lying on top of the pile P is influenced by drifting in the $y_R$ direction. For this reason, in the case where the pile inclination $X_c$ has a $y_R$ direction component, a phenomenon occurs in which the movement direction of the self-propelled cleaning robot 100 is shifted away from the direction set as the target.

Consequently, if the inclination $X_{ci}=(x_{ci}, y_{ci})$ of the pile P at the current position X of the self-propelled cleaning robot 100 can be estimated, the influence that the inclination $X_{ci}$ of the pile P exerts on the movement of the self-propelled cleaning robot 100 can be anticipated.

On the other hand, the lower diagrams in FIG. 8 illustrate the simulation result of the behavior of the pile P in the $y_R$ direction when the self-propelled cleaning robot 100 accelerates from a still state. As illustrated in the lower-left diagram in FIG. 8, assume that after bringing the self-propelled cleaning robot 100 to a stop on the pile P inclined slightly in the $x_R$ direction, the wheel 2*b* is rotated rapidly in the arrow direction D3, causing the self-propelled cleaning robot 100 to accelerate. Because a torque is applied to the wheel 2*b* during the acceleration, as illustrated in the lower-right diagram in FIG. 8, the pile P is moved to be swept in the $-x_R$ direction by the wheel 2*b*.

In this way, when the self-propelled cleaning robot 100 accelerates, the inclination of the pile P changes more greatly than when the self-propelled cleaning robot 100 is moving at a constant velocity. Consequently, the behavior of the self-propelled cleaning robot 100 is influenced more than when moving at a constant velocity. The degree of influence can be observed by the translational acceleration ⌈a=(⌈$a_x$, ⌈$a_y$) of the self-propelled cleaning robot 100 measured by the acceleration sensor 5.

Note that when the self-propelled cleaning robot 100 decelerates, similarly to when the self-propelled cleaning robot 100 accelerates, a torque is applied to the wheel 2*b*, and the pile P is moved to be toppled in the $x_R$ direction by the wheel 2*b*. Consequently, when the self-propelled cleaning robot 100 decelerates, the behavior of the self-propelled cleaning robot 100 is likewise influenced more than when moving at a constant velocity. The degree of influence likewise can be observed by the translational acceleration ⌈a=(⌈$a_x$, ⌈$a_y$) of the self-propelled cleaning robot 100 measured by the acceleration sensor 5.

As above, when the self-propelled cleaning robot 100 accelerates (from time $t_{j1}$ to time $t_{12}$ in FIG. 3) and decelerates (time $t_{13}$ and thereafter in FIG. 3), depending on the change in the inclination of the pile P, the behavior of the self-propelled cleaning robot 100 is influenced more than when moving at a constant velocity. Accordingly, the estimation command $C_s$ set to "1" is input while the self-propelled cleaning robot 100 is moving in the acceleration/deceleration mode, and while the self-propelled cleaning robot 100 is accelerating and decelerating, the carpet weave estimation unit 19 estimates the inclination of the pile P on the basis of the translational acceleration ⌈a=(⌈$a_x$, ⌈$a_y$) measured by the acceleration sensor 5. With this arrangement, the carpet weave estimation unit 19 can estimate the inclination of the pile P more precisely than when moving at a constant velocity, on the basis of the translational acceleration ⌈a=(⌈$a_x$, ⌈$a_y$) that is greater than when moving at a constant velocity.

(Method of Estimating Inclination of Pile)

Next, a method of estimating the inclination $X_{ci}$ of the pile P by the carpet weave estimation unit 19 will be described. It is assumed that the self-propelled cleaning robot 100 in the still state is accelerated at a position where an $x_R$ direction component ⌈$x_{ci}$ of the inclination ⌈$X_{ci}$ of the pile P is 2 mm and a $y_R$ direction component ⌈$y_{ci}$ is ±2 mm. FIG. 9 illustrates a result obtained by simulating the change over time in the acceleration ⌈$a_x$ in the $x_R$ direction and the acceleration ⌈$a_y$ in the $y_R$ direction (axle direction) of the self-propelled cleaning robot 100 in this case on the basis of the approximation model of the pile P illustrated in FIG. 7.

As illustrated in the upper diagram in FIG. 9, the acceleration $\lceil a_x$ in the $x_R$ direction reaches a maximum value $\lceil a_{xm}$ immediately after the self-propelled cleaning robot 100 starts moving, and then decreases. Here, let $t_{m8}$ be the time when the acceleration $\lceil a_x$ decreases to 80% of the magnitude of the maximum value On the other hand, as illustrated in the lower-left diagram in FIG. 9, in the case where the $y_R$ direction component $\lceil y_{ci}$ of the inclination $\lceil X_{ci}$ of the pile P is a positive value ($\lceil y_{ci} > 0$), the acceleration $\lceil a_y$ in the $y_R$ direction takes a negative value immediately after the self-propelled cleaning robot 100 starts moving, and then inverts to a positive value. After that, the absolute value of the acceleration $\lceil a_y$ reaches a maximum value $\lceil a_{ym}$. Also, as illustrated in the lower-right diagram in FIG. 9, in the case where the $y_R$ direction component $\lceil y_{ci}$ of the inclination $\lceil X_{ci}$ of the pile P is a negative value ($\lceil y_{ci} < 0$), the change over time in the acceleration $\lceil a_y$ in the $y_R$ direction is the sign inverse of the lower-left diagram in FIG. 9, taking a positive value immediately after the self-propelled cleaning robot 100 starts moving, and then inverting to a negative value. After that, the absolute value of the acceleration $\lceil a_y$ reaches the maximum value $\lceil a_{ym}$, or in other words, the acceleration $\lceil a_y$ reaches a minimum value (the absolute value being the maximum negative value).

Next, the result of simulating the maximum value $\lceil a_{xm}$ of the acceleration $\lceil a_x$ in the $x_R$ direction according to the inclination $\lceil X_{ci}$ of the pile P is illustrated in the upper-left diagram in FIG. 10. In the upper-left diagram in FIG. 10, the horizontal axis represents the $x_R$ direction component $\lceil x_{ci}$ of the inclination $\lceil X_{ci}$ of the pile P. The vertical axis represents the maximum value $\lceil a_{xm}$ of the acceleration $\lceil a_x$ in the $x_R$ direction. As illustrated in the upper-left diagram in FIG. 10, the maximum value $\lceil a_{xm}$ of the acceleration $\lceil a_x$ in the $x_R$ direction can be approximated by the quadratic curve expressed by Formula (9) above.

Next, the result of simulating the maximum value $\lceil a_{ym}$ of the acceleration $\lceil a_y$ in the $y_R$ direction according to the inclination $\lceil X_{ci}$ of the pile P is illustrated in diagram on the right in FIG. 10. In the diagram on the right in FIG. 10, the horizontal axis represents the $x_R$ direction component $\lceil x_{ci}$ of the inclination $\lceil X_{ci}$ of the pile P. The depth axis represents the $y_R$ direction component $\lceil y_{ci}$ of the inclination $\lceil X_{ci}$ of the pile P. The height axis represents the maximum value $\lceil a_{ym}$ of the acceleration $\lceil a_y$ in the $y_R$ direction and the $-y_R$ direction.

Also, the result of simulating the time $t_{m8}$ when the acceleration $\lceil a_x$ in the $x_R$ direction reaches 80% of the magnitude of the maximum value $\lceil a_{xm}$ according to the inclination $\lceil X_{ci}$ of the pile P is illustrated in the lower-left diagram in FIG. 10. In the lower-left diagram in FIG. 10, the horizontal axis represents the $x_R$ direction component $\lceil x_{ci}$ of the inclination $\lceil X_{ci}$ of the pile P. The vertical axis represents the time $t_{m8}$.

The maximum value $\lceil a_{ym}$ of the acceleration $\lceil a_y$ in the $y_R$ direction can be approximated from the three simulation results illustrated in FIG. 10 by Formula (10) above.

Consequently, if the maximum value $\lceil a_{xm}$ of the acceleration $\lceil a_x$ in the $x_R$ direction and the maximum value $\lceil a_{ym}$ of the acceleration $\lceil a_y$ in the $y_R$ direction are measured by the acceleration sensor 5, the $x_R$ direction component $\lceil x_{ci}$ of the inclination $\lceil X_{ci}$ of the pile P can be estimated using the measured maximum value $\lceil a_{xm}$ of the acceleration $\lceil a_x$ in the $x_R$ direction, the command movement velocity $v_d$, and Formula (9). Also, the $y_R$ direction component $\lceil y_{ci}$ of the inclination $\lceil X_{ci}$ of the pile P can be estimated using the $x_R$ direction component $\lceil x_{ci}$ of the inclination $\lceil X_{ci}$ of the pile P estimated, the measured maximum value $\lceil a_{ym}$ of the acceleration $\lceil a_y$ in the $y_R$ direction, the command movement velocity $v_d$, and Formula (10).

Furthermore, Formulas (11), (12), and (13) above for deriving the inclination $X_{ci}=(x_{ci}, y_{ci})$ of the pile P in the absolute coordinate system $\Sigma$ can be obtained using Formulas (9) and (10) above and the current direction angle iv computed by the odometry calculation unit 18.

In other words, the carpet weave estimation unit 19 estimates the component $\lceil x_{ci}$ in the $x_R$ direction of the inclination $\lceil X_{ci}$ of the pile P in the robot coordinate system $\Sigma_R$ by using an expression proportional to the square root of the maximum value $\lceil a_{xm}$ of the component in the $x_R$ direction of the translational acceleration $\lceil a$, which is obtained by dividing Formula (11) above by the rotation matrix $R_r$. In addition, the carpet weave estimation unit 19 estimates the component $\lceil y_{ci}$ in the $y_R$ direction of the inclination $\lceil X_{ci}$ of the pile P in the robot coordinate system $\Sigma_R$ by using an expression proportional to the maximum value $\lceil a_{ym}$ in the $y_R$ direction of the translational acceleration $\lceil a$ and also inversely proportional to an exponential function using the square root of the maximum value $\lceil a_{xm}$ of the component in the $x_R$ direction of the translational acceleration $\lceil a$, which is obtained by dividing Formula (12) by the rotation matrix $R_r$. Furthermore, the carpet weave estimation unit 19 estimates the inclination $X_{ci}=(x_{ci}, y_{ci})$ of the pile P in the absolute coordinate system $\Sigma$ by multiplying the estimated inclination $\lceil X_{ci}$ of the pile P in the robot coordinate system $\Sigma_R$ by the rotation matrix $R_r$ expressed by Formula (13) using the current direction angle ψ computed by the odometry calculation unit 18.

Note that the above gain constants $K_x$ and $K_y$ are adjusted according to differences in the mechanism of the self-propelled cleaning robot 100 (such as the weight and size) and differences in the material of the carpet (such as the length of the pile P and the viscoelastic properties of the pile P). For example, it is sufficient to adjust the gain constants $K_x$ and $K_y$ on the basis of simulated or experimental results corresponding to the mechanism of the self-propelled cleaning robot 100 acting as the target. Also, if the material of the carpet under the moving self-propelled cleaning robot 100 is known, it is sufficient to adjust the gain constants $K_x$ and $K_y$ in accordance with the material of the carpet. In the case where the material of the carpet is unknown, the gain constants $K_x$ and $K_y$ may be adjusted by treating the material of the carpet as a typical carpet material (such as a pile length of 7 mm and a pile pitch of 3 mm, for example). In this case, even if the carpet is of an unknown material, the influence exerted on the movement of the self-propelled cleaning robot 100 by the inclination $X_{ci}$ of the pile P can be reduced to some degree.

When the inclination $X_{ci}=(x_{ci}, y_{ci})$ of the pile P estimated by the carpet weave estimation unit 19 is input, the movement control unit 15 computes the target movement velocity $v_{dtg}$ and the target direction angle $ψ_{dtg}$ using Formulas (14) and (15) above based on the inclination $X_{ci}$ of the pile P. In other words, the movement control unit 15 corrects the target movement velocity $v_{dtg}$ computed according to Formula (1) by the correction movement velocity $K_{vc}R_r^{-1}X_{ci}$, and corrects the target direction angle $ψ_{dtg}$ computed according to Formula (3) by the correction direction angle $K_{ψc}R_r^{-1}y_{ci}$.

In other words, the movement control unit 15 uses Formula (14) to control the target movement velocity $v_{dtg}$ according to the component $R_r^{-1}x_{ci}$ in the direction parallel to the straight-ahead direction (the $x_R$ direction) of the self-propelled cleaning robot 100 in the inclination $X_{ci}$ of the pile P estimated by the carpet weave estimation unit 19. Also, the movement control unit 15 uses Formula (15) to control the target direction angle $\psi_{dtg}$ indicating the movement direction of the self-propelled cleaning robot 100 according to the component in the $y_R$ direction perpendicular to the forward direction of the self-propelled cleaning robot 100 and also parallel to the floor in the inclination $X_{ci}$ of the pile P estimated by the carpet weave estimation unit 19.

Consequently, when the target movement velocity $v_{dtg}$ is adjusted by the movement control unit 15 using Formula (14), the influence whereby the self-propelled cleaning robot 100 drifts in the straight-ahead direction ($x_R$ direction) and the movement distance of the self-propelled cleaning robot 100 is extended or contracted compared to normal is reduced. Also, when the target direction angle $\psi_{dtg}$ is adjusted by the movement control unit 15 using Formula (15), the influence whereby the self-propelled cleaning robot 100 drifts in the axle direction ($y_R$ direction) is reduced.

As above, in the self-propelled cleaning robot 100 of the present embodiment, when the self-propelled cleaning robot 100 is moving in the acceleration/deceleration mode, the estimation command $C_s$ set to "1" is input to the carpet weave estimation unit 19. With this arrangement, when the self-propelled cleaning robot 100 accelerates and decelerates, the inclination $X_{ci}$ of the pile P is estimated on the basis of the translational acceleration ⌈a measured by the acceleration sensor 5. Furthermore, the movement velocity and the movement direction of the self-propelled cleaning robot 100 are adjusted on the basis of the estimation result of the inclination $X_{ci}$ of the pile P.

For this reason, in the case where the self-propelled cleaning robot 100 is moving, it is possible to reduce the influence on the movement velocity and the movement direction of the self-propelled cleaning robot 100 exerted by the inclination $X_{ci}$ of the pile P on the floor where the self-propelled cleaning robot 100 has accelerated or decelerated just before. As a result, the self-propelled cleaning robot 100 can precisely follow the path planned by the operation planning unit 14.

Also, in the self-propelled cleaning robot 100 of the present embodiment, the inclination $X_{ci}$ of the pile P is estimated when the self-propelled cleaning robot 100 accelerates/decelerates. For this reason, when estimating the inclination $X_{ci}$ of the pile P, the value of the translational acceleration ⌈a measured by the acceleration sensor 5 becomes a larger value than in the case of estimating the inclination $X_{ci}$ of the pile P while the self-propelled cleaning robot 100 is moving at a constant velocity. With this arrangement, the precision of the estimation of the inclination $X_{ci}$ of the pile P performed using the translational acceleration ⌈a can be increased compared to the case of estimating the inclination $X_{ci}$ of the pile P while the self-propelled cleaning robot 100 is moving at a constant velocity.

In addition, it is sufficient to provide the self-propelled cleaning robot 100 with the acceleration sensor 5 to estimate the inclination $X_{ci}$ of the pile P, thereby enabling estimation of the inclination $X_{ci}$ of the pile P and control of the movement velocity and the movement direction based on the estimation result with a simple configuration. Consequently, according to the self-propelled cleaning robot 100, the planned path can be followed precisely to perform cleaning accurately, and efficient cleaning can be achieved without leaving behind uncleaned areas.

Further, in the self-propelled cleaning robot 100 of the present embodiment, the inclination $X_{ci}$ of the pile P can be estimated on the basis of the translational acceleration ⌈a measured by the acceleration sensor 5 when the self-propelled cleaning robot 100 accelerates and decelerates in each of two directions perpendicular to each other. With this arrangement, the inclination $X_{ci}$ of the pile P can be estimated precisely compared to the case of causing the self-propelled cleaning robot 100 to perform acceleration and deceleration operations in one direction only.

Note that the operation sequence table T1 described above is not limited to the six estimation operation sequences illustrated in FIG. 23, and may also include estimation operation sequences related to various operations for estimation for raising the estimation precision of the inclination $X_{ci}$ of the pile P. For example, the operation sequence table T1 may also include estimation operation sequences related to operations for estimation that cause the carpet weave estimation unit 19 to estimate the inclination $X_{ci}$ of the pile P while the self-propelled cleaning robot 100 is made to advance and retreat in the same direction. Additionally, the operation sequence table T1 may also include estimation operation sequences related to operations for estimation that cause the carpet weave estimation unit 19 to estimate the inclination $X_{ci}$ of the pile P while the self-propelled cleaning robot 100 is made to move in two directions between which an angle of 90 degrees or some other angle is obtained, (First Modification of Third Embodiment)

Next, a first modification of the third embodiment of the present disclosure will be described in detail with reference to the drawings. The third embodiment describes an example in which the carpet weave estimation unit 19 estimates the inclination $X_{ci}$ of the pile P through six operations for estimation indicated by six estimation operation sequences included in the operation sequence table T1 illustrated in FIG. 23 while the self-propelled cleaning robot 100 is accelerating and decelerating in each of two directions perpendicular to each other.

However, the operations for estimation performed by the self-propelled cleaning robot 100 are not limited to the above six operations for estimation, and may also be operations that utilize centrifugal acceleration from the steering of the self-propelled cleaning robot 100, such as an operation causing the self-propelled cleaning robot 100 to move in a circle at a uniform velocity, for example.

Figure 25:
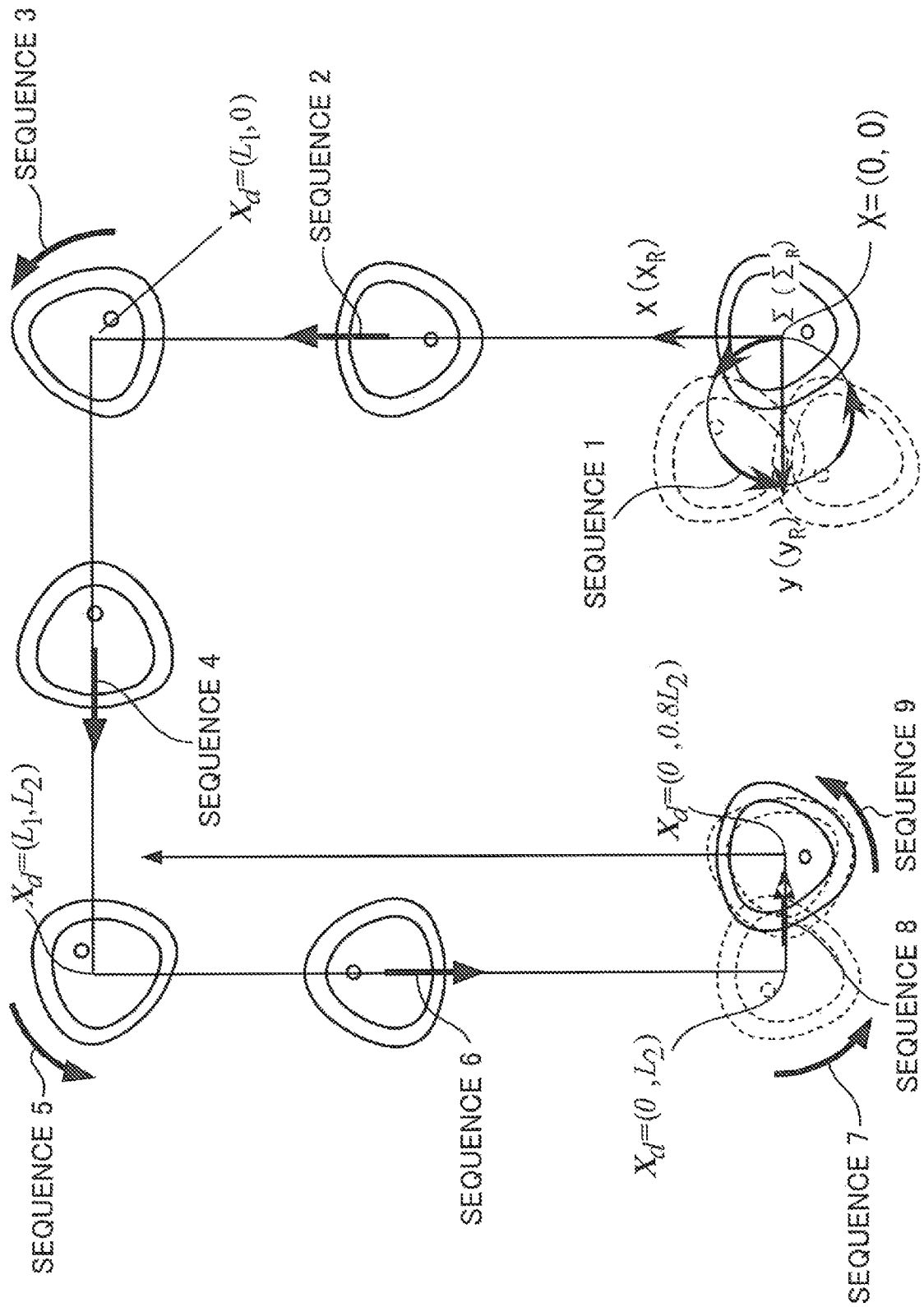
FIG. 25 is a diagram illustrating one example of a path on which the self-propelled cleaning robot according to a first modification of the third embodiment moves during a cleaning operation.
Figure 26:
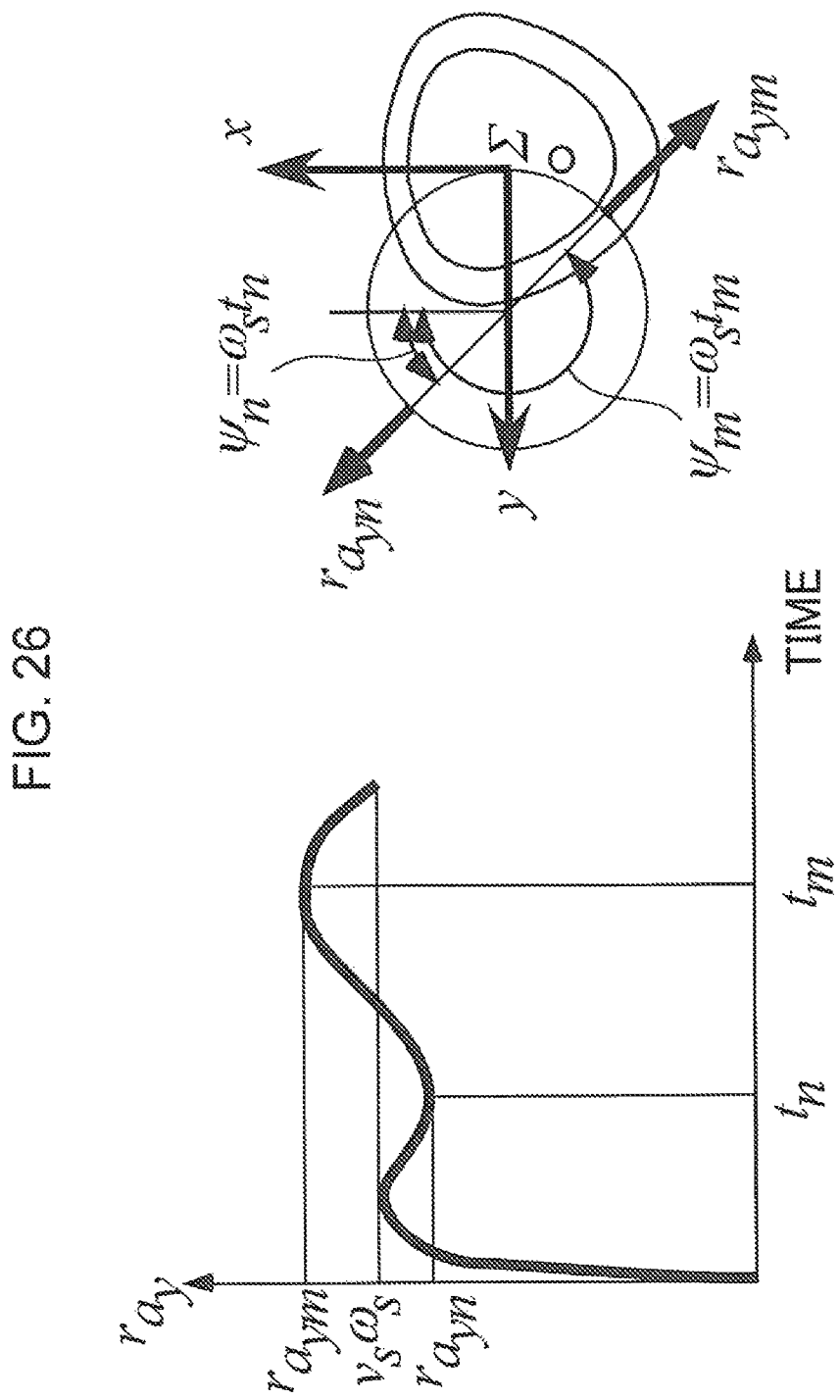
FIG. 26 is a diagram illustrating one example of simulation results of acceleration in a $y_R$ direction when causing the self-propelled cleaning robot according to the first modification of the third embodiment to move in a circle at a uniform velocity.

FIG. 25 is a diagram illustrating one example of a path on which the self-propelled cleaning robot 100 according to a first modification of the third embodiment moves during a cleaning operation. FIG. 26 is a diagram illustrating one example of simulation results of acceleration ⌈$a_y$ in a $y_R$ direction when causing the self-propelled cleaning robot 100 according to the first modification of the third embodiment to move in a circle at a uniform velocity. FIG. 27 is a diagram illustrating one example of an operation sequence table T1 according to the first modification of the third embodiment. Specifically, in step S2 (FIG. 24), the operation sequence table T1 illustrated in FIG. 27 may be generated.

The operation sequence table T1 illustrated in FIG. 27 includes an estimation operation sequence whose sequence number is set to "1". The command movement velocity $v_d$ included in the estimation operation sequence is set to "$v_s$". The command direction angle $\psi_d$ included in the estimation operation sequence is set to "$\omega_s t$".

In other words, the estimation operation sequence indicates an operation for estimation that causes the self-propelled cleaning robot 100 to turn according to the command direction angle $\psi_d$ "$\omega_s t$" while also causing the self-propelled cleaning robot 100 to move forward according to the command movement velocity $v_d$ "$v_s$". Causing the self-propelled cleaning robot 100 to turn according to the command direction angle $\psi_d$ "$\omega_s t$" means causing the self-propelled cleaning robot 100 to turn counterclockwise at a constant angular velocity $\psi_s$ for a time t. Consequently, by causing the self-propelled cleaning robot 100 to perform the operation for estimation indicated by the estimation operation sequence, the self-propelled cleaning robot 100 moves in a circle at a uniform velocity, as illustrated by the operation for estimation "Sequence 1" in FIG. 25.

Note that the operation sequence table T1 illustrated in FIG. 27 additionally includes operation sequences with the sequence number "2" and higher. By using each of these operation sequences to perform the process from step S3, the self-propelled cleaning robot 100 moves along the path illustrated in FIG. 25 during the cleaning operation.

FIG. 26 illustrates one example of simulation results of the acceleration $\lceil a_y$ in the $y_R$ direction when the self-propelled cleaning robot 100 is made to move in a circle at a uniform velocity on a carpet for which the inclination $X_{ci}$ of the pile P is $X_{ci}$=(2 mm, 2 mm).

The diagram on the left in FIG. 26 illustrates change over time in the acceleration $\lceil a_y$ in the $y_R$ direction from when the self-propelled cleaning robot 100 starts moving in a circle at a uniform velocity. The diagram on the right in FIG. 26 is a diagram explaining the positions on the path and the directions of the acceleration $\lceil a_y$ at which the maximum value $\lceil a_{ym}$ and the minimum value $\lceil a_{yn}$ of the acceleration $\lceil a_y$ in the $y_R$ direction occur in the absolute coordinate system $\Sigma$. As illustrated in the diagram on the left in FIG. 26, the acceleration $\lceil a_y$ in the $y_R$ direction varies according to a trigonometric function centered on the component $v_s\omega_s$ of the centrifugal acceleration produced by the circular motion by the influence of the drift in the movement direction of the self-propelled cleaning robot 100 due to the inclination $X_{ci}$ of the pile P. The variation according to a trigonometric function can be approximated as being proportional to the inclination $X_{ci}$ of the pile P.

Also, the time difference between a time $t_n$ from when the self-propelled cleaning robot 100 starts the circular motion until the acceleration $\lceil a_y$ in the $y_R$ direction reaches the minimum value $\lceil a_{yn}$ and a time $t_m$ from when the self-propelled cleaning robot 100 starts the circular motion until the acceleration $\lceil a_y$ in the $y_R$ direction reaches the maximum value $\lceil a_{ym}$ corresponds to the time it takes for the self-propelled cleaning robot 100 to perform half of the circular motion (the semi-period of the circular motion).

Given the above, the x direction component $x_{ci}$ and the y direction component $y_{ci}$ of the inclination $X_{ci}$ of the pile P can be formulated in Formulas (16) and (17) below.

[Math. 16]

$$x_{ci} = K_\omega \frac{{}^r a_{ym} - {}^r a_{yn}}{2} \sin\omega_s t_m \quad (16)$$

[Math. 17]

$$y_{ci} = K_\omega \frac{{}^r a_{ym} - {}^r a_{yn}}{2} \cos\omega_s t_m \quad (17)$$

In Formulas (16) and (17), $K_\omega$ is a gain constant that is adjusted according to differences in the mechanism of the self-propelled cleaning robot 100 (such as the weight and size) and differences in the material of the carpet (such as the length of the pile P and the viscoelastic properties of the pile P). For example, it is sufficient to adjust the gain constant $K_\omega$ on the basis of simulated or experimental results corresponding to the mechanism of the self-propelled cleaning robot 100 acting as the target.

Consequently, in the present embodiment, the carpet weave estimation unit 19 estimates both the x direction component $x_{ci}$ and the y direction component $y_{ci}$ of the inclination $X_{ci}$ of the pile P by using Formulas (16) and (17) above, the maximum value $\lceil a_{ym}$ and the minimum value $\lceil a_{yn}$ of the acceleration $\lceil a_y$ in the $y_R$ direction measured by the acceleration sensor 5, and the time $t_m$ it takes for the acceleration $\lceil a_y$ in the $y_R$ direction to reach the maximum value $\lceil a_{ym}$ or the time $t_n$ it takes for the acceleration $\lceil a_y$ in the $y_R$ direction to reach the minimum value $\lceil a_{yn}$. For this reason, it is possible to estimate the x direction component x, and the y direction component y, of the inclination $X_{ci}$ of the pile P without using the acceleration $\lceil a_x$ in the $x_R$ direction included in the translational acceleration $\lceil a$ measured by the acceleration sensor 5. As a result, the x direction component $x_{ci}$ and the y direction component $y_{ci}$ of the inclination $X_{ci}$ of the pile P can be estimated accurately with a small amount of computation.

In this way, the influence that the inclination $X_{ci}$ of the pile P exerts on the movement of the self-propelled cleaning robot 100 can also be reduced by using the inclination $X_{ci}$ of the pile P estimated by the carpet weave estimation unit 19 for control by the movement control unit 15.

As above, in the present embodiment, the self-propelled cleaning robot 100 is made to move in a circle at a uniform velocity, and then the inclination $X_{ci}$ of the pile P is estimated on the basis of the translational acceleration $\lceil a$ measured by the acceleration sensor 5 during the circular motion. For this reason, compared to the case of estimating the inclination $X_{ci}$ of the pile P without causing the self-propelled cleaning robot 100 to perform the circular motion, the inclination $X_{ci}$ of the pile P can be estimated more accurately on the basis of the translational acceleration $\lceil a$ that includes the component $v_s\omega_s$ of centrifugal acceleration produced by the circular motion.

(Other Modifications of Third Embodiment)

The third embodiment can furthermore adopt the modifications below.

(1) The first modification of the third embodiment illustrates an example of an operation causing the self-propelled cleaning robot 100 to move in a circle at a uniform velocity as an operation for estimation that utilizes centrifugal acceleration from the steering of the self-propelled cleaning robot 100. However, the operation for estimation that utilizes centrifugal acceleration from the steering of the self-propelled cleaning robot 100 is not limited to the above.

Figure 28:
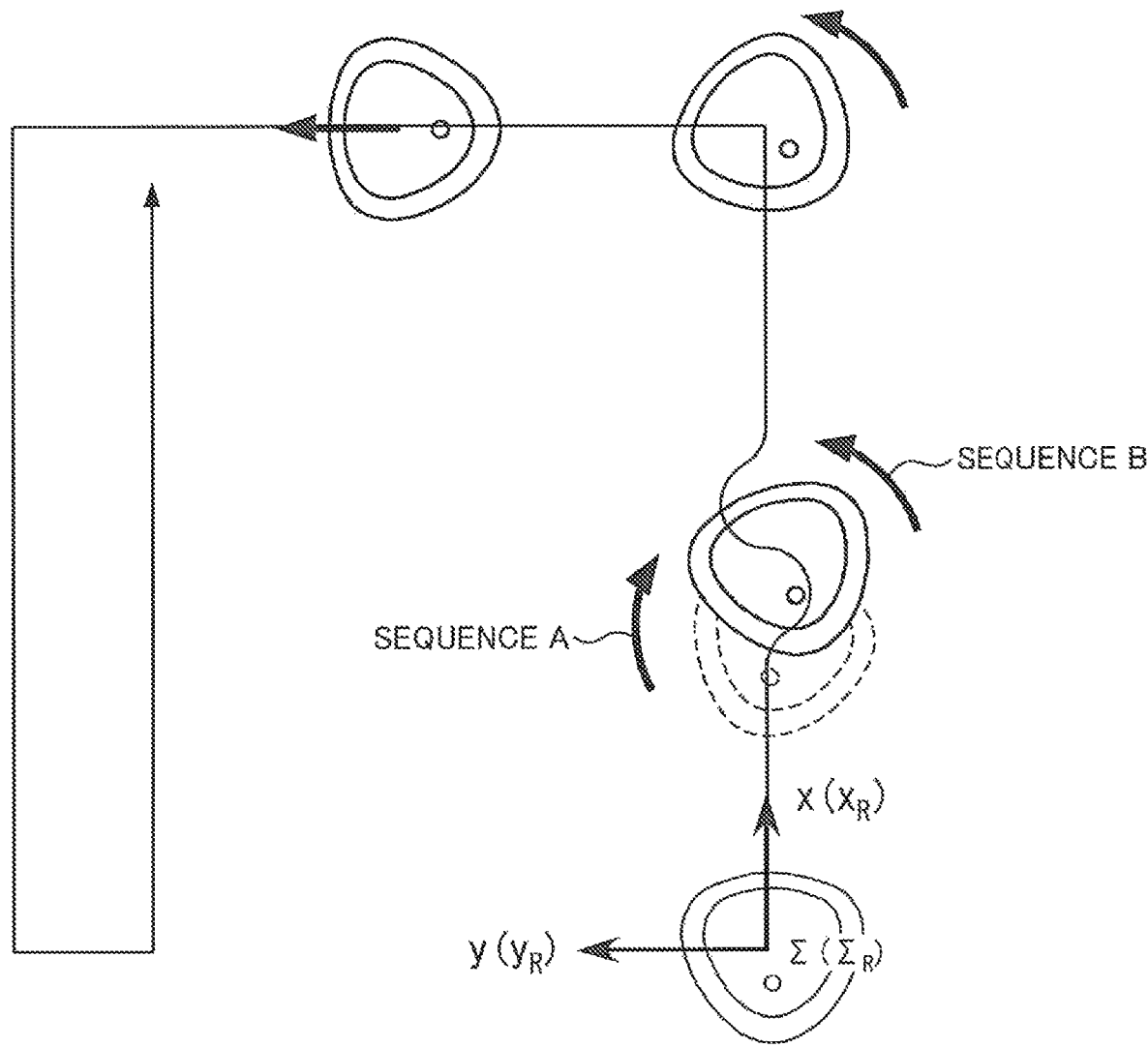
FIG. 28 is a diagram illustrating one example of a path on which the self-propelled cleaning robot according to another modification of the third embodiment moves during a cleaning operation.

FIG. 28 is a diagram illustrating one example of a path on which the self-propelled cleaning robot 100 according to another modification of the third embodiment moves during a cleaning operation. For example, as illustrated in FIG. 28, an operation for estimation may also be stipulated such that the path of the self-propelled cleaning robot 100 takes a meandering path. Specifically, as illustrated by the operations for estimation "Sequence A" and "Sequence B" in FIG. 28, an operation causing the self-propelled cleaning robot 100 to turn by predetermined angles clockwise and counterclockwise as the self-propelled cleaning robot 100 is moving at a constant velocity may be treated as an operation for estimation, and an estimation operation sequence indicating the operation for estimation may be included in the operation sequence table T1.

(2) In the third embodiment and the first modification of the third embodiment above, the current position X=(x, y) when the start button is pressed is treated as the position (0, 0) of the origin in the absolute coordinate system Σ. However, the configuration is not limited thereto. The self-propelled cleaning robot 100 may also be provided with a device such as a LiDAR sensor, and may be configured to acquire a map of the region in which the self-propelled cleaning robot 100 is moving as the self-propelled cleaning robot 100 moves. Additionally, on the basis of the acquired map, the position (0, 0) of the origin of the absolute coordinate system Σ may be stipulated, and additionally the direction of the x axis or the direction of the y axis may also be stipulated.

Along with the above, the operation planning unit 14 may also dynamically generate the operation sequence table T1 on the basis of the acquired map. In this case, features such as walls may be considered to cause the self-propelled cleaning robot 100 to move appropriately on a path depending on the shape of the region in which the self-propelled cleaning robot 100 moves. As a result, the self-propelled cleaning robot 100 is capable of cleaning more efficiently and accurately.

The mobile robot, control method, and control program of the present disclosure are useful for correcting movement with a simple configuration and making it possible to move accurately, even in cases where a mobile robot that moves autonomously without human control over a floor is influenced by the inclination of the pile of a carpet.

This application is based on Japanese Patent applications No. 2019-148065, No. 2019-148066 and No. 2019-148067 filed in Japan Patent Office on Aug. 9, 2019, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A mobile robot that moves autonomously over a floor covered by a carpet, the mobile robot comprising:
    an acceleration sensor that measures a translational acceleration of the mobile robot;
    an estimation unit that estimates an inclination of a pile of the carpet on a basis of the translational acceleration measured by the acceleration sensor while the mobile robot is accelerating or decelerating; and
    a movement control unit that controls a movement velocity and a movement direction of the mobile robot on a basis of the inclination of the pile estimated by the estimation unit.

2. The mobile robot according to claim 1, wherein the inclination of the pile is expressed by a component in a first direction parallel to a forward direction of the mobile robot and a component in a second direction perpendicular to the forward direction of the mobile robot and also parallel to the floor.

3. The mobile robot according to claim 2, wherein
    the movement control unit
    controls the movement velocity according to the component in the first direction of the inclination of the pile estimated by the estimation unit, and
    controls the movement direction according to the component in the second direction of the inclination of the pile estimated by the estimation unit.

4. The mobile robot according to claim 2, wherein the estimation unit estimates the component in the first direction of the inclination of the pile on a basis of a maximum value of a component in the first direction of the translational acceleration.

5. The mobile robot according to claim 2, wherein the estimation unit estimates the component in the second direction of the inclination of the pile on a basis of a maximum value of a component in the first direction of the translational acceleration and a maximum value of a component in the second direction of the translational acceleration.

6. The mobile robot according to claim 4, wherein the estimation unit estimates the component in the first direction of the inclination of the pile using a first arithmetic expression proportional to a square root of the maximum value of the component in the first direction of the translational acceleration.

7. The mobile robot according to claim 5, wherein the estimation unit estimates the component in the second direction of the inclination of the pile using a second arithmetic expression proportional to the maximum value of the component in the second direction of the translational acceleration and inversely proportional to an exponential function using a square root of the maximum value of the component in the first direction of the translational acceleration.

8. A control method for a mobile robot that moves autonomously over a floor covered by a carpet,
    the mobile robot being provided with an acceleration sensor that measures a translational acceleration of the mobile robot, the control method comprising:
    estimating an inclination of a pile of the carpet on a basis of the translational acceleration measured by the acceleration sensor while the mobile robot is accelerating or decelerating; and
    controlling a movement velocity and a movement direction of the mobile robot on a basis of the estimated inclination of the pile.

9. A non-transitory computer readable storage medium storing a control program of a mobile robot that moves autonomously over a floor covered by a carpet,
    the mobile robot being provided with an acceleration sensor that measures a translational acceleration of the mobile robot,
    the control program causing a computer provided in the mobile robot to function as:
    an estimation unit that estimates an inclination of a pile of the carpet on a basis of the translational acceleration measured by the acceleration sensor while the mobile robot is accelerating or decelerating; and
    a movement control unit that controls a movement velocity and a movement direction of the mobile robot on a basis of the inclination of the pile estimated by the estimation unit.

10. The mobile robot according to claim 1, wherein
    the movement control unit causes the mobile robot to perform an operation that utilizes a centrifugal acceleration from a steering of the mobile robot to estimate the inclination of the pile of the carpet, and
    the estimation unit estimates the inclination of the pile on a basis of the translational acceleration measured by the acceleration sensor while the mobile robot is performing the operation.

11. The mobile robot according to claim 10, wherein the operation is an operation that causes the mobile robot to move in a circle at a uniform velocity.

12. The mobile robot according to claim 10, wherein the inclination of the pile is expressed by a component in a first direction parallel to a forward direction of the mobile robot and a component in a second direction perpendicular to the forward direction of the mobile robot and also parallel to the floor.

13. The mobile robot according to claim 12, wherein the estimation unit estimates the components in the first direction and the second direction of the inclination of the pile on a basis of a maximum value and a minimum value of the component in the second direction of the translational acceleration, a time from when the mobile robot starts the operation until the component in the second direction of the translational acceleration reaches the maximum value, and a time from when the mobile robot starts the operation until the component in the second direction of the translational acceleration reaches the minimum value.

14. A mobile robot that moves autonomously over a floor covered by a carpet, the mobile robot comprising:
- an acceleration sensor that measures a translational acceleration of the mobile robot;
- an estimation unit that estimates an inclination of a pile of the carpet on a basis of the translational acceleration measured by the acceleration sensor while the mobile robot is accelerating or decelerating;
- an operation planning unit that plans an acceleration or deceleration operation by the mobile robot for the estimation unit to perform the estimation; and
- a movement control unit that controls a movement velocity and a movement direction of the mobile robot on a basis of the inclination of the pile estimated by the estimation unit, wherein
- in a case of determining that a change has occurred in the estimated inclination of the pile, the estimation unit commands the operation planning unit to plan the acceleration or deceleration operation by the mobile robot.

15. The mobile robot according to claim 14, wherein the estimation unit repeatedly estimates the inclination of the pile while the mobile robot is accelerating or decelerating, and determines whether or not the change has occurred on a basis of a difference between the currently estimated inclination of the pile and the previously estimated inclination of the pile.

16. The mobile robot according to claim 14, wherein
- the carpet includes a first carpet region and a second carpet region that neighbor each other and have mutually different inclinations of the pile, and
- the estimation unit additionally estimates that the mobile robot has moved over a boundary between the first carpet region and the second carpet region on a basis of the translational acceleration measured by the acceleration sensor while the mobile robot is moving at a constant velocity.

17. The mobile robot according to claim 16, wherein in a case of estimating that the mobile robot that had been moving in the first carpet region has moved over the boundary, the estimation unit changes an estimation result of the inclination of the pile to an estimation result of the inclination of the pile at a time when the mobile robot moved in the second carpet region.

18. The mobile robot according to claim 14, wherein the plan includes causing the mobile robot to accelerate and decelerate in each of two directions perpendicular to each other.

19. A control method for a mobile robot that moves autonomously over a floor covered by a carpet, the mobile robot being provided with an acceleration sensor that measures a translational acceleration of the mobile robot, the control method comprising:
- estimating an inclination of a pile of the carpet on a basis of the translational acceleration measured by the acceleration sensor while the mobile robot is accelerating or decelerating;
- controlling a movement velocity and a movement direction of the mobile robot on a basis of the estimated inclination of the pile; and
- in a case of determining that a change has occurred in the estimated inclination of the pile, planning an acceleration or deceleration operation by the mobile robot.

20. A non-transitory computer readable storage medium storing a control program of a mobile robot that moves autonomously over a floor covered by a carpet,
- the mobile robot being provided with an acceleration sensor that measures a translational acceleration of the mobile robot,
- the control program causing a computer provided in the mobile robot to function as:
- an estimation unit that estimates an inclination of a pile of the carpet on a basis of the translational acceleration measured by the acceleration sensor while the mobile robot is accelerating or decelerating;
- an operation planning unit that plans an acceleration or deceleration operation by the mobile robot for the estimation unit to perform the estimation; and
- a movement control unit that controls a movement velocity and a movement direction of the mobile robot on a basis of the inclination of the pile estimated by the estimation unit, wherein
- in a case of determining that a change has occurred in the estimated inclination of the pile, the estimation unit commands the operation planning unit to plan the acceleration or deceleration operation by the mobile robot.

* * * * *